Feb. 28, 1956  G. C. ELLERBECK ET AL  2,736,494
SQUARE ROOT CALCULATING MACHINE
Filed April 1, 1952  26 Sheets-Sheet 1

GRANT C. ELLERBECK &
DONALD L. ROLPH
INVENTORS

BY *Robyn Hilcox*

ATTORNEY

Feb. 28, 1956 G. C. ELLERBECK ET AL 2,736,494
SQUARE ROOT CALCULATING MACHINE
Filed April 1, 1952 26 Sheets-Sheet 2
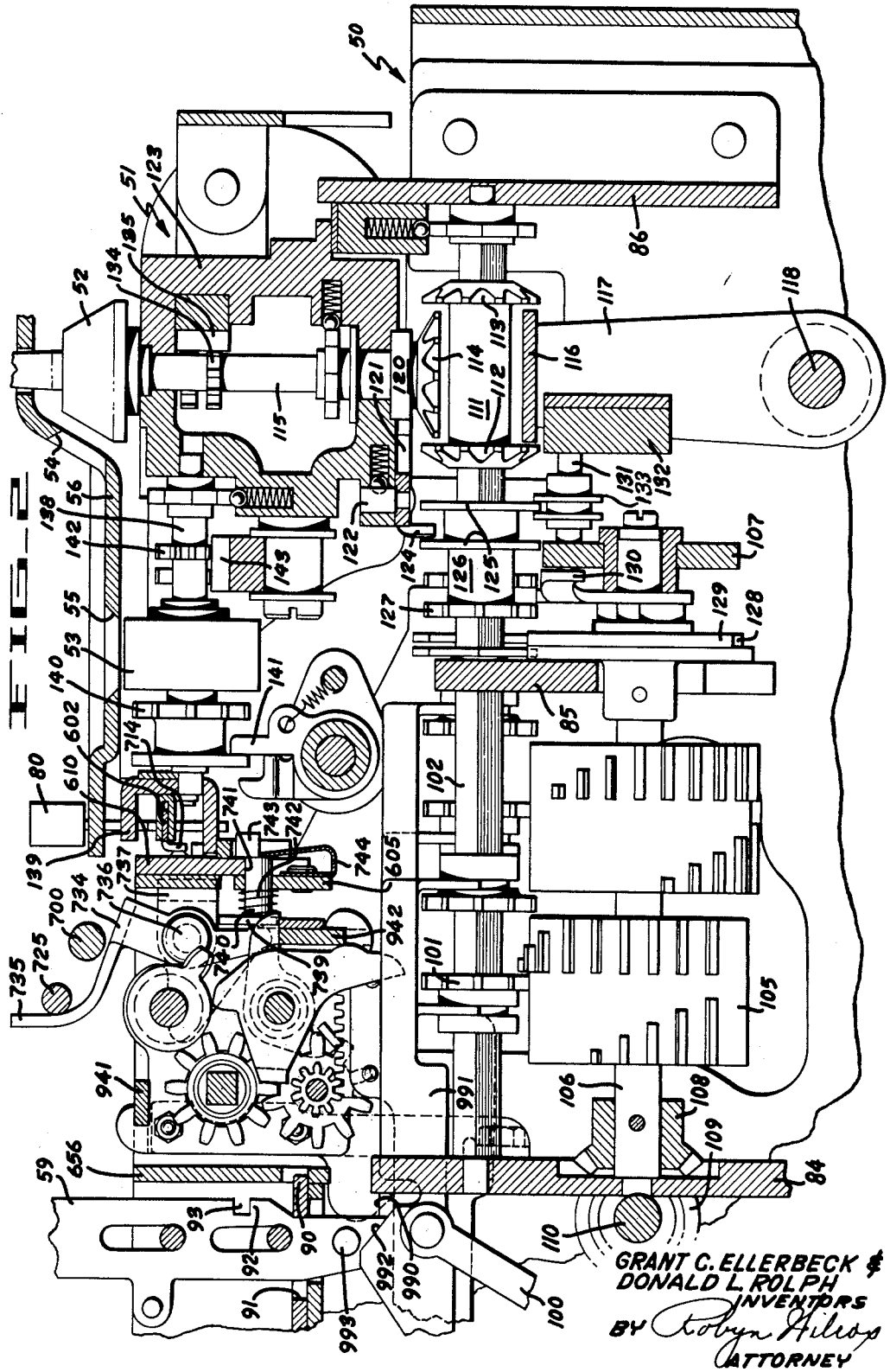
GRANT C. ELLERBECK &
DONALD L. ROLPH
INVENTORS
BY Robyn Hilop
ATTORNEY Feb. 28, 1956  G. C. ELLERBECK ET AL  2,736,494
SQUARE ROOT CALCULATING MACHINE
Filed April 1, 1952  26 Sheets-Sheet 3
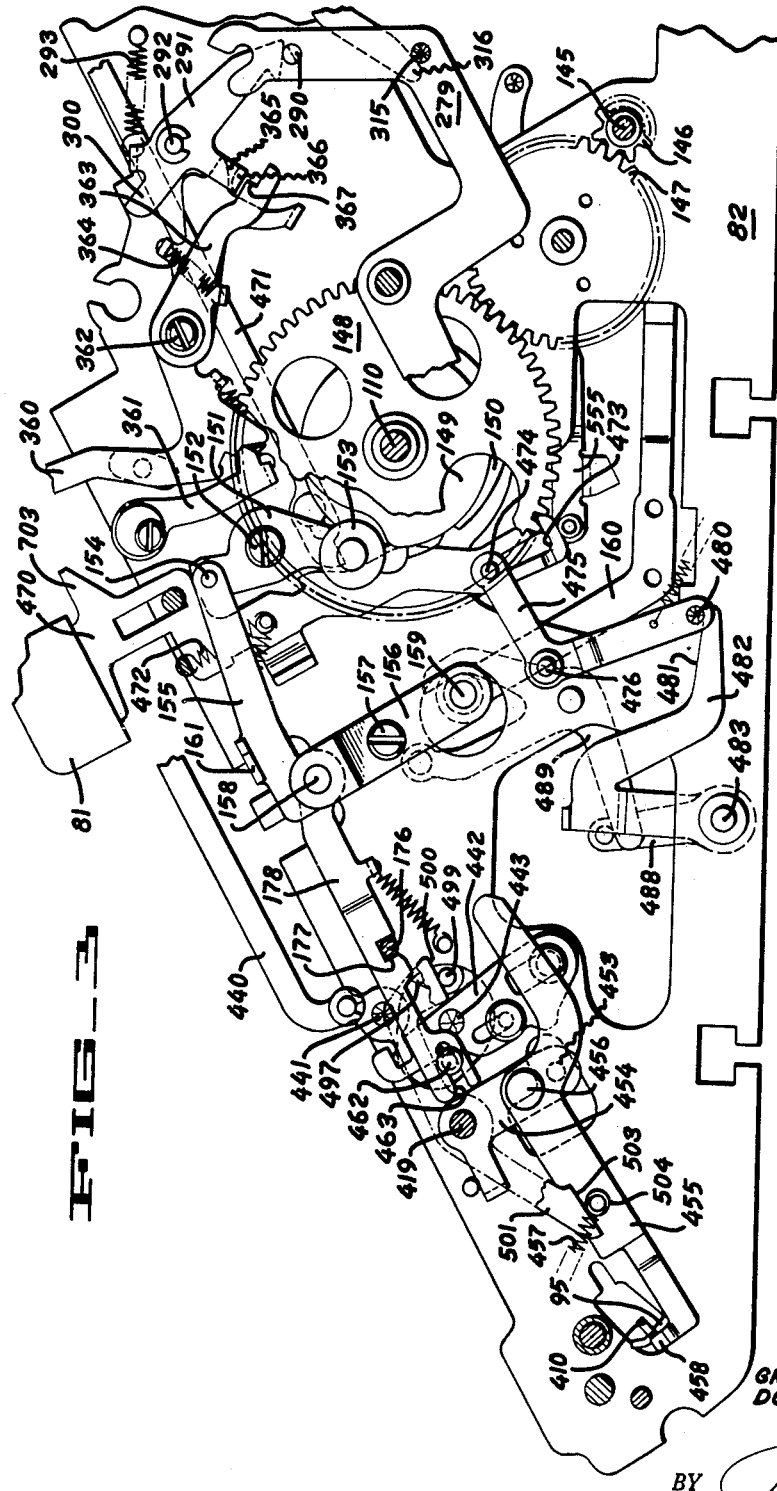
GRANT C. ELLERBECK &
DONALD L. ROLPH
INVENTORS
BY Robyn Hilrox
ATTORNEY

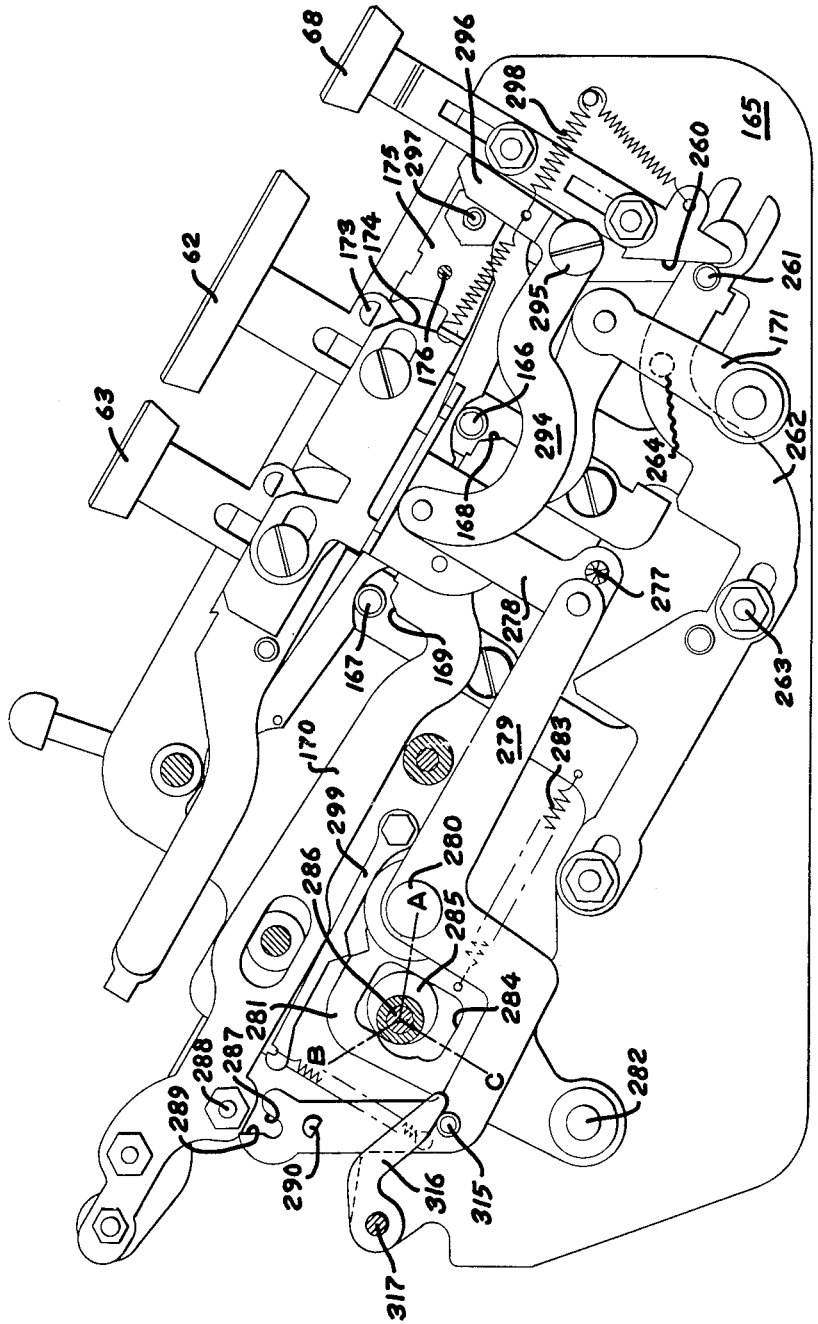

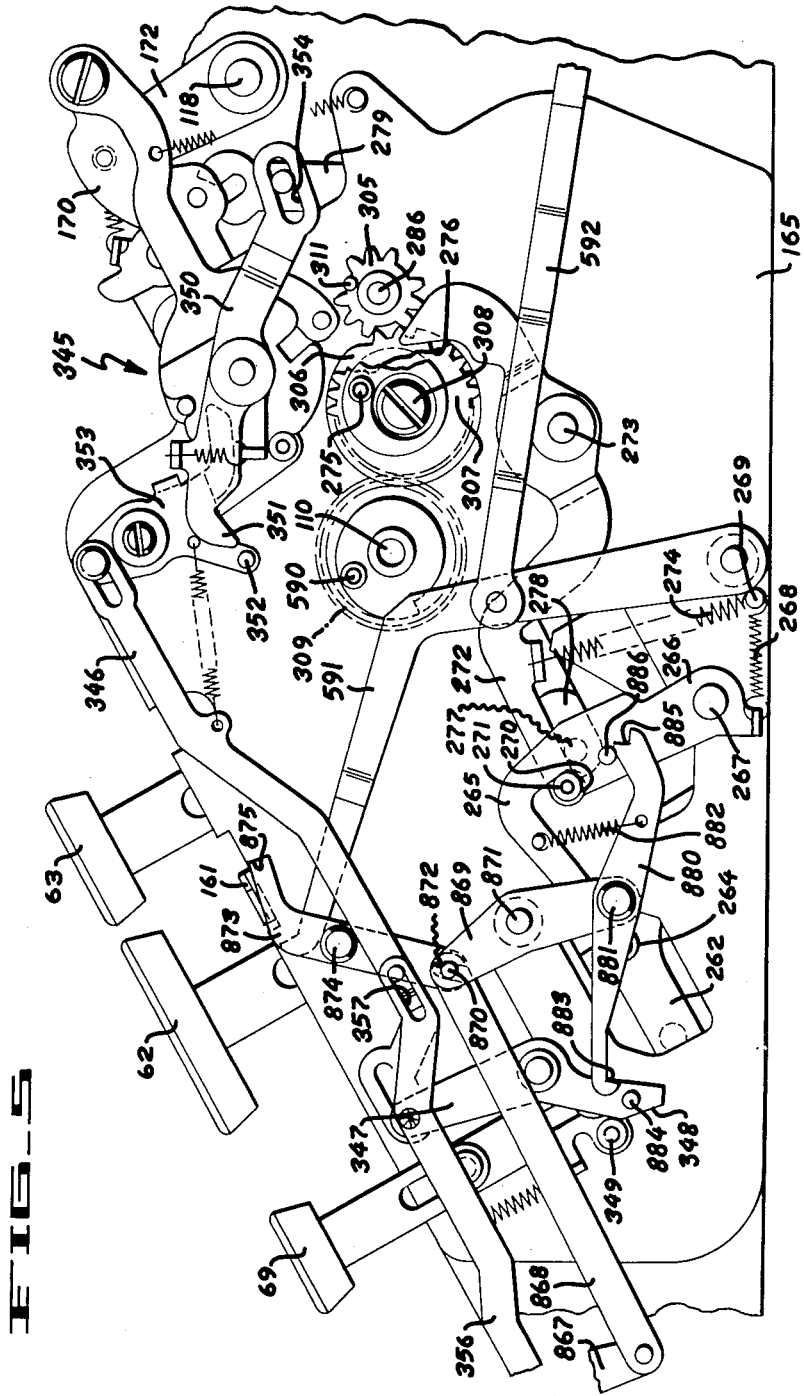

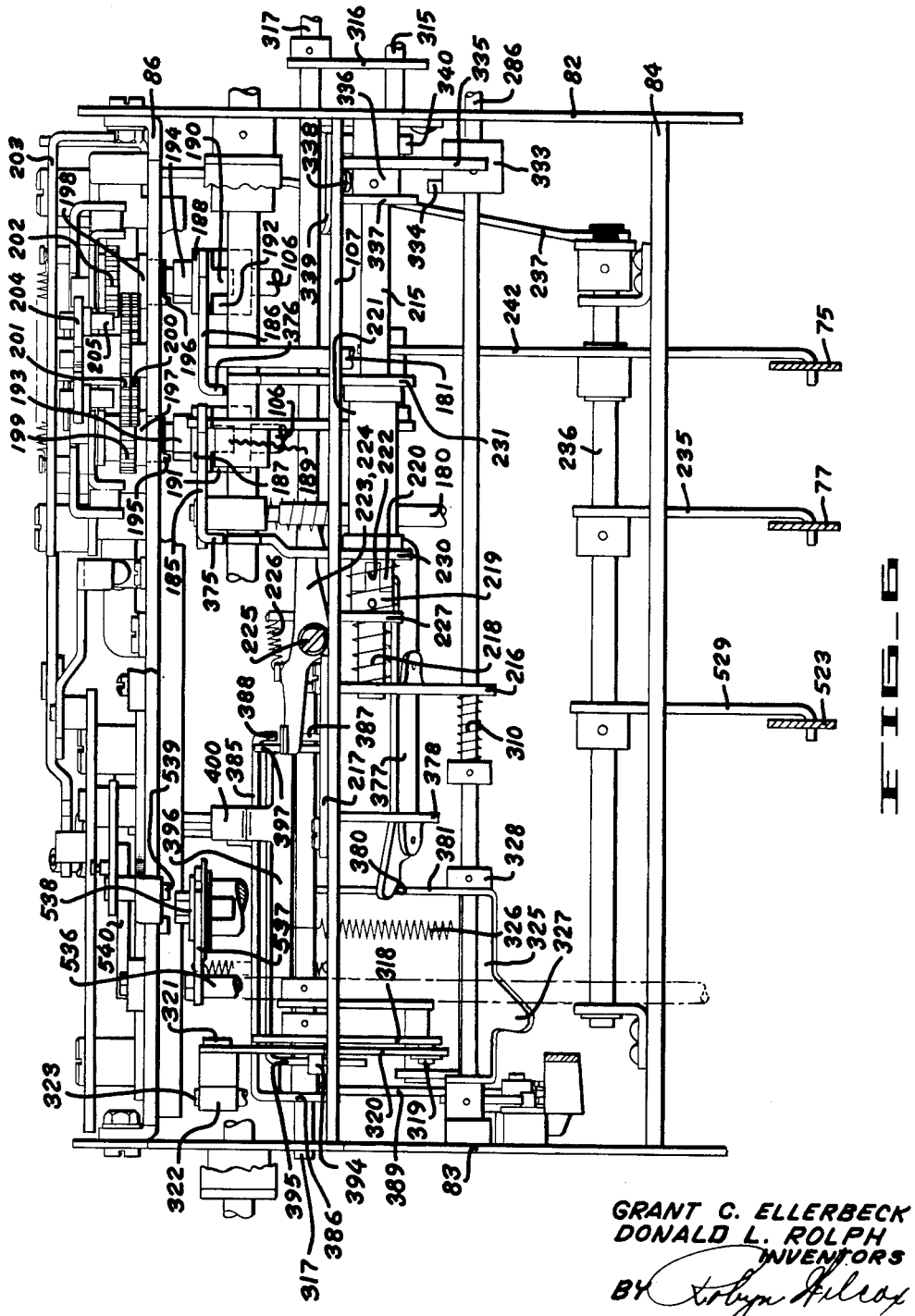

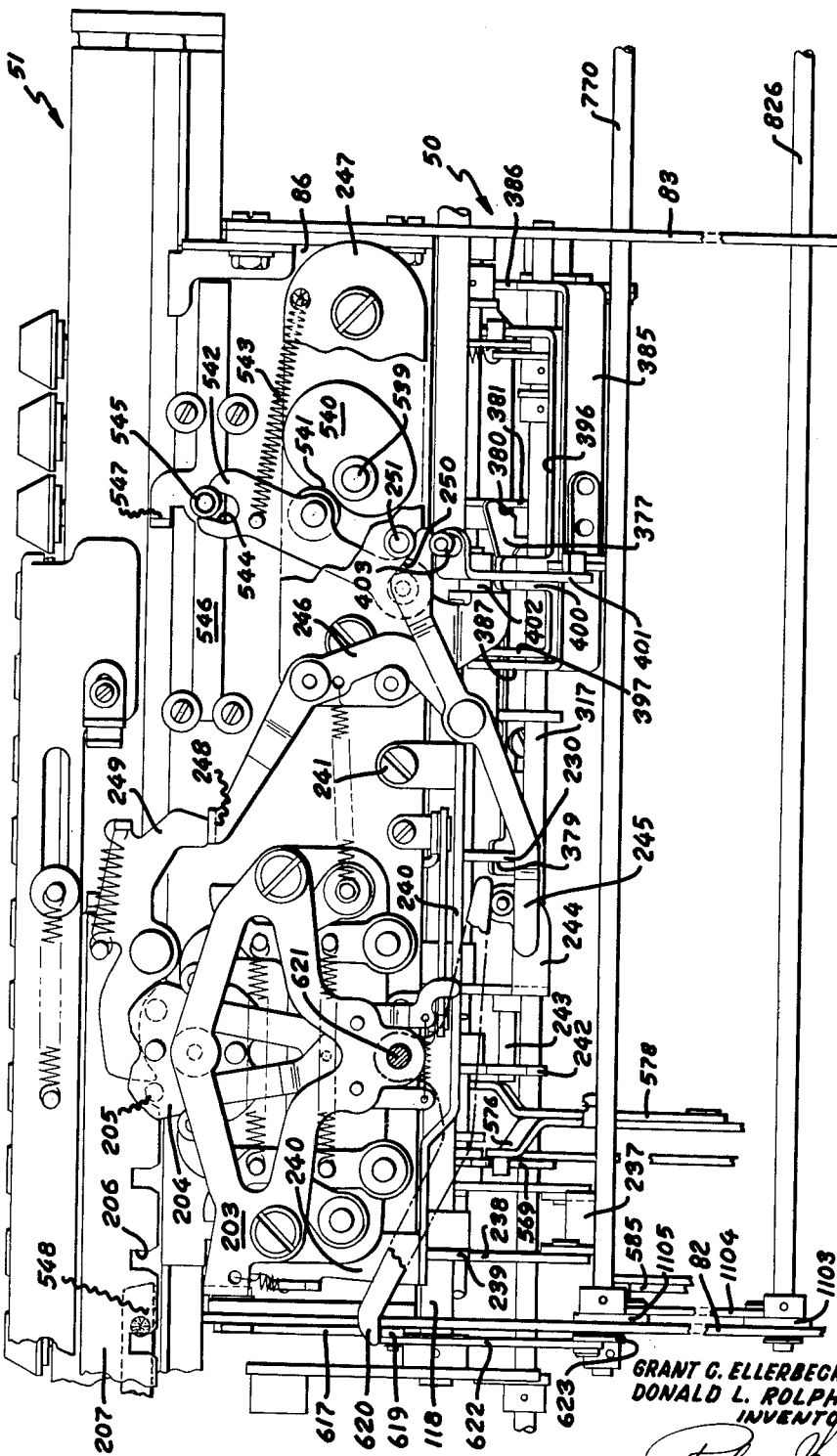

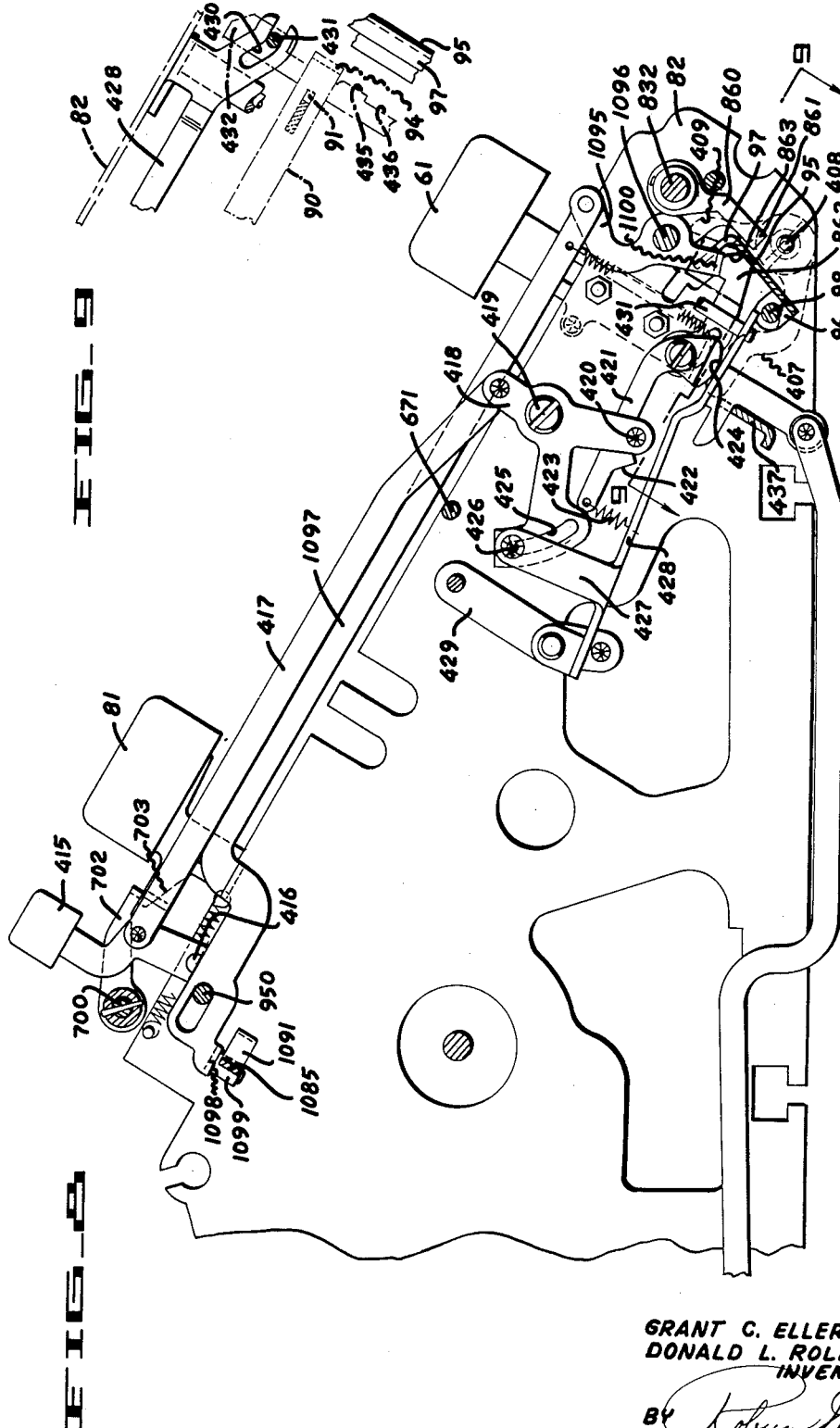

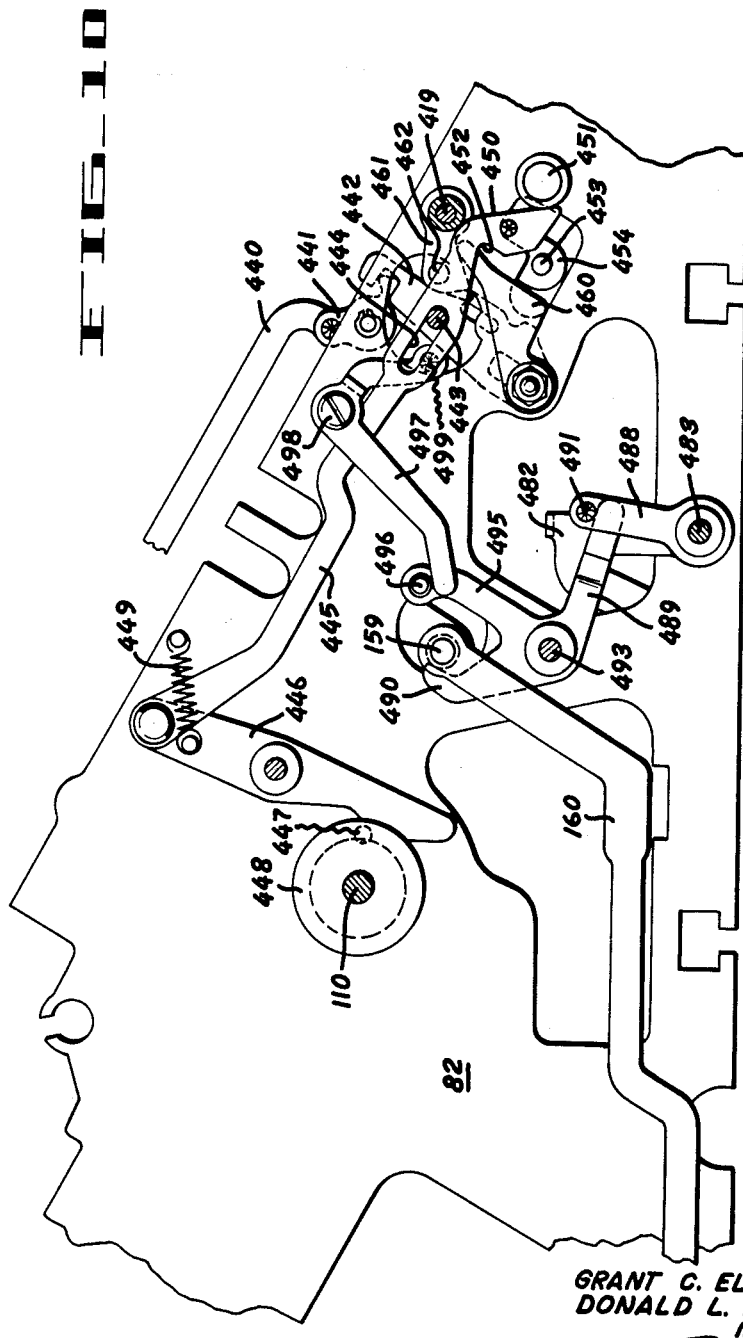

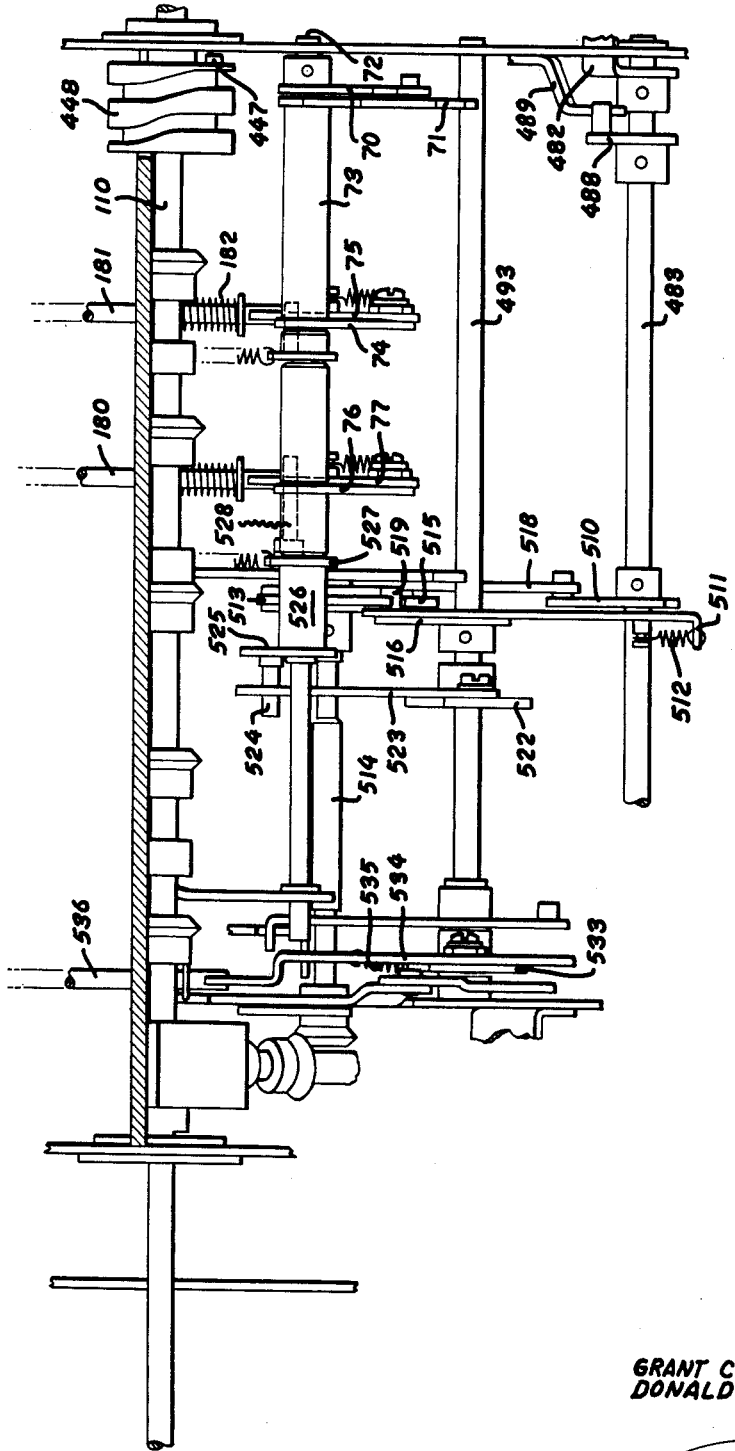

Feb. 28, 1956 G. C. ELLERBECK ET AL 2,736,494
SQUARE ROOT CALCULATING MACHINE
Filed April 1, 1952 26 Sheets-Sheet 11
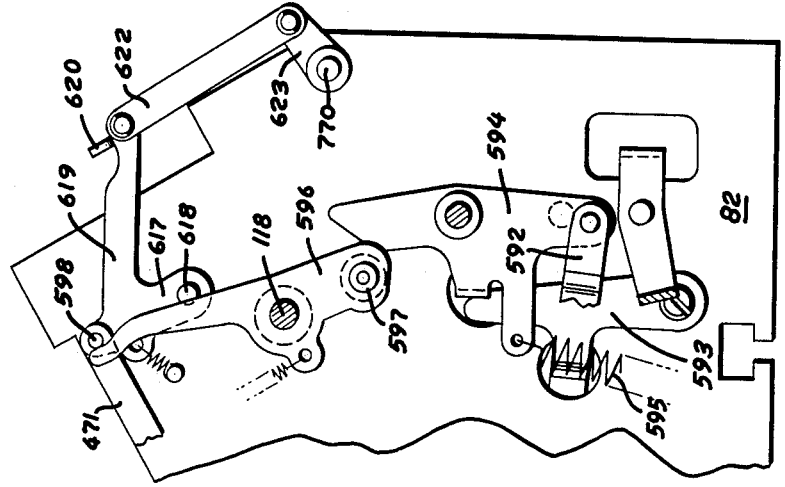
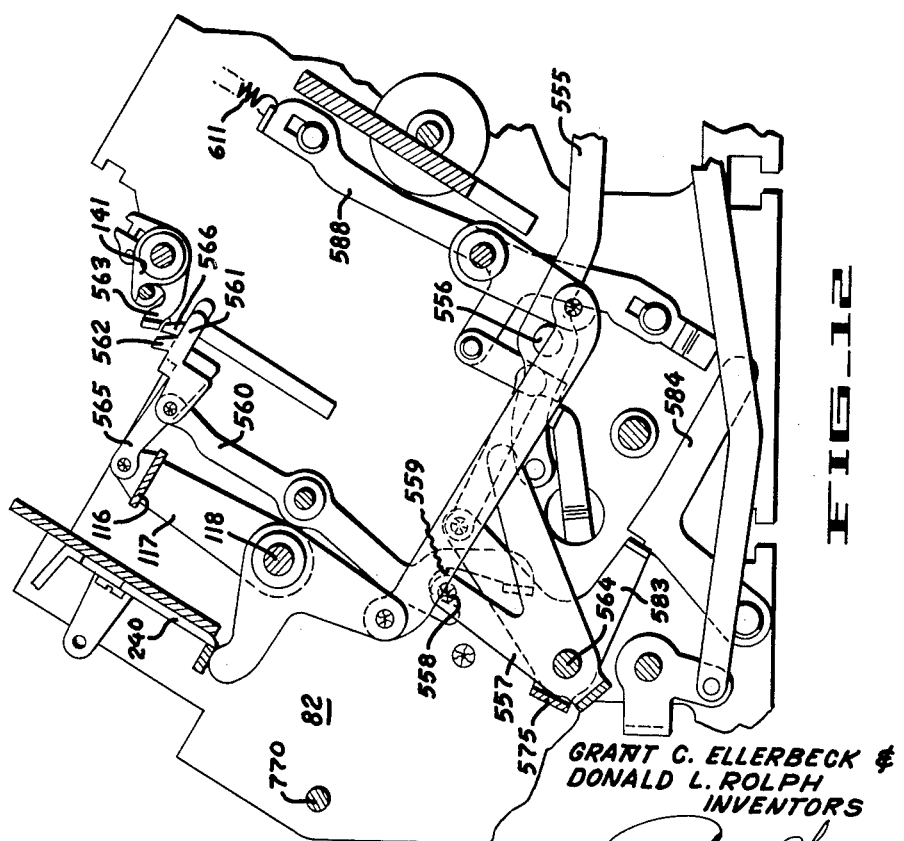
GRANT C. ELLERBECK &
DONALD L. ROLPH
INVENTORS
BY Robyn Wilcox
ATTORNEY Feb. 28, 1956　　G. C. ELLERBECK ET AL　　2,736,494
SQUARE ROOT CALCULATING MACHINE
Filed April 1, 1952　　26 Sheets-Sheet 12
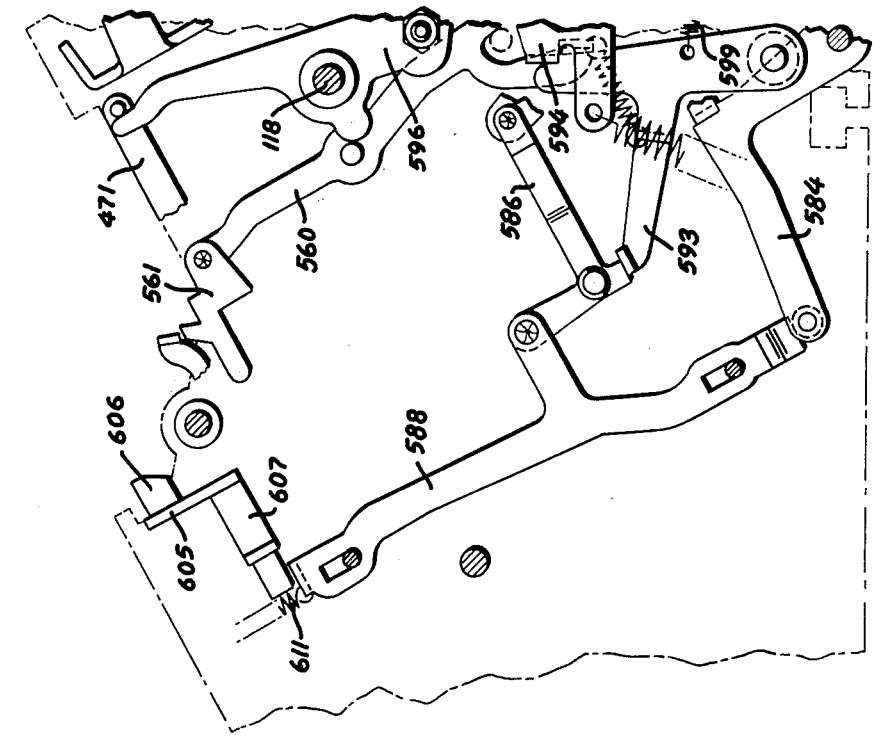
FIG_15
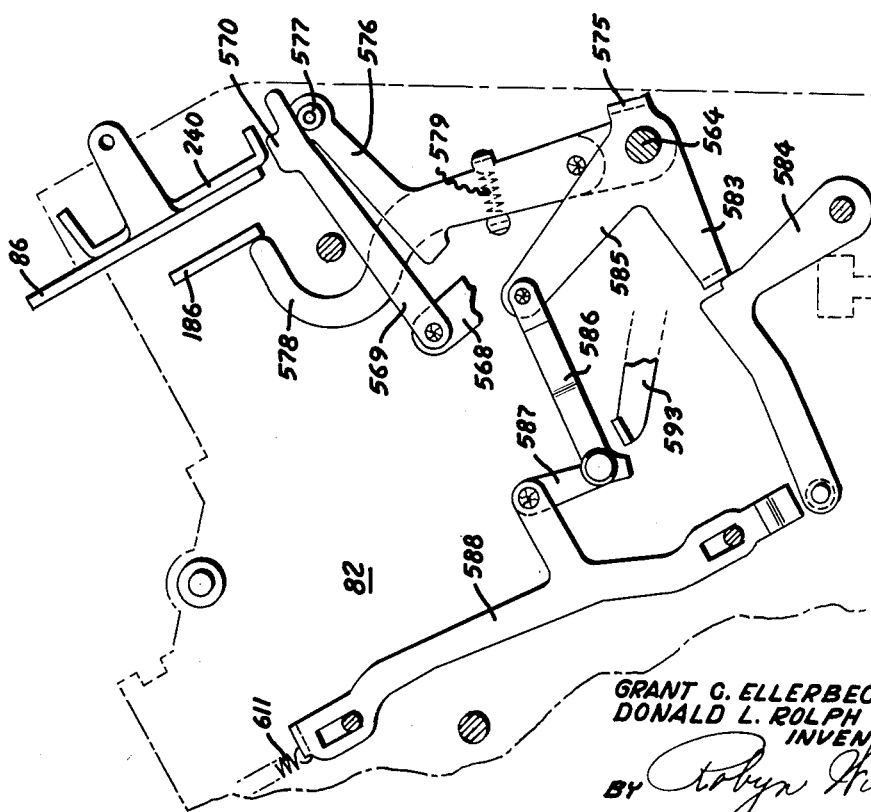
FIG_14
GRANT C. ELLERBECK &
DONALD L. ROLPH
INVENTORS
BY *Robyn Hilcox*
ATTORNEY

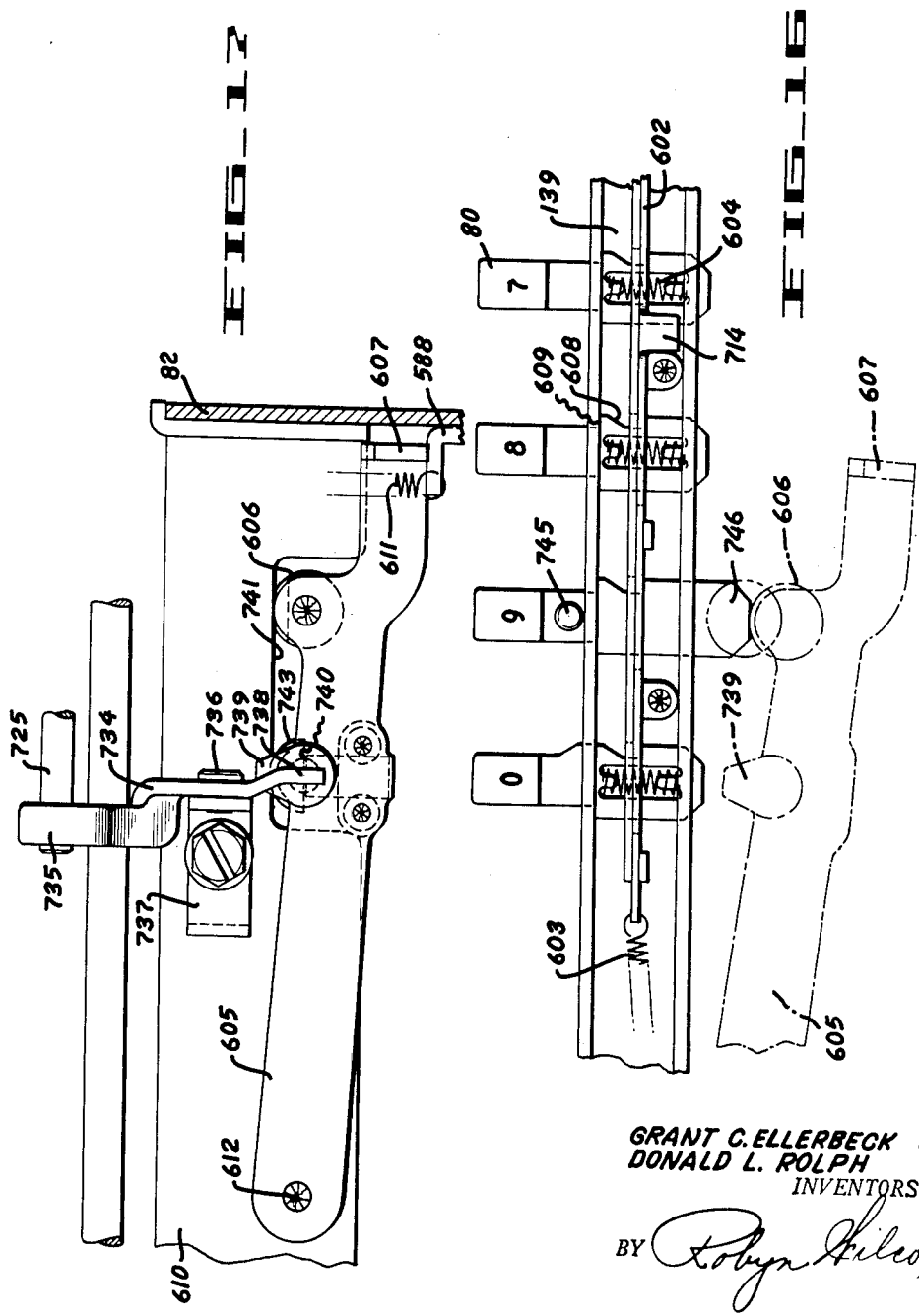

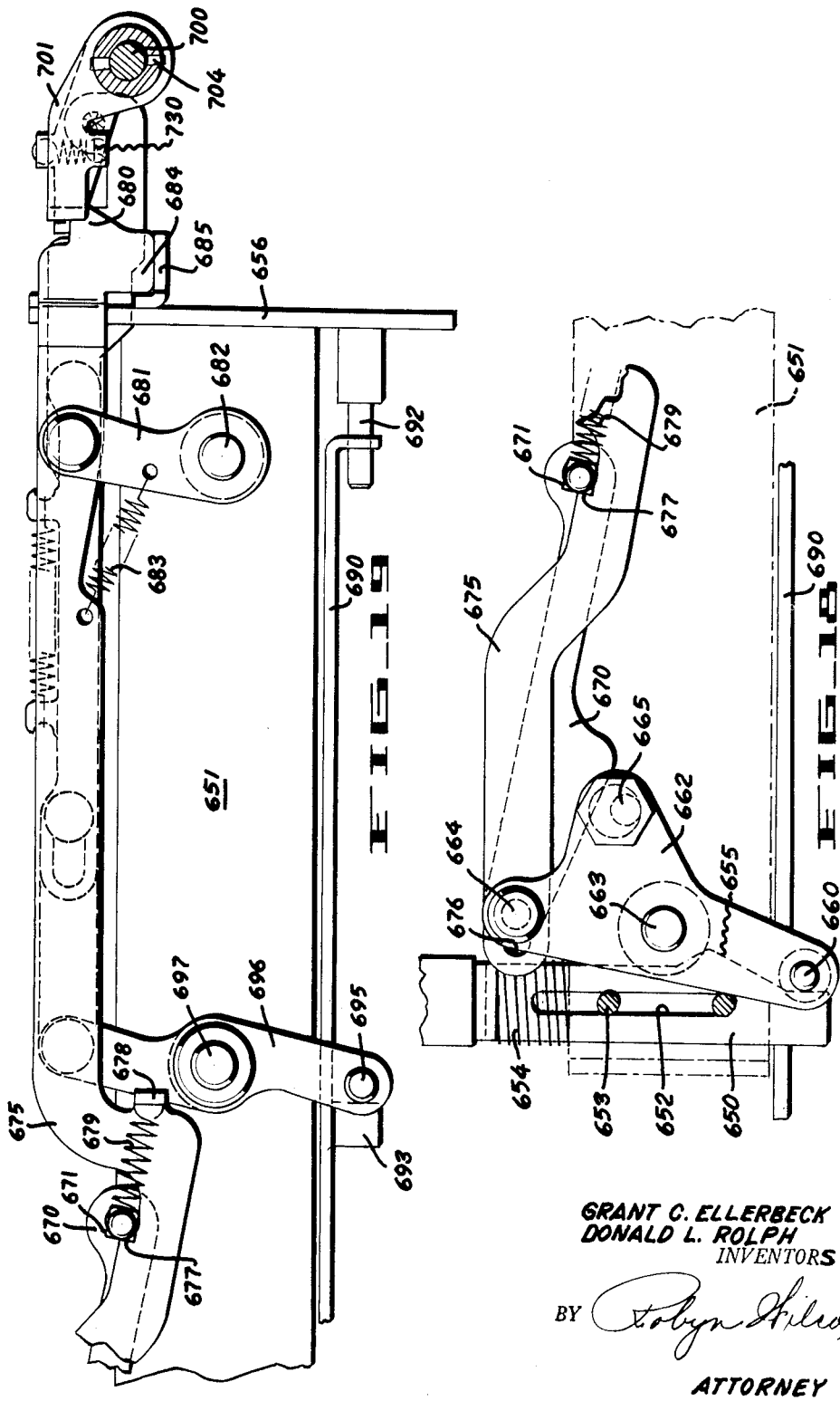

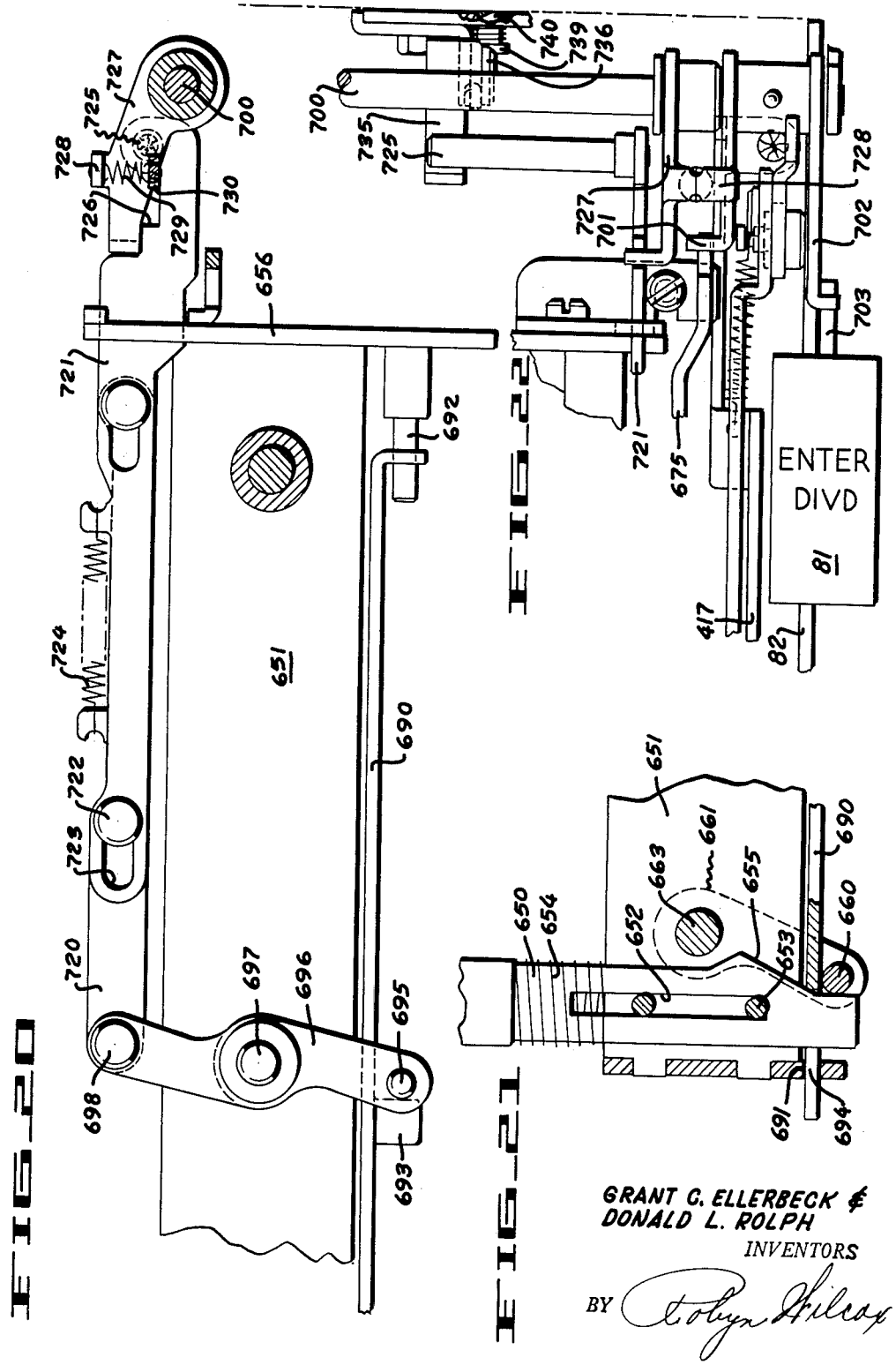

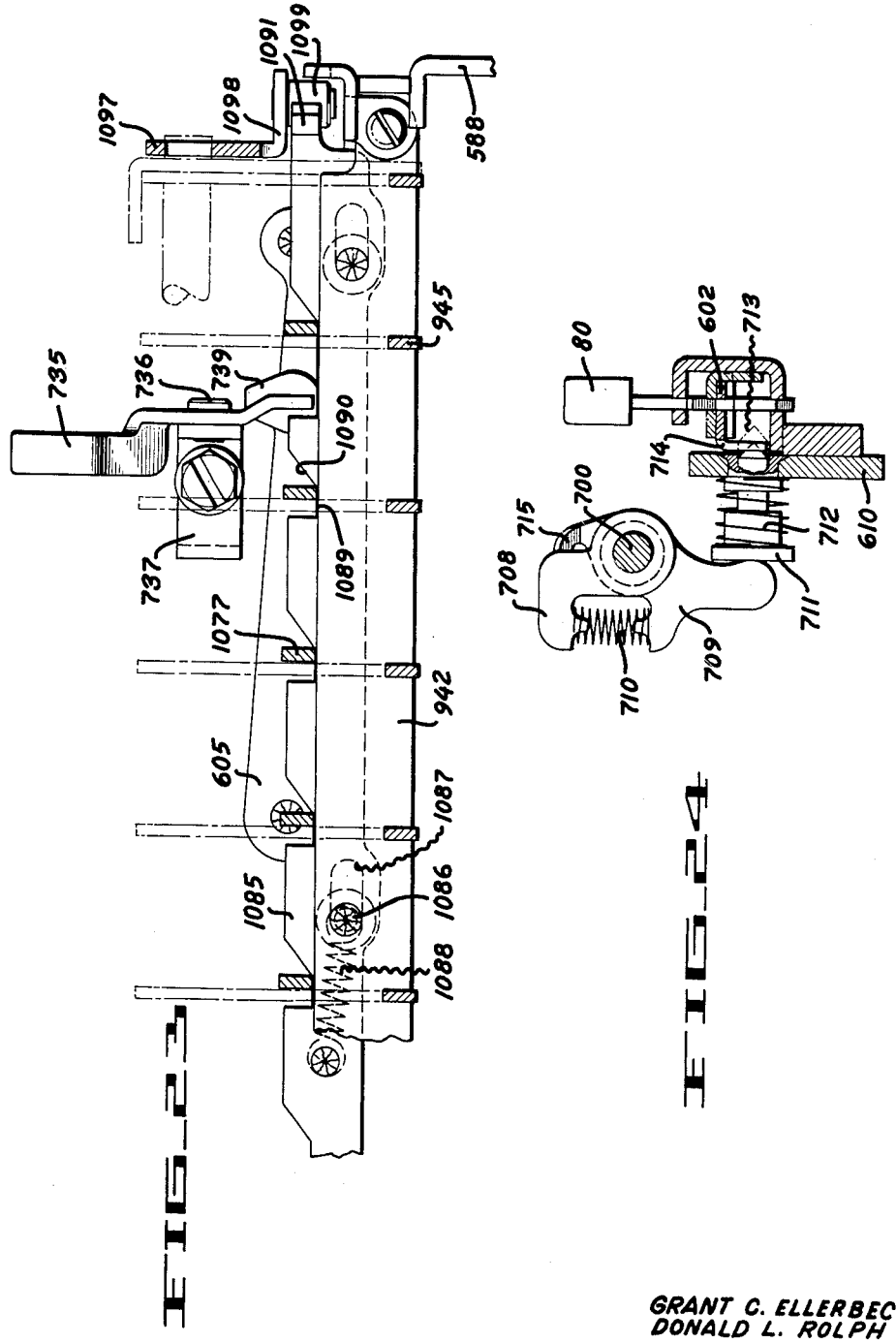

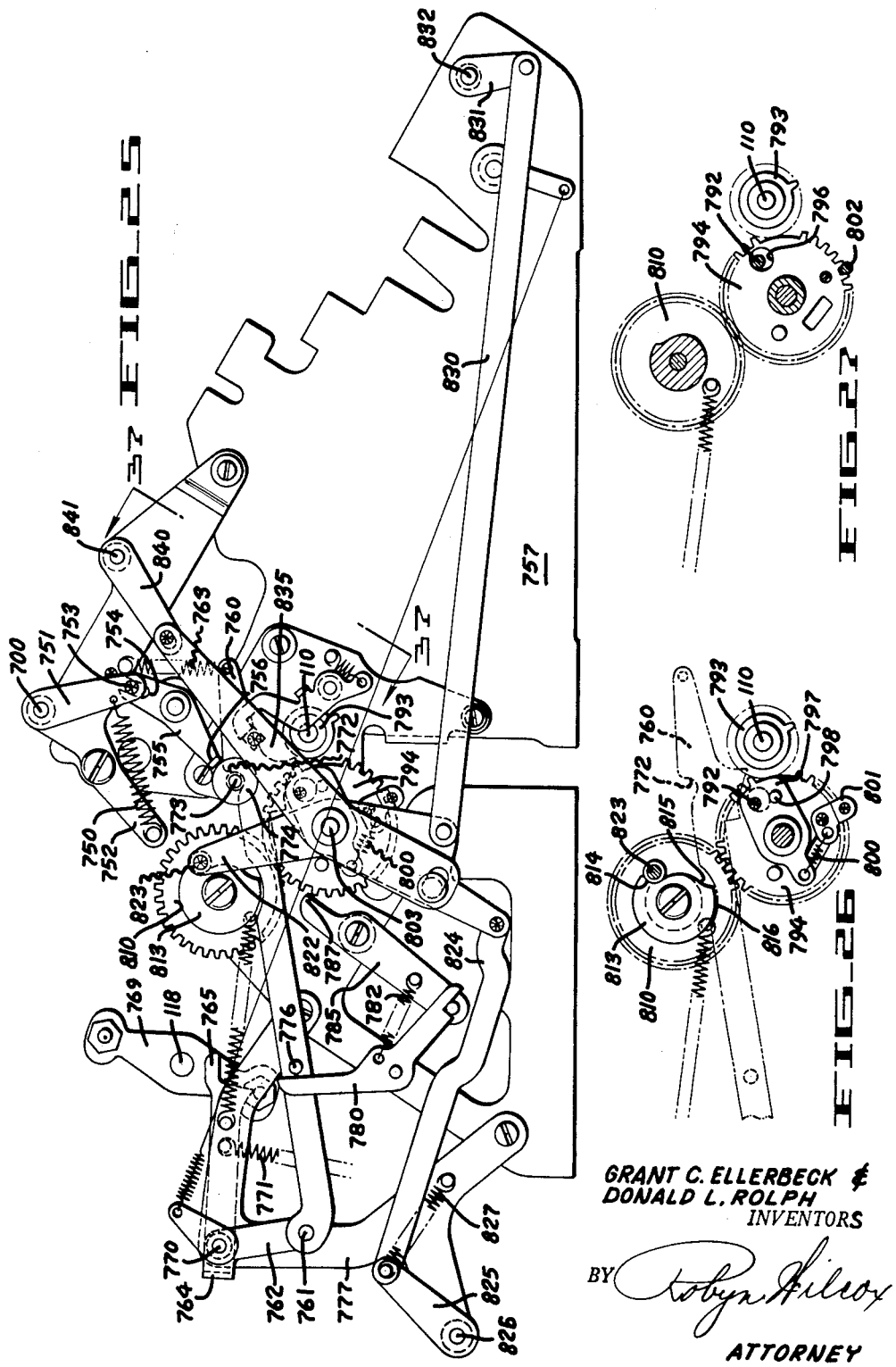

Feb. 28, 1956  G. C. ELLERBECK ET AL  2,736,494
SQUARE ROOT CALCULATING MACHINE
Filed April 1, 1952  26 Sheets-Sheet 18
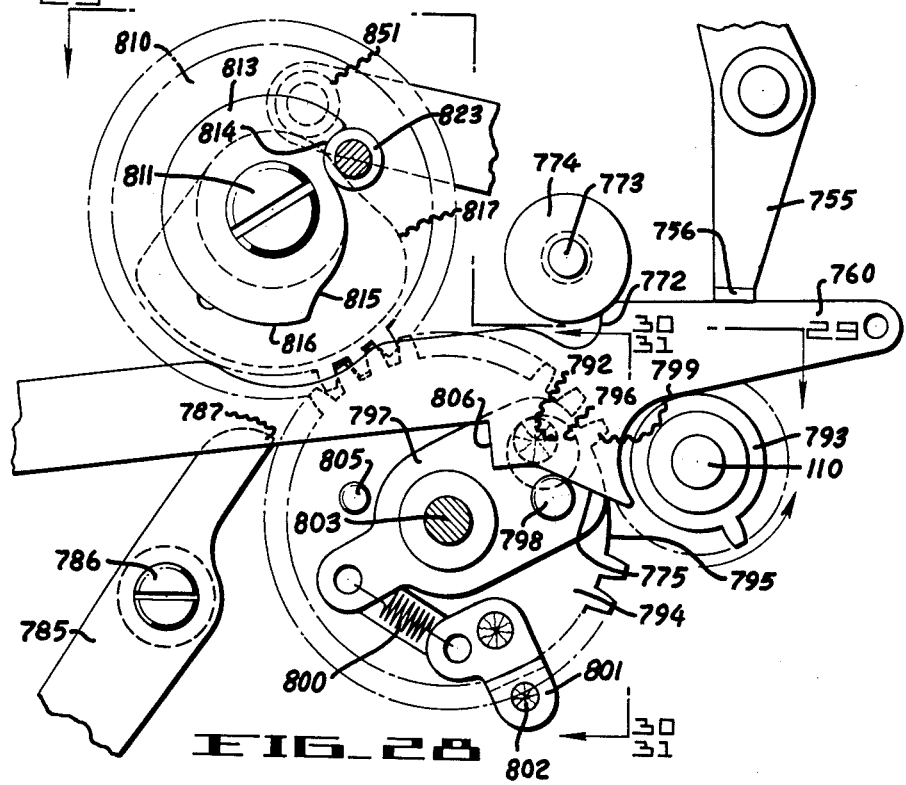
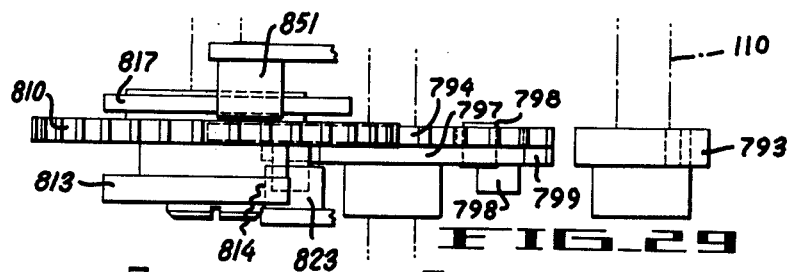
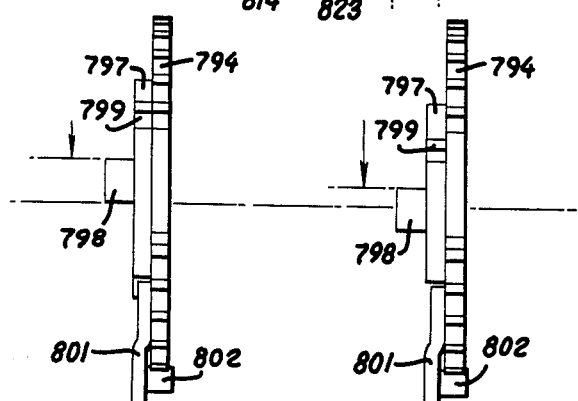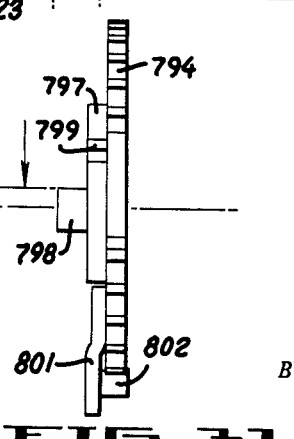
GRANT C. ELLERBECK &
DONALD L. ROLPH
INVENTORS
BY Robyn Wilcox
ATTORNEY

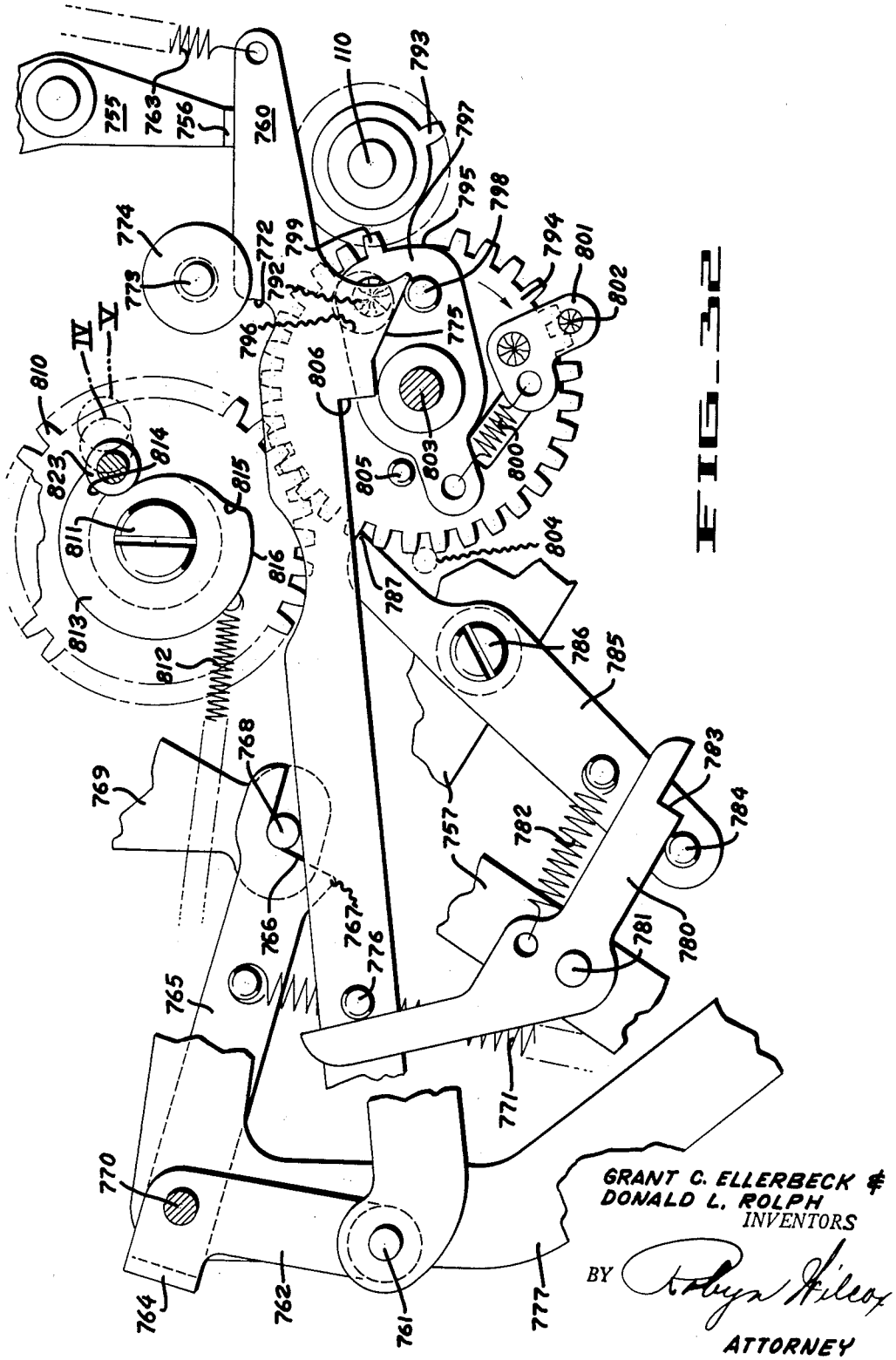

Feb. 28, 1956     G. C. ELLERBECK ET AL     2,736,494
SQUARE ROOT CALCULATING MACHINE
Filed April 1, 1952     26 Sheets-Sheet 20
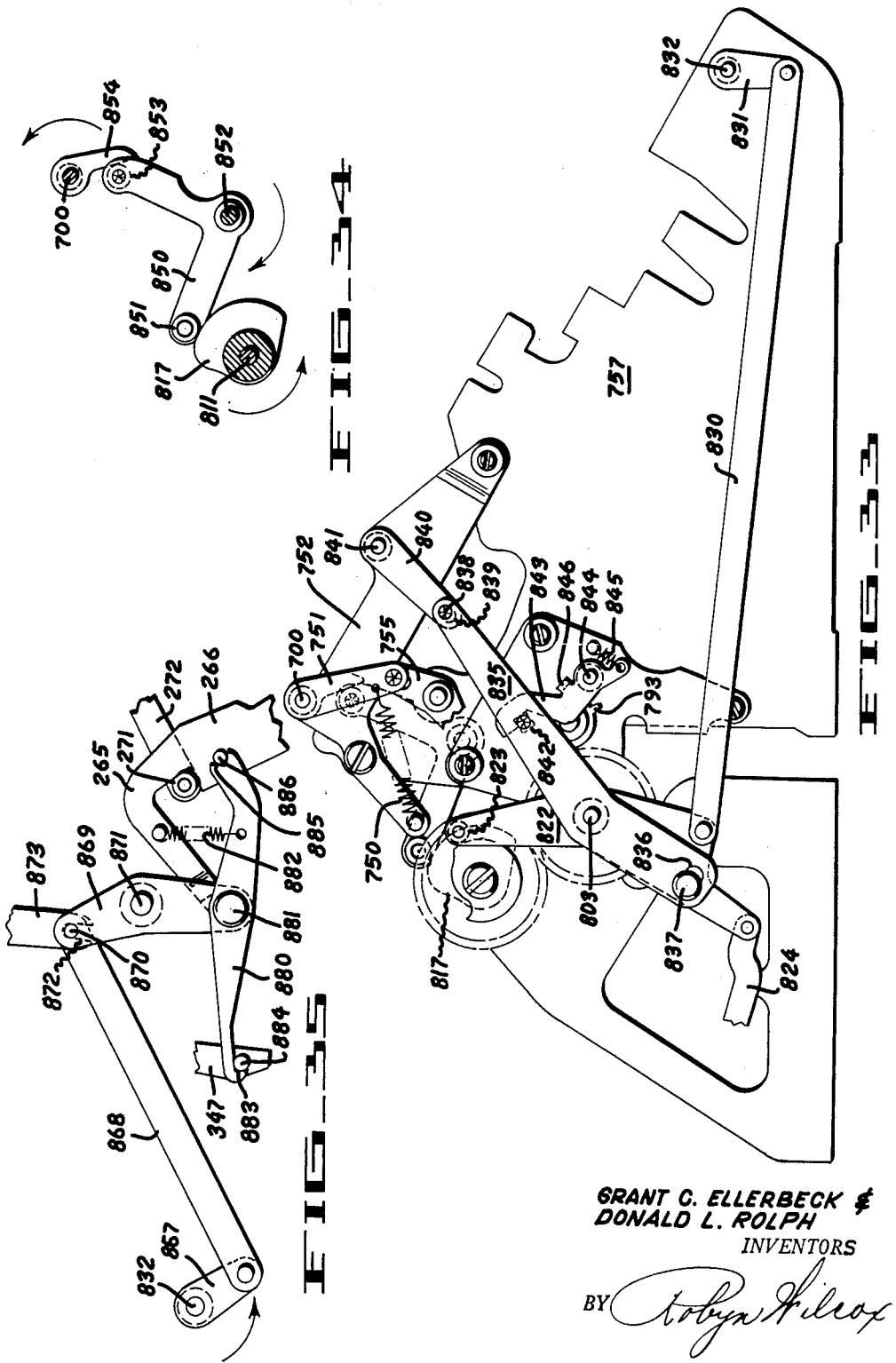
GRANT C. ELLERBECK &
DONALD L. ROLPH
INVENTORS
BY *Robyn Wilcox*
ATTORNEY

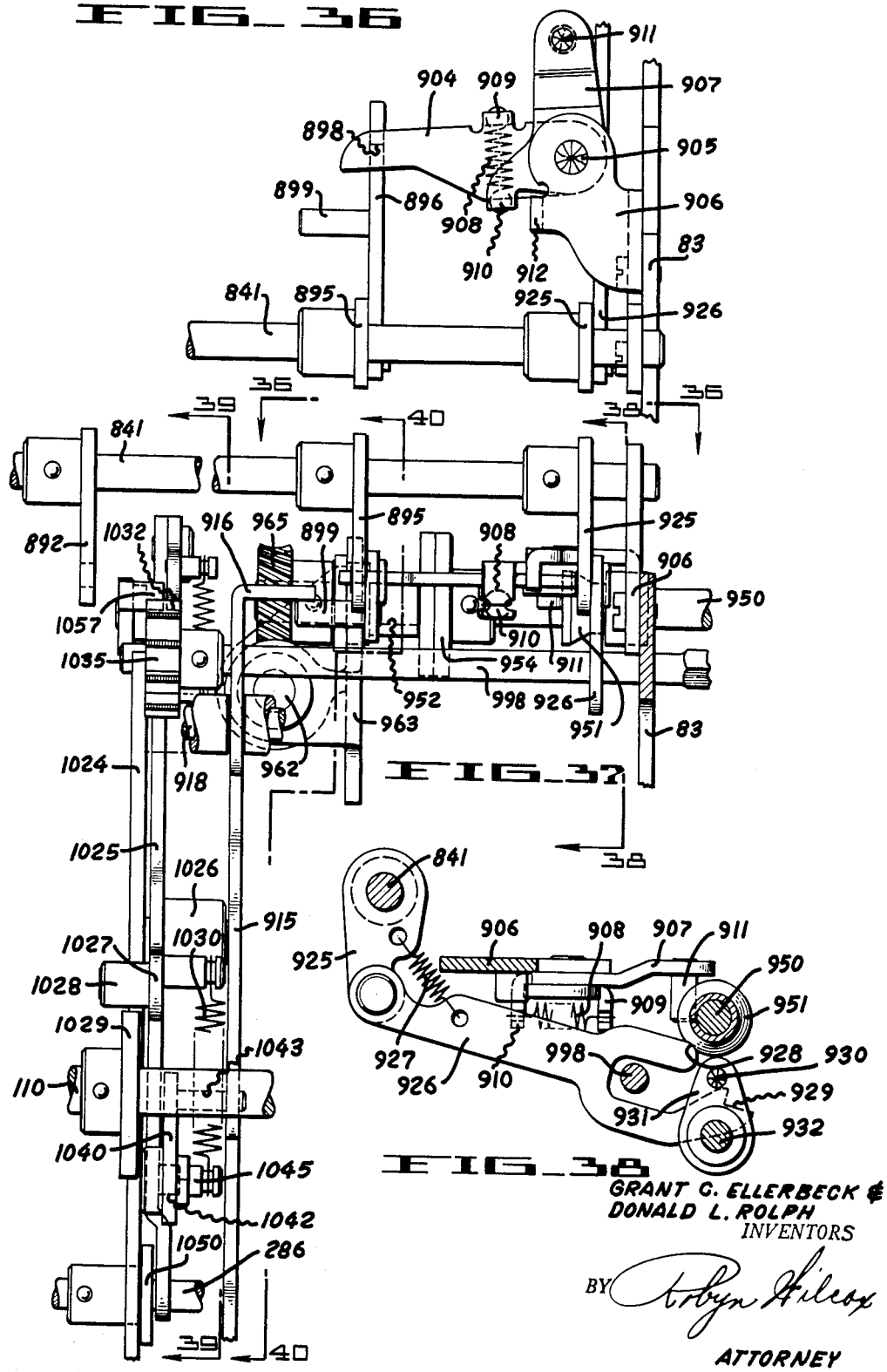

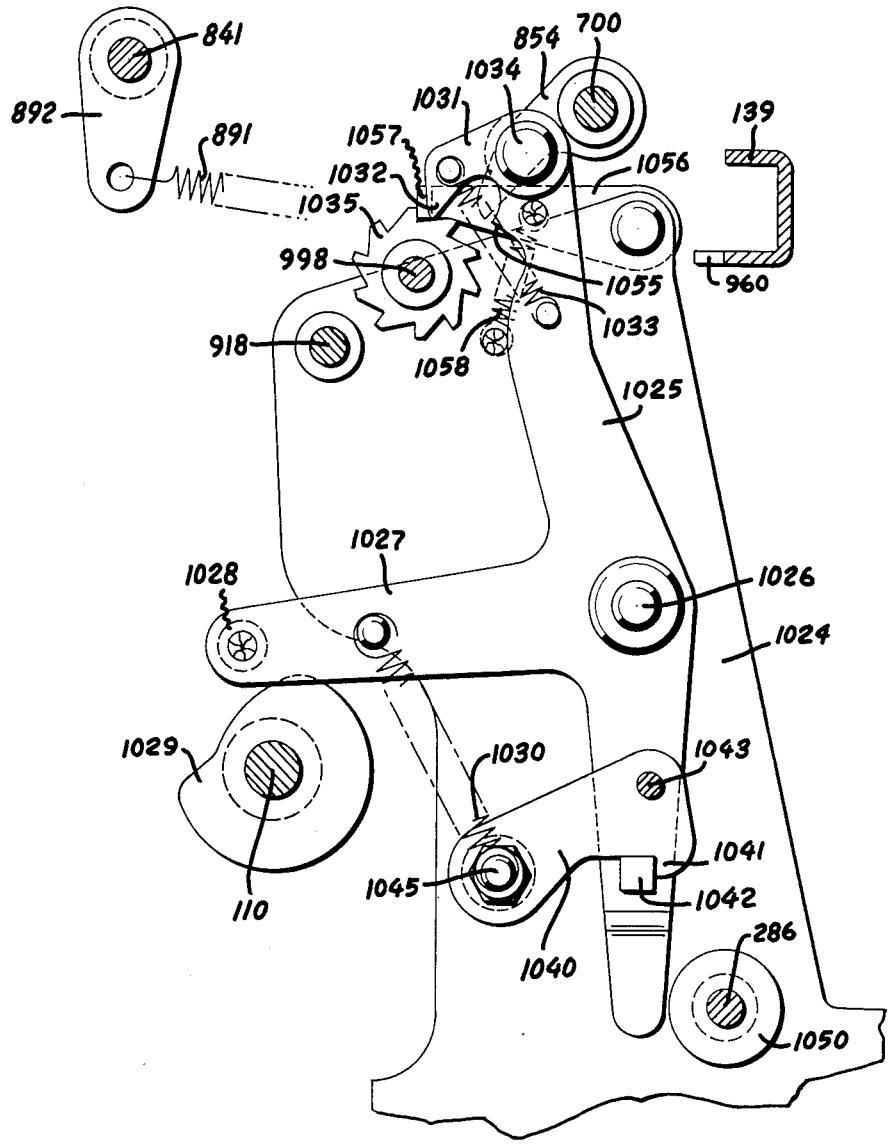

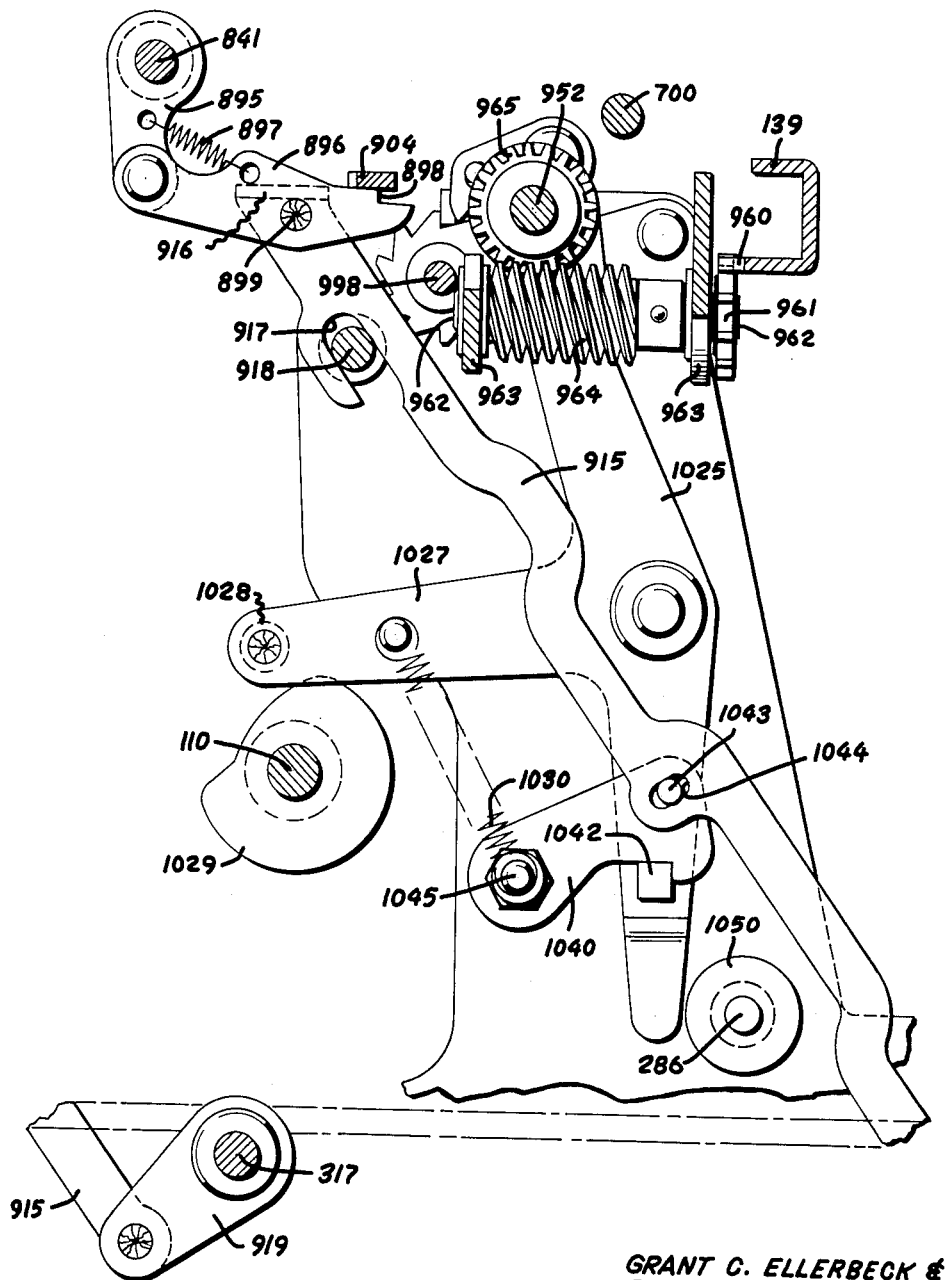

Feb. 28, 1956

G. C. ELLERBECK ET AL 2,736,494

SQUARE ROOT CALCULATING MACHINE

Filed April 1, 1952

GRANT C. ELLERBECK &
DONALD L. ROLPH
INVENTORS

BY Robyn Kilcox

ATTORNEY

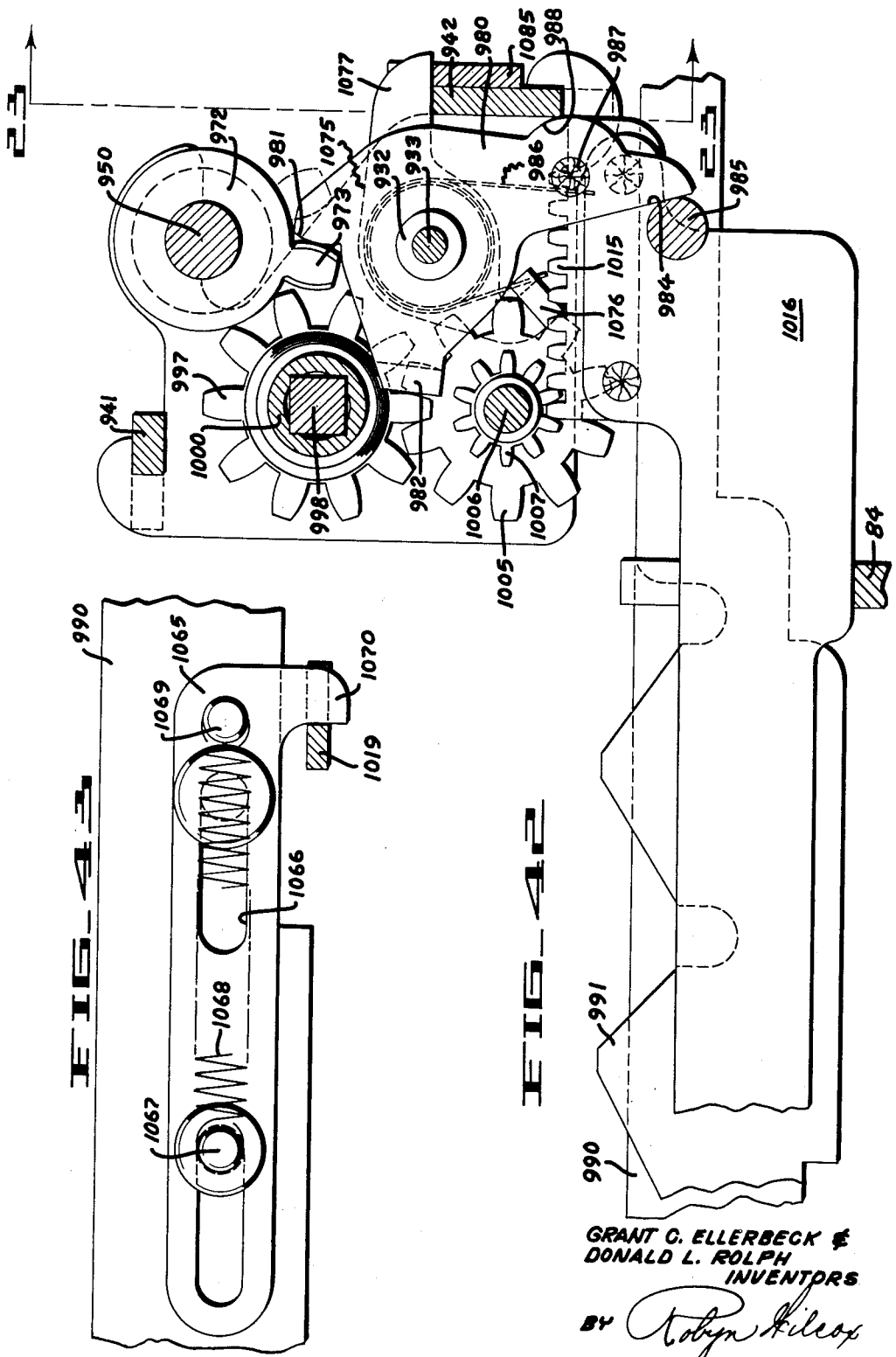

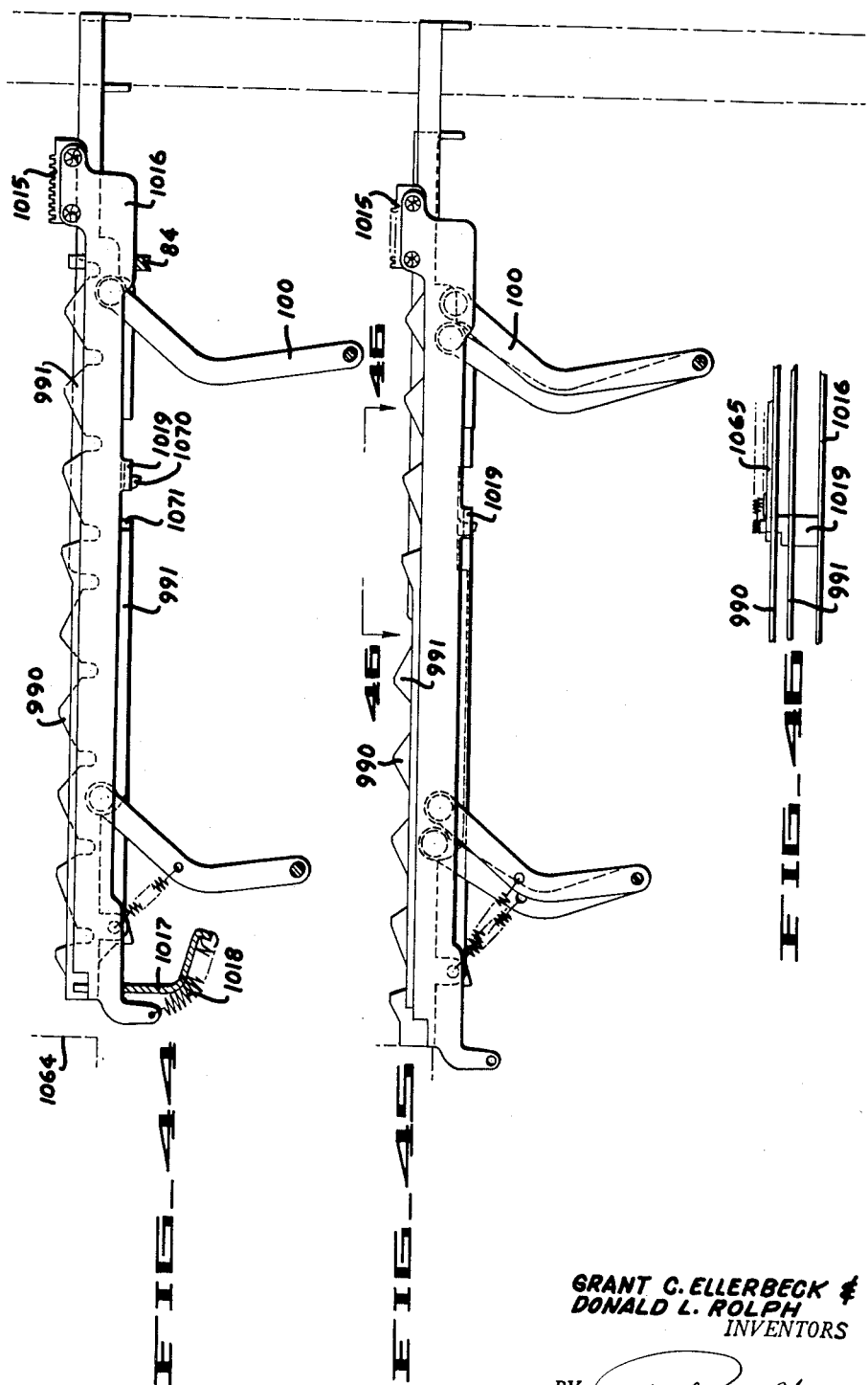

United States Patent Office 2,736,494
Patented Feb. 28, 1956

2,736,494

SQUARE ROOT CALCULATING MACHINE

Grant C. Ellerbeck, San Leandro, and Donald L. Rolph, Hayward, Calif., assignors to Friden Calculating Machine Co., Inc., a corporation of California Application April 1, 1952, Serial No. 279,832

33 Claims. (Cl. 235—63)

TABLE OF CONTENTS

I. General description
 a. Key board mechanism
 b. Keyboard clear mechanism
 c. Keyboard lock
 d. Selection and actuating mechanism
 e. Tens-transfer mechanism
 f. Revolutions counter
 g. Register clearing
 h. Motor drive
 i. Plus and minus keys
 j. Carriage shift mechanism
 k. Add key mechanism
 l. Automatic division mechanism
 m. Division aligner mechanism
 n. Dividend entry mechanism II. Square root mechanism
 1. Initiating keys
 2. Initiating linkage
 3. Initiating shaft mechanisms
  A. Initiate radicand entry
  B. Conditions entry control link
  C. Sets clearing mechanism
 4. Automatic carriage positioning
 5. Radicand entry control mechanism
  A. Release dividend entry mechanism
  B. Clear keyboard and initiate division
  C. Delay latch
 6. Restoring starting shaft to original position
 7. Square root programming mechanism
  A. Cam shaft shifting
  B. "5's" entry, 9th order keyboard
 8. Square root selection mechanism
  A. Cam shaft and drive
  B. Gear engaging arms
  C. Feed gear and drive
  D. Selection slide drive
  E. Latching mechanism
 9. Clearing mechanism
 10. Operation This invention relates to calculating machines and particularly to one which, in addition to performing the usual four calculations of addition, subtraction, multiplication and division, will automatically extract the square root of a radicand (either whole, decimal, or mixed) set in the keyboard. It is to be understood that by "radicand" we mean the value, the square root of which is to be extracted.

The primary object of this invention is to provide a calculating machine capable of automatically extracting the square root of any given number, or a root which is a geometrical progression of square root such as fourth root, eighth root, and the like.

Another object of this invention is to provide a control mechanism for a calculating machine which, when set to operative position, will automatically change the setting of the selection mechanism cyclically in a predetermined progression, such as is necessary to extract an exponential factor from a value set into the machine, e. g., square root, fourth root and the like.

A further object of this invention is to provide a calculating machine, with a manually positioned control mechanism which, when set to an operative condition, controls the operation of the machine to positively and progressively change the value of the factor being subtracted from a value in the accumulator register in order to subtract values in a predetermined progression, and thereby extract the square root of a radicand registered in the accumulator register.

It is still a further object of this invention to provide a calculating machine capable of extracting the square root, or other roots which are a geometrical progression therefrom, in which the root is set, and may selectively be latched in the selection mechanism of the machine, whereby the root can be used as a factor in a subsequent machine operation.

Another object of this invention is to provide a calculating machine capable of extracting square root, and other roots which are a geometrical progression therefrom, by means of a mechanism mechanically more simple than that shown in the copending application of one of the applicants herein, S. N. 244,518, filed August 31, 1951.

Square root can be extracted manually in a calculating machine such as the well known "Friden automatic calculator." This method is explained in detail in the early pages of the copending application just mentioned. The machine of such application is capable of automatically carrying out the sequence of steps to extract square root by the odd integer method there described, which, briefly stated, comprises the subtraction of consecutive odd numbers from the radicand standing in the accumulator register. The machine so described operates satisfactorily to accurately and quickly extract square roots but has four disadvantages:

1. At the end of each ordinal operation it was necessary to reduce the value standing in the selection mechanism by "1."
2. The value standing in the selection mechanism at the end of the operation was double the root.
3. It was necessary to provide for a transfer between orders of the selection mechanism to effect progression of from "9" to "11."
4. The amount of feed was not uniform in that "1" had to be fed in the first cycle and "2" thereafter.

We have invented a mechanism, using a new and novel method of extraction of square root, which avoids these difficulties and which, mechanically, gives a simpler and more sturdy construction than that practical in the aforementioned application. It is believed that the mechanism of our invention will be more readily understood if the method itself is first described. In some respects the method is preferable to that previously known and described as it avoids the four objections above noted and therefore, when used in manual operation, gives less chance of errors by the operator. This method includes the following steps (it being understood that the accumulator is clear, the counter set for unlike registration, and the radicand set in the keyboard):

A. The first step in the method used in the mechanism of our present invention is to multiply the radicand by "5," the product, sometimes hereinafter referred to as the "radicand factor," being registered in the accumulator register, preferably at or immediately adjacent the left-hand end thereof.

B. The decimal point marker of the counter is then placed in the proper position. This is determined by setting off the radicand in groups of two, as is conventional in square root extraction, and the decimal point moved one place for each group (of two digits) in the radicand.

C. Then, in the order in which operation would have been initiated in longhand extraction of square root or in the odd integer method described in said application, "5" is placed in the keyboard and subtracted. The order in which operation is begun is determined by pointing off the radicand in groups of two, as is done in manual square root extraction, the "5" being placed under the right-hand figure of the leftmost group of numbers (under the leftmost digit of the radicand if the leftmost group has only one digit, or under the second from the leftmost digit if the leftmost group has two digits). It is apparent that in determining the order in which operation is to begin, the radicand factor is ignored and that operation is begun with respect to the leftmost group of two in the original radicand.

D. The first step of the extraction operation, as has been noted in "C" above, is the subtraction of the value of "5" in the initial order. In the second cycle the value of "15" is subtracted, and in each of the succeeding cycles the value in the keyboard value is increased by "10" (i. e., in the 3rd cycle the value of "25" is subtracted, in the 4th the value of "35," etc.). In other words, the value in the lowest order is always "5," and in the next higher order the values increase arithmetically by "1," beginning with "0," in successive cycles of operation. When an overdraft is registered the value last set in the keyboard, i. e., the value which caused the overdraft when subtracted from the value in the register (e. g., "X5"), is added back into the register, to correct the overdraft. The carriage is then shifted one step to the left.

E. The value in the lower order is then erased leaving the selection mechanism of that order standing at "0," and "5" is placed in the next lower order. The keyboard value is not otherwise changed. The value then standing in the keyboard (which consists of the number in the tens order of the first ordinal operation and "05," e. g., "X05") is subtracted. The "5" is permitted to stand in the lowest order, and in the next higher order (in which the "0" was standing during the first cycle of the second ordinal operation) the value of "1" is inserted (e. g., "X15") and the machine again cycled subtractively. The value in the tens order is increased by "1" in consecutive cycles of operation until an overdraft is again reached.

Again when the keyboard value causes an overdraft the value then standing in the keyboard is added back to correct the overdraft and the carriage shifted one order to the left. Again the "5" in the lowest order is erased and a "5" placed in the order next lower thereto, without otherwise changing the keyboard value. This is continued across the keyboard until the extraction has been completed.

An example of the extraction of square root is given below, using the radicand of 390937.5625 as illustrative of the process (the radicand so used is the same as that used to exemplify the odd integer method described in the application abovementioned, so that the differences in the methods can be readily seen by a comparison with that application):

[Carriage in extreme right-hand position—counter set for unlike operation]

| Step | Operation | Keyboard Value | Accumulator Dial Reading (Zeros to right of keyboard ignored) | Counter Dial Reading |
|---|---|---|---|---|
| 1 | Add | 390937.5625 | 390937.5625 | 900.0000000 |
| 2 | do | 390937.5625 | 781875.1250 | 8 |
| 3 | do | 390937.5625 | 1172812.6875 | 7 (zeros omitted for clarity). |
| 4 | do | 390937.5625 | 1563750.2500 | 6 |
| 5 | do | 390937.5625 | 1954687.8125 | 5 |

[Carriage in extreme right-hand position—counter set for unlike operation]

| Step | Operation | Keyboard Value | Accumulator Dial Reading (Zeros to right of keyboard ignored) | Counter Dial Reading |
|---|---|---|---|---|
| 6 | Clear Keyboard | | | Clear Counter. |
| 7 | Subtract | *05 | 1904687.8125 | 100.0000000 |
| 8 | do | 15 | 1754687.8125 | 2 |
| 9 | do | 25 | 1504687.8125 | 3 |
| 10 | do | 35 | 1154687.8125 | 4 |
| 11 | do | 45 | 704687.8125 | 5 |
| 12 | do | 55 | 154687.8125 | 6 |
| 13 | do | 65 | Overdraft | 7 |
| 14 | Add | 65 | 154687.8125 | 6 |
| 15 | Shift | 60 | 154687.81250 | |
| 16 | Subtract | 605 | 94187.81250 | 610.0000000 |
| 17 | do | 615 | 32687.81250 | 620. |
| 18 | do | 625 | Overdraft | 630. |
| 19 | Add | 625 | 32687.81250 | 620. |
| 20 | Shift | 620 | 32687.812500 | |
| 21 | Subtract | 6205 | 26482.812500 | 621. |
| 22 | do | 6215 | 20267.812500 | 622. |
| 23 | do | 6225 | 14042.812500 | 623. |
| 24 | do | 6235 | 7807.812500 | 624. |
| 25 | do | 6245 | 1562.812500 | 625. |
| 26 | do | 6255 | Overdraft | 626.0000000 |
| 27 | Add | 6255 | 1562.812500 | 625. |
| 28 | Shift | 6250 | 1562.8125000 | |
| 29 | Subtract | 62505 | 937.7625000 | 625.1 |
| 30 | do | 62515 | 312.6125000 | 625.2 |
| 31 | do | 62525 | Overdraft | 625.3 |
| 32 | Add | 62525 | 312.6125000 | 625.2 |
| 33 | Shift | 62520 | 312.61250000 | |
| 34 | Subtract | 625205 | 250.09200000 | 625.21 |
| 35 | do | 625215 | 187.57050000 | 625.22 |
| 36 | do | 625225 | 125.04800000 | 625.23 |
| 37 | do | 625235 | 62.52450000 | 625.24 |
| 38 | do | 625245 | 00.00000000 | 625.25 |
| 39 | do | 625255 | Overdraft | 625.26 |
| 40 | Add | 625255 | 00.00000000 | 625.25 |
| 41 | Drop last "5" | 625250 | 00.00000000 | 625.25 |

*Note that the first "5" is subtracted in the order which held the right-hand digit of the leftmost group (of two) of the radicand.

It will be understood that as far as the mechanics of extracting square root is concerned, the steps numbered 13–14, 18–19, 26–27, 31–32, and 39–40 above, could be modified by stopping operation when it was seen that the next keyboard value would exceed the value in the corresponding orders of the register and thus cause an overdraft. The value in the tens order could then be raised by "1," and the register shifted one order to the left as before. The value in the lowest order is then erased and a "5" is inserted in the next lower order and operation continued as above described. This alternative method is essentially as that described above but has two disadvantages over the preferred method first shown:

1. It is easier to sense an overdraft in conventional calculators than it is to determine in advance whether the value on the keyboard can be subtracted from the value in the register, and this is true regardless of whether a machine is being operated manually, or under the control of an automatic mechanism as will hereafter be described. If the machine were being operated manually the operator would, at each cycle of operation, have to compare the value standing on the keyboard and those remaining in the register before determining whether to subtract again. On the other hand if he operates to an overdraft the subtraction causing the overdraft will be registered by the ringing of a bell which will notify the operator that an additive corrective cycle should be inserted.

2. It is more confusing, mentally, in manual operation, and more difficult, mechanically, in automatic operation, to raise the value in the tens order of the value standing in the keyboard than it is to merely correct the overdraft, shift the carriage and permit the value standing on the keyboard, other than in the lowest order of the divisor, to remain as it was when the overdraft was caused.

It will be understood also, that as far as the mechanics of extracting square root is concerned, the steps listed under paragraphs "A" and "C" above, could be modified by shifting the carriage to a position determined by the decimal point of the radicand, and invariably initiating the extraction operation in a selected order. Specifically, we have found it simpler mechanically to shift the carriage to the extreme right-hand position when the radicand contains no whole numbers or an even number of whole digits, and to the next to the extreme right-hand position when the radicand contains an odd number of whole digits; and then, after the entry of the radicand five times in such position, to shift, or attempt to shift, the carriage one further step to the right; and finally initiate the extraction operation in the 9th order of the selection mechanism. This method is somewhat more confusing than that described above, in the manual operation of square root on the conventional calculating machine, but is the better method to use in automatic operation. Basically the two operations are the same. Both initiate subtraction of the "5" from the proper order of the radicand factor. The first method operates by changing the keyboard order in which the first "5" is entered, as determined by the operator in setting off the radicand in groups of two, and the second by varying the carriage position in which the radicand is entered, as determined automatically by depression of a control key located at the decimal point of the radicand.

This latter method, which is simpler mechanically, is particularly illustrated by reference to the extraction of the square root of the numbers "62.5" and "625." In the first instance the radicand factor (5×62.5) is entered in the accumulator with the carriage in the extreme right-hand position and the first "5" is automatically inserted in the selection mechanism in the 9th order thereof. Thus, for the first cycle of operation we have the following subtraction:

$$312500000000000000000$$
$$-\phantom{0000000000}0500000000$$

In this problem the extraction starts with the subtraction "5" in the 18th order of the carriage.

In the second instance, the radicand factor (5×625.) is entered in the accumulator with the carriage one order short of the extreme right-hand position, the carriage is then shifted to the right to its extreme right-hand position, and the first "5" is again placed in the 9th order of the selection mechanism. Thus, in the first subtraction operation we have the following values:

$$031250000000000000000$$
$$-\phantom{0000000000}0500000000$$

The extraction again starts with the subtraction of "5" in the 18th order of the carriage, but in this case the number is one order removed to the right by the shifting of the carriage following the entry of the number. This shift, incidentally, is provided by the regular right shift operation of the division aligner mechanism of the conventional "Friden" automatic calculating machine, for the machine is automatically thrown into a division operation at the termination of the entry of the radicand factor.

It will be obvious from the above description of this process that it has certain advantages over the process described in the afore-mentioned application. In the first place, in the process utilized in that application it was necessary either to raise the divisor standing on the keyboard by "1," or to reduce it by "1" (depending upon whether operation was to the cycle before or the cycle after the overdraft).

It is believed obvious that the method used in our mechanism has four decided advantages over the odd integer method.

1. In the instant method the value that causes the overdraft is added back into the register to correct the overdraft and the value standing in all orders of the keyboard above the lowest, remain exactly as before. The only change in values is the complete erasure of the value of "5" standing in the lowest order and the insertion of a value of "5" in the order next below it.

2. The progression of values in the constantly changing divisor, or the progressively changing subtrahend, increases by consecutive numbers in the tens order of the selection mechanism then operable. It can be noted here that the extraction of square root can be called either a multicycle subtraction or a division, for just as division is a series of continuous subtractions of the divisor, the operation in the extraction of square root can be considered either as a division with a constantly changing divisor, or as a continued subtraction with a progressively changing subtrahend. In the prior machine it was necessary to subtract a value of "1" in the first cycle of operation in each order, and to thereafter increase the previous value by "2," in order to subtract consecutive odd numbers. In the instant method a value of "5" is placed in the lowest order, and that value stands throughout the ordinal series of operations. Progression takes place through a change of values in the next higher, or tens order, beginning with "0" in the first cycle and increasing by the value of "1" in each succeeding cycle. It will be obvious that it is easier to progressively change the subtrahend, or divisor, in a selected order, by "1" beginning with "0" in each cycle of operation, than it is to provide for the subtraction of consecutive odd numbers from the "1" to "19."

3. In the third place it was necessary in the method utilized in the prior application to provide for a tens-transfer in the power mechanism which drives the selection mechanism, so as to provide for a change of value in the constantly changing subtrahend from "9" to "11." It will be recalled that in the prior method the value subtracted, being consecutive odd numbers, could run from "1" to "17" on the 9th cycle of operation. In the instant method the value of "9" in the tens order is not reached until the 10th cycle of operation. Obviously there can be no more than nine subtractions in any order of operation, so that there is no necessity for effecting a transfer in the selection mechanism.

4. A further advantage of our invention lies in the fact that the value standing in the keyboard, or selection mechanism, is exactly the value which stands in the counter, or quotient register. That is, the value standing in the selection mechanism is the root, as well as the amount registered in the counter. With the present machine, therefore, it is possible to immediately use the root as a keyboard value without manually inserting such value into the keyboard, as was necessary in the above-mentioned application. In this connection it can be mentioned that as the root may be retained in the keyboard, it is immediately possible to extract the square root of the root—or the 4th root of the original radicand. By this means it is possible to extract any root that is a geometrical progression of square root, such as 4th root, 8th root, and the like.

Our invention is directed to doing, in an automatic manner, the sequences of steps described above, which, briefly stated, comprises:

1. Shifting the carriage to the proper ordinal position.
2. Multiplying the radicand by "5."
3. Progressively subtracting, in consecutive cycles of operation, the values of "5," "15," "25," "35," etc.
4. Sensing an overdraft.
5. Initiating a corrective additive cycle.
6. Initiating a single left shift of the carriage to the left.
7. Again initiating a series of subtractive cycles in which the "5" of the previous keyboard value is erased and "5" inserted in the next lower order; again progressively changing the last two orders of the subtrahend to "15," "25," "35," etc., without changing the orders above the lowest two.

Another object of the present invention is to provide an automatic square root mechanism in which the value standing in the selection mechanism at the end of an ordinal operation is permitted to remain unchanged, without reduction or addition thereto other than in the lowest order thereof.

Another object of the present invention is to provide a mechanism for the automatic extraction of square root which eliminates the necessity of a transfer of values between adjacent orders of the selection mechanism.

Still another object of the present invention is to provide a mechanism suitable for the automatic extraction of square root adapted to use a regular progression by the value of "1," i. e. by consecutive numbers beginning with "0."

Another important object of the present invention is to provide a mechanism for the automatic extraction of square root which leaves the root standing in the selection mechanism at the end of the extraction operation.

A further object of the present invention is to provide a foolproof mechanism by means of which square root can be extracted automatically, quickly and accurately, the operation being initiated by depression of a key which conditions the machine for control by the square root mechanism and initiates the operation thereof in the proper order.

When viewed from another angle, an object of our invention is to provide a mechanism for a calculating machine which is operative, when desired, to automatically and progressively change the lowest two orders of the divisor in a division operation, by the value of "5" in the lowest order and to progressively change the value in the next to the lowest order by "1" with each cycle of machine operation, beginning with "0."

It is another object of our invention to provide an improved means to automatically initiate the sequential subtraction of a series of progressively changing numbers in the proper order, depending upon the position of the decimal point in the original factor, or radicand.

These and other objects of our invention will be apparent from the description and claims which follow.

For purposes of disclosure the invention will be shown and described as embodied in a machine of the type disclosed in the patent issued to Carl M. F. Friden on January 28, 1941, No. 2,229,889, as modified by the patent issued July 2, 1946, No. 2,403,273, the copending application of Anthony B. Machado, S. N. 251,311, filed October 15, 1951, and the patent of Anthony B. Machado et al., No. 2,653,765, issued September 29, 1953. It will be understood however, that the the invention is not limited to incorporation such a machine, as it can be incorporated or applied to other commercial calculating machines on the market. It will be understood therefore, that the machine shown in the accompanying drawings and described herein is for purposes of exemplification only, and that the invention is not limited thereto.

Parts of the mechanism disclosed in the above patents associated with the mechanism of this invention are disclosed herein in order to show the environment of the novel structure. It will be understood that in these views many mechanisms and parts not associated with the mechanism of the present invention are eliminated for simplification, only those parts being retained which cooperate with the novel mechanism of the instant machine. For a full disclosure of any of these mechanisms shown and herein briefly described, or for related mechanisms not shown or described, reference is made to the aforementioned patents and applications, or others which may be referred to particularly hereafter.

It is believed that the invention will be more readily understood by a reference to the drawings which form a part of this specification and in which:

Fig. 1 is a plan view of the calculating machine in which, for purposes of exemplification, the present invention is incorporated, showing particularly the eleven buttons across the front of the machine (aligned with the decimal point markers between the ordinal rows of keys of the keyboard) by means of which the automatic extraction of square root is initiated.

Fig. 2 is a longitudinal cross-sectional view of the machine such as taken between the first and second orders of the machine, along the plane indicated by the line 2—2 of Fig. 1, with certain parts broken away in order to more clearly show the conventional selection and actuating mechanism and the carriage containing the accumulator and counter dials, and showing in addition, a cross-section view of the square root control mechanism of our invention, also taken on a plane between the first and second orders thereof.

Fig. 3 is a right side view of the frame plate of the machine showing conventional control mechanism, taken along the vertical planes adjacent that indicated by the line 4—4 of Fig. 1, and looking toward the left.

Fig. 4 is a left side view of the right-hand control plate, along the planes indicated by the line 4—4 of Fig. 1, and looking toward the right, showing particularly the division mechanism of the machine in which the preferred form of our invention is associated.

Fig. 5 is a right side view of the right control plate shown in Fig. 4, showing other details of the division mechanism.

Fig. 6 is a plan view of the division control and division aligning mechanism of the machine with which our invention is preferably associated.

Fig. 7 is a rear view of the machine showing certain conventional parts of the machine and also mechanism for controlling the entry of the radicand factor into the accumulator.

Fig. 8 is a left side view of the right supporting plate, showing a portion of the mechanism mounted thereon, and particularly the means for clearing the keyboard and the means for clearing the square root extraction mechanism, as well as the conventional keyboard lock, such as along the vertical plane indicated by the line 8—8 of Fig. 1.

Fig. 9 is a plan view of a detail of a portion of Fig. 8, showing the keyboard clearing and keyboard locking mechanism, taken along the planes indicated by line 9—9 of Fig. 8.

Fig. 10 is another view of the left side of the right supporting plate along the same plane as Fig. 8, but showing details of other mechanisms there located, particularly the controls for power operation of the automatic single cycle mechanism.

Fig. 11 is a plan view of the mechanism for controlling the shifting of the carriage and the automatic power clearing in operations to be described.

Fig. 12 is a left-hand view of mechanism essential to the dividend entry mechanism which, in our invention, controls the automatic entry of the radicand factor from the keyboard into the accumulator and the initiation of the extraction operation.

Fig. 13 is a right-hand view of a portion of the mechanism shown in Fig. 12.

Fig. 14 is another right-hand view of the dividend entry mechanism, showing the mechanism in its full-cycle position.

Fig. 15 is similar to Fig. 14, showing the parts in their position during a dividend entry operation prior to the entry of the dividend, which mechanism is utilized for the proper entry of the radicand factor in the extraction of square root.

Fig. 16 is a front view of the tabulating control mechanism associated with the dividend entry mechanism shown in Figs. 12 to 15 inclusive.

Fig. 17 shows mechanism associated with the tabulating controls determinative of radicand entry in the extreme right-hand or next to extreme right-hand position of the carriage.

Fig. 18 is a right side view of the front portion of the keyboard frame, showing means for initiating a square root extraction operation.

Fig. 19 is a right side view of the rear portion of the mechanisms shown in Fig. 18.

Fig. 20 is another right side view of the rear portion of the keyboard frame, with some parts shown in full line in Fig. 19 removed so as to clearly show additional mechanism operative in the extraction of square root.

Fig. 21 is a detail showing the square root extraction control key, lying to the right of any even order of the keyboard, and the mechanism operated thereby.

Fig. 22 is a plan view of the mechanism shown in Figs. 19 and 20.

Fig. 23 is a detailed front view showing the actuator for clearing the square root extraction control, or programming, mechanism, being taken on the plane indicated by the line 23—23 of Fig. 42.

Fig. 24 is a detailed view of mechanism utilized to clear the tabulating mechanism from any preset condition, which is necessary as a part of the entry of the radicand factor in the proper order, taken along the vertical planes indicated by the lines 24—24 of Fig. 1.

Fig. 25 is a left-hand view of the machine, with the covers removed, showing the mechanism utilized to control the entry of the radicand factor into the accumulator and to initiate the extraction operation, such as taken along the vertical plane indicated by the line 25—25 of Fig. 1.

Fig. 26 is a detailed view of the feed mechanism shown in Fig. 25.

Fig. 27 is another view of the feed mechanism shown in Fig. 26, with certain parts removed for clarity.

Fig. 28 is an enlarged view of the drive mechanism shown in Fig. 26, showing the mechanism after the square root extraction key has been depressed but before the machine has started the entry of the radicand factor.

Fig. 29 is a plan view of the elements shown in Fig. 28.

Fig. 30 is a front view of the drive mechanism shown in Fig. 28, showing the parts in the normal position shown in Fig. 28.

Fig. 31 is similar to Fig. 30, but shows the parts in their adjusted position corresponding to the position shown in Fig. 32.

Fig. 32 is a side view of the drive mechanism, similar to Fig. 28, but showing the parts in their adjusted position at the beginning of the first cycle for the entry of the radicand into the accumulator.

Fig. 33 is another right-hand view of the machine similar to Fig. 25, but with certain parts removed in order to clarify the mechanism, and with the parts shown lying in the position they assume at the end of the fifth additive cycle used for the entry of the radicand factor into the accumulator.

Fig. 34 is a detail of the restoring mechanism shown partly in dotted lines in Fig. 33, on an elevation taken immediately to the right of the supporting plate shown in Fig. 33.

Fig. 35 is a detail drawing showing the position of the initiating mechanism on the right side of the machine, with the control mechanism in the position shown in Fig. 33.

Fig. 36 is a plan view of mechanism operative to condition the square root programming mechanism for operation to extract square root, taken along a plane parallel to the top of the machine as indicated by the line 36—36 of Fig. 37.

Fig. 37 is a front view of the mechanism shown in Fig. 36, and additional driving mechanism therefor, taken on the plane perpendicular to the top of the machine as indicated by the line 37—37 of Fig. 25 and lying to the right of the mechanism shown in Fig. 25 as indicated by the line 37—37 of Fig. 1—certain immaterial parts having been omitted for purposes of clarification.

Fig. 38 is a detail drawing showing the means for rocking the 10th order gear engaging arm to permit initiation of the square root extraction operation, being taken along the vertical plane indicated by the line 38—38 of Fig. 37.

Fig. 39 is a right-hand view of the feed mechanism taken on the vertical plane indicated by the line 39—39 of Fig. 37.

Fig. 40 is a view of the cam shaft positioning mechanism, taken along the vertical planes indicated by the lines 40—40 of Fig. 37.

Fig. 42 is a longitudinal cross-sectional view through the square root programming mechanism taken on the plane indicated by the lines 42—42 of Fig. 41.

Fig. 43 is a detail of the selection slide positioning means associated with our invention.

Fig. 44 is a side view of the selection slides and the square root positioning slide of our invention, at the start of operation in any order.

Fig. 45 is the same as Fig. 44, but shows the parts in the position in which they are located at the end of the 6th cycle of operation, in which the selection slide value stands at "5."

Fig. 46 is a detail plan view of the parts shown in Figs. 44 and 45.

I. GENERAL DESCRIPTION

The present invention, in its preferred form, is an improvement on a calculating machine of the type disclosed in U. S. Patent No. 2,229,889 issued to Carl M. F. Friden on January 28, 1941, and is illustrated as applied to the present commercial machine made according to the teachings of that patent. Various mechanisms will be referred to herein which are improvements on that patent, and in such cases the patents will be specifically mentioned by name. In order to simplify this disclosure such mechanisms as are conventional in the mentioned patents will be referred to as briefly as possible to explain the novel mechanism of our invention, or to illustrate its operation.

Figure 1:
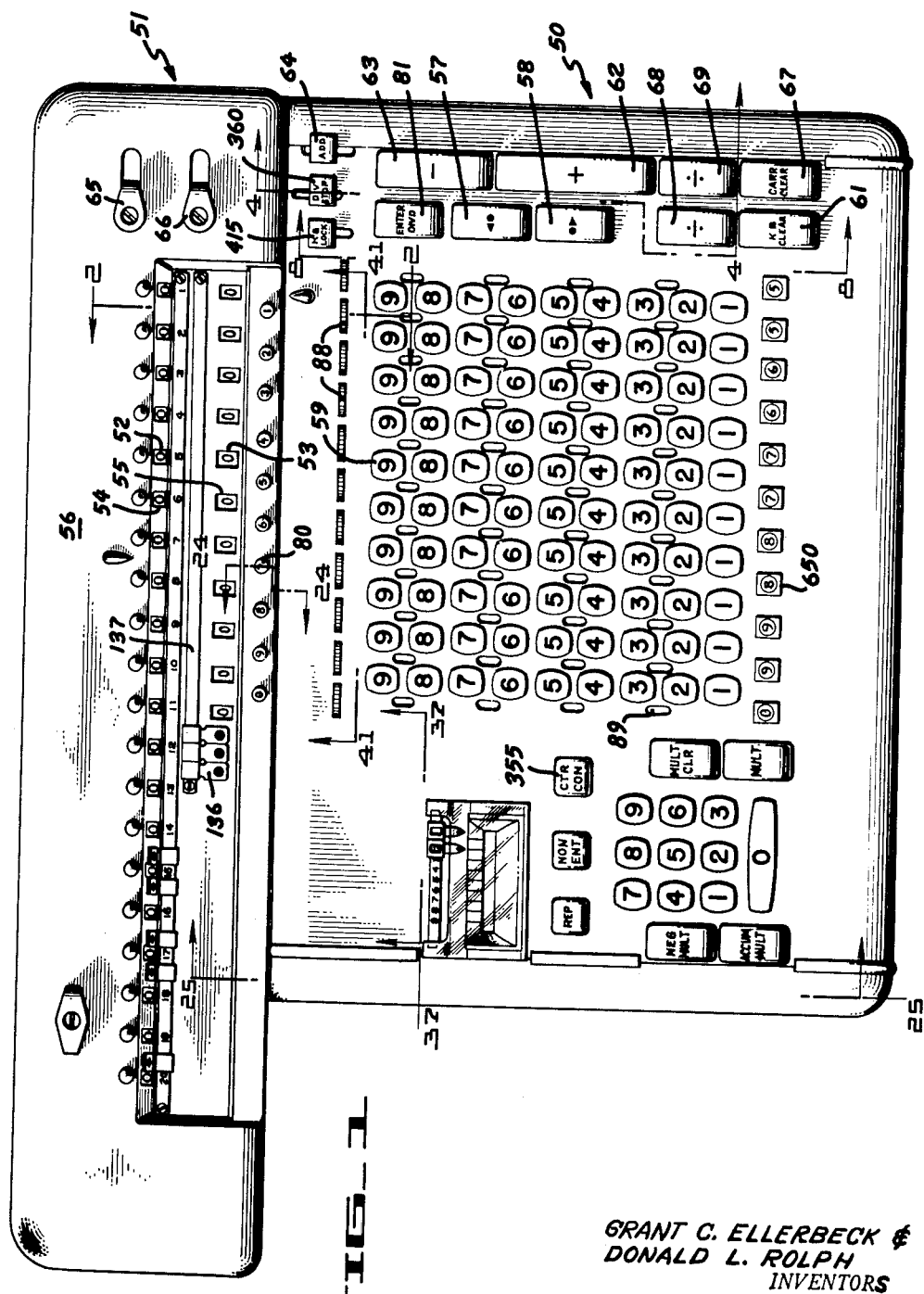

Referring to Fig. 1, the calculating machine incorporating the present invention includes a main body portion 50 containing the actuating, selecting and control mechanisms of the machine and an accumulator and revolutions counter carriage 51 which is mounted for endwise shifting movement transversely of the body portion 50. The carriage 51 has mounted therein a series of accumulator dials 52 and also a group of revolutions counter dials 53 which are viewable through suitable windows 54 and 55, respectively, provided in the cover 56 of the carriage. The carriage may be shifted by power in either direction across the machine by manipulation of a left shift key 57 and a right shift key 58 located on the right-hand side of the machine.

Numerical values may be entered in the machine by depression of appropriate numeral keys 59 of a conventional amount keyboard, the keys being resiliently urged to a raised position by suitable springs, not shown, and latchable in a depressed operative position. The values set in the keyboard may be released by depression of a clear key 61. The various values set up on the keyboard may be registered additively or subtractively on the accumulator wheels 52 by the depression of a plus key 62 or a minus key 63, respectively. If it is desired that the keyboard be cleared after each registration of a number in the accumulator, an add key 64 may be operated and latched in the well-known manner.

The accumulator wheels 52 and the revolutions counter wheels 53 may be cleared or reset by zero by manipulation of manually operable reset knobs 65 and 66 respectively, these knobs being mounted for lateral sliding movement in the framework of the carriage. Alternatively, the wheels 52 and 53 may be zeroized by power through the depression of a register clearing key 67.

The machine is adapted to perform automatic division operations by manipulation of a division key 68 which controls a division mechanism similar to the type described in U. S. Patent No. 2,327,981. A counter reversing key 69 is conventionally placed laterally adjacent the division key 68 so that both may be depressed by a single finger stroke. The counter reversing key is depressed whenever a true, or positive, quotient is desired.

The machine is also provided with a group of ordinally arranged tabulator keys 80 and a dividend entry key 81 for effecting the entry of a dividend set up on the amount keys 59 into the accumulator wheels 52 in any selected ordinal position of the carriage. This mechanism is fully shown and described in U. S. Patent No. 2,403,273 issued to Carl M. F. Friden et al., on July 2, 1946, and reference is made to this patent for a detailed explanation of the dividend entry mechanism, although it will be briefly described hereafter. It can be mentioned here, that in the preferred form of our invention, this mechanism will be utilized to permit the radicand to be inserted in the keyboard, with the carriage in any starting position. Thereafter the depression of a square root initiating key will cause the registers to be cleared, the carriage to be shifted to the proper position, the radicand factor (five times the radicand set in the keyboard) to be set into the accumulator, and the extraction operation initiated.

a. Keyboard mechanism

The main operating mechanisms of the machine are supported for the most part on or between a right side frame 82 and a left side frame 83 (Figs. 6 and 7), which frames are secured to a base not shown, which base also serves to support the electric driving motor and other elements of the machine. The right and left side frames are interconnected by means of various cross-frame members including crossbars 84, 85, and 86 (which are shown in cross-section on Fig. 2).

Associated with each order of the keys 59 of the keyboard is a latching slide 90. These slides are provided with apertures 91 through which the key stems 59 extend. These latching slides are normally urged to the front of the machine (toward the left in Fig. 2) by means of springs, not shown. Each key stem 59 carries a cam projection 92 and a notch 93 associated with each aperture. As a key is depressed, the cam forces the latching slide rearwardly (to the right in this figure), thereby releasing any key in that order which may have been latched in a depressed position. When the key reaches its fully depressed position the notch 93 lies opposite the latching slide 90 whereupon the latch is spring-pressed forwardly so that it engages the notch and locks the slide in the depressed position. It can be mentioned here that if the latching slide 90 is locked against rearward translation, by any suitable means, the key cannot be depressed.

Associated with the keyboard just described are conventional decimal markers ordinally arranged between the respective rows of keys. In the machine used for exemplification herein, these markers comprise polygonal rods (not shown) extending along the underside of the machine cover. These rods have one side painted in a color contrasting to that of the machine cover and other sides painted the same as the machine cover. These rods are viewable through ordinally arranged apertures 89 and are positioned by means of knobs 88. It can be mentioned at this point that the registers are also provided with decimal markers, which in the preferred form comprise tabs 136 provided with contrasting decimal points as shown. These tabs are movable parallel to their respective registers, being mounted on rails 137 and are adapted to either cover, or lie between, adjacent windows such as 55 and 54 of the carriage cover.

b. Keyboard clear mechanism

It is conventional in machines of this type to provide means for clearing or erasing all the values standing in the keyboard as by depression of the single keyboard clear key 61, or automatically in certain circumstances. It has already been mentioned that the value keys 59 are latched, when depressed, by an ordinal latch 90. Many machines are provided with ordinal keyboard releasing keys, but in view of the limited space available in the front of the present Friden machine, we have preferred to eliminate these ordinal clear keys, and to use in place thereof the conventional operation of inserting the correct value where an error is made in some order in the entering of the keyboard factor. The conventional keyboard clearing mechanism is shown in Figs. 8, 9 and 3, and comprises the key 61 and integral stem which are mounted for substantially vertical movement on the right-hand frame plate 82. The lower end of the key stem engages one arm of a bellcrank 407 pivoted on shaft 408. An upper arm 409 of the bellcrank lies immediately in front of an ear 410 (see Fig. 3) of the transverse bail 95 which extends across the front of the keyboard. The bail 95 is pivoted on the transverse shaft 98 and has a rearwardly turned flange 97 which is adapted, when the bail 95 is rocked rearwardly, to engage the turned-down ears 94 on the forward end of the latching slides 90. Thus, rocking of the bail 95 is effective to move all of the latching slides 90 rearwardly, thereby releasing all of the depressed keys 59 and thus clearing the value from the keyboard.

c. Keyboard lock

It is conventional in the machine herein described to provide what is known as a "keyboard locking mechanism," by means of which a value placed in the keyboard can be locked against change or release. While this mechanism per se has nothing to do with the extraction of square root, it is preferable to provide an interlock, by means of which the keyboard locking mechanism is either disabled or the extraction of square root prevented when the keyboard lock mechanism is in its operative position. It will be obvious that any operation which necessitates a continual change of values in the selection mechanism cannot be operative if a value is locked in the keyboard— either the machine will be jammed or the answer will be incorrect. The keyboard locking mechanism will therefore be briefly described although the interlock will not be described until the new mechanism of the instant invention is described. The keyboard locking mechanism conventionally comprises a button, and integral lever 415 (see Fig. 8), which is pinned, as at 416, to the right-hand frame plate 82. A forwardly extending link 417 connects the lever 415 to a three-armed lever 418, which is pivotally mounted, as by screw 419, on the frame plate 82 adjacent the forward part of the machine. The three-armed lever 418 is provided with a stud 420 adapted to cooperate with a detent bellcrank 421. The detent 421 is normally urged downwardly by a suitable spring 423, and is provided with a nose 422 which holds the stud in either the forward or rearward adjusted position. The rear arm of the three-armed lever is provided with an arcuate slot 425 which embraces a pin 426 carried by the right-angle arm 427 of a locking control link 428. The link 428 is pivotally mounted on a swinging arm 429, and the front end is supported by comb 437. The link is provided at its forward end with a camming slot 430 which embraces a pin 431 mounted on the right end of a locking slide 432. The locking slide is provided with alternate projections 435 and notches 436. When the keyboard lock button 415 is in its rearward position, the locking slide 432 lies in its left-hand position and the notches 436 lie behind the downwardly turned ears 94 of ordinal latching slides 90. In this position the rocking of the bail 95 is operative to move the latches rearwardly and release the keyboard. However, if the button 415 is in its forward position the link 428 is moved forwardly, whereby the cam notch 430 moves the pin 431 and its integral locking slide 432 to the right, so that a projection 435 lies behind each of the downwardly turned ears 94. In this position the locking slide 432 prevents movement of the ordinal keyboard latches and locks the value in the keyboard, preventing operation of the clearing mechanism. Preferably the forward end of the detent latch 421 is provided with an arcuate eccentric surface 424 which, in either extreme position of the three-armed lever, engages the slide 428 to provide a frictional holding latch, which is released as the pin 420 cams the detent clockwise in Fig. 8.

d. Selection and actuating mechanism

The values to be entered into the accumulator numeral wheels 52 may be determined by means of a plurality of similar selecting mechanisms associated with the amount keys 59. As shown in Fig. 2, each bank of amount keys cooperates with a pair of similar value selection bars 990 and 991 which are mounted for endwise movement by means of a suitable supporting linkage including links 100, the bars extending through suitable slots provided therefor in the forward crossbar 84. Each selection bar is provided with a plurality of cam faces 992 which are engaged by pins, or studs, 993 carried in the lower end of the value keys 59. The bar 990 carries such cam faces for operation by the "1" to "5" keys, and bar 991 is operated by the "6" to "9" keys.

Each selection bar 990 and 991 is provided at its rear end with an integral yoke that engages the grooved collar of a ten-tooth selection gear 101, slidably and nonrotatably mounted on a longitudinally extending square shaft 102 journalled in the crossbars 84, 85 and 86. Hence, the longitudinal movement of the bars 990 or 991, as differentially controlled by the numeral keys 59, serves to position the selecting gears 101 in the path of a series of stepped teeth provided on an actuating cylinder, or drum, 105 secured to a shaft 106 journalled between the crossbar 84 and a transverse supporting bracket 107. For each adjacent pair of key banks there is provided one longitudinally extending actuator shaft 106 bearing a pair of actuating drums 105. Each actuator shaft 106 is provided at its forward end with a bevel gear 108 which meshes with a corresponding bevel gear 109 secured to a transverse power shaft 110 journalled between the side frames of the machine. The shaft 110 is cyclically and unidirectionally operated by means of a clutch controlled driving means, hereinafter to be described, so as to provide a single path of power flow from the electric driving motor to the various power operated mechanisms of the machine.

Each of the square shafts 102 is provided on its rear end with a slidably but nonrotatably mounted spool 111 to which is secured a ten-tooth add gear 112 and a ten-tooth subtract gear 113, which gears are adapted to cooperate with the similar ten-tooth gears 114 secured on the lower ends of accumulator numeral wheel shafts 115.

When the machine is in its idle, or full cycle position, the gears 114 lie midway between the add and subtract gears 112 and 113 so as to permit lateral shifting movement of the carriage. The gears 114, in this case, are free to pass through the space existing between the gears 112 and 113.

In order to enable an amount set up on the keys 59 to be added into the accumulator wheels 52, the spools 111 and integral gears 112 and 113 are shifted toward the rear of the machine (clockwise in Fig. 2) so as to engage the add gears 112 with the accumulator gears 114. This shifting of the gears is accomplished by means of a flat bar, or gate, 116 extending transversely of the machine and lying within the space provided between the add-subtract gears 112, 113. The gate 116 is supported at either end by a pair of similar arms 117 secured to a transverse gate shaft 118 journalled in the side frames 82 and 83. The shaft 118 may be rocked clockwise as viewed in Fig. 2 in a manner hereinafter to be described so as to cause engagement of the add gears 112 with the gears 114 or, alternatively, the shaft 118 may be rocked counter-clockwise so as to result in engagement of the subtract gears 113 with the gears 114.

e. Tens-transfer mechanism

Secured to the lower end of each of the numeral wheel shafts 115 is a tens-transfer cam 120 which is adapted to cooperate with a transfer lever 121, the lever being mounted on a bearing stud 122 which is journalled in the main frame bar 123 of the carriage. On the outer end of the transfer lever 121 there is provided a downturned ear 124 which lies between a pair of flanges 125 provided on the hub 126 of a tens-transfer gear 127 located in the next higher order of the machine. The hub 126 and gear 127 are slidably, but nonrotatably, mounted on the square shaft 102, whereby rotation of the gear 127 will be transmitted through the add-subtract gears 112, 113 to the numeral wheel shaft 115. Whenever the accumulator wheel 52 passes from "0" to "9," or from "9" to "0," a nose on the transfer cam 120 will rock the transfer lever 121 and move the ear 124 forwardly so as to move the transfer gear 127 of the next higher order into the path of a single transfer actuating tooth 128 formed on a disk 129 secured to the actuator shaft 106. The single tooth 128 will thereby cause one step of movement to be given to the square shaft 102 in addition to the normal movement imparted thereto by the actuating drum 105. The accumulator wheel 52 will thus be advanced one step so as to effect the tens-transfer from one order to the next higher order as required.

After the tens-transfer has been effected, the transfer gear 127 will be restored to its normal position by means of a restoring cam 130 secured to the actuator shaft 106. This restoring cam operates on the forward end of a detent pin 131 which is mounted for sliding movement in the crossbar 107 and in a transverse supporting bracket 132. The pin 131 carries a pair of spaced flanges 133 which embrace one of the flanges 125 provided on the hub 126 of the transfer gear 127, so that when the pin is cammed rearwardly, the gear 127 will be restored to its normal position.

f. Revolutions counter

As shown in Fig. 2, each of the revolution counter numeral wheels 53 is secured to a longitudinally extending shaft 138 journalled at its rear end in the frame bar 123 and at its forward end in a channel bar 139 which forms a part of the framework of the carriage 51. Secured to each of the shafts 138 is a gear 140 which is arranged to cooperate with a revolutions counter actuating mechanism 141 for operating the numeral wheels 53 in such a manner as to provide a count of the cyclic operations of the calculating machine and also for causing a unit to be transferred from a lower order to a higher order each time a wheel 53 passes through zero.

The revolutions counter mechanism is fully shown and described in the above-mentioned Patent No. 2,229,889 to which reference may be had for a more complete disclosure of this part of the machine.

g. Register clearing

The registers may be cleared, or zeroized, manually or by power operation from depression of the carriage clear key 67 (Fig. 1), by means of conventional mechanism. As shown in Fig. 2, the accumulator shafts 115 are provided with mutilated clearing gears 134, the gears on alternate shafts being placed in staggered relationship as shown. If a register dial 52 is out of zero position, movement of the associated rack 135 causes rotation of the mutilated gear and dial assembly until the mutilated portion is reached, whereupon the rotation is stopped by a suitable stop bar, not shown. Similarly, the counter or quotient register dials 53 may be returned to zero position by longitudinal operation of the rack 143 which cooperates with the staggered mutilated gears 142 placed on the shafts of the counter dials, as shown. These racks may be operated by hand by the knobs 65 and 66, respectively, shown in Fig. 1, or either or both may be selectively operated through depression of the carriage clear key 67 by means not here pertinent or in certain automatic operations which will be mentioned hereafter.

h. Motor drive

In order to effect registration in the accumulator of the value set up on the amount keys 59, the actuator shafts 106 are operated in a cyclic fashion by means of a clutch controlled drive from the electric motor (not shown) of the machine. As shown in Fig. 3, the armature shaft 145 of the motor has secured thereto a pinion 146 which meshes with an idler gear 147 which in turn meshes with a large gear 148 journalled on the transverse power shaft 110. The gear 148 is provided with a hub to which is secured a driving clutch element, or ratchet (not shown). A driven clutch element 149 is secured to the shaft 110 and has pivoted thereon a spring-urged clutch pawl 150 which is provided with a tooth which is adapted to engage with the teeth of the ratchet for establishing a driving connection between the gear 148 and the power shaft 110. The pawl 150 is normally spring-urged into drive-engaging relationship with the ratchet, but is restrained in the open, or full cycle, position by means of a clutch control lever 151 pivotally mounted on a screw 152 fastened to the right side frame 82. The lever 151 carries a roller 153 which seats in a depression formed on the driven clutch element 149 in the full-cycle position thereof, and in all other positions of the element 149 maintains the lever 151 in its clutch-engaging position. It will be seen therefore that one or more cycles of the actuator shafts 106 may be determined by proper control of the lever 151.

Simultaneous with the movement of the lever 151 in a clockwise direction, as viewed in Fig. 3, so as to cause engagement of the clutch, the electric circuit for the driving motor will be established. For this purpose the upper end of the lever 151 is connected by suitable means, such as a link 155, with the upper end of a switch 156 pivotally mounted on a screw 157 secured to the right side frame. The link 155 is pivotally secured to levers 151 and 156 by suitable means, such as studs, or rivets, 154 and 158, respectively. The lower end of the lever 156 carries a long stud 159 which extends through an aperture in the frame plate 82 and on its free, or inside, end pivotally supports the front end of a switch control link 160. Forward translation of link 160 closes the motor switch, not shown, and thus energizes the motor, not shown. Thus, clockwise movement of the clutch control lever 151 will also cause clockwise movement of the lever 156 so as to close the electric circuit for the motor. It will be observed that the roller 153 in maintaining the control lever 151 in its clutch-engaging position throughout the machine cycle will also serve to maintain the switch closed, so that the motor circuit can be interrupted only in the full-cycle position of the parts.

i. Plus and minus keys

Referring to Fig. 4 of the drawings, it will be observed that the plus key 62 and the minus key 63 are both slidably mounted on a control, or auxiliary side, plate 165 mounted on the right-hand side of the right side frame 82 by means of suitable screws and spacing sleeves. The keys 62 and 63 are provided with roller studs 166 and 167, respectively, which cooperate with oppositely inclined cam faces 168 and 169, respectively, provided on a gate setting slide 170. This member is pivotally connected at either end to the upper ends of arms 171 and 172 (Figs. 4 and 5), the arm 171 being pivoted on the control plate 165 while the arm 172 is rigidly secured to the right-hand end of the gate shaft 118. Hence, when the plus key 62 is depressed, the member 170 will be moved rearwardly so as to rotate the gate shaft 118 in a clockwise direction, as viewed in Figs. 2 and 5, thereby causing the add gears 112 to be engaged with the accumulator gears 114 on the numeral wheel shafts 115. In a similar manner, depression of the minus key 63 will cause forward movement of the member 170, thereby rocking the gate shaft 118 counter-clockwise so as to engage the subtract gears 113 with the gears 114.

In order to initiate operation of the drive mechanism of the machine when either key 62 or 63 is depressed, each of these keys is provided with a half-round stud 173 which is adapted to cooperate with an associated cam face 174 provided on a cycle-initiating, or clutch, slide 175. The forward end of this slide carries a long stud 176 so that when either of the keys are depressed, the slide and its stud will be moved rearwardly. The stud 176 extends to the left to adjacent the right frame plate 82 (see Fig. 3). This stud is embraced in a slot 177 in a forwardly extending link 178 which constitutes the control link of the conventional "add" key mechanism. This link 178 is also pivotally mounted on stud 158 which pivotally connects link 155 to lever 156. Thus, rearward translation of slide 175, through pin 176, moves link 178 rearwardly, thereby rocking the clutch control lever 151 (clockwise in Fig. 3) so as to engage the clutch and close the switch. This will cause the electric driving motor of the machine to be energized and the power shaft 110 to be rotated, thereby driving the actuator shaft 106 to which are secured the actuating cylinders 105. Hence, the amount set on the keys 59 will be run into the accumulator wheels 52 in either a positive or negative direction depending on which of the keys 62 or 63 is depressed.

j. Carriage shift mechanism

Means are provided for shifting the carriage 51 selectively in either direction through one or more ordinal spaces, and the shifting means is preferably operated from the actuator shafts 106, and can be controlled manually by depressible shift keys 57 and 58 (Fig. 1). These keys, and the mechanism controlled by them, are fully shown and described in U. S. Patent No. 2,380,642 issued to Carl M. F. Friden et al., on July 31, 1945. The manually controlled shifting mechanism is conventional and has no particular connection with the mechanism of our invention, so will be only briefly described.

The shift keys 57 and 58 rock levers 70 or 71, respectively (see Fig. 11). The levers are respectively secured to the transverse shaft 72 and sleeve 73. An arm 74 is mounted on the sleeve 73, and carries a rearwardly-extending link 75 provided with a pressure face, not shown, engaging the forward end of the right shift rod 181. Similarly an arm 76 is mounted on the shaft 72 and carries a pusher link 77 engaging the front end of the left-hand shift rod 180. Thus depression of the shift key 57 or 58 rocks the arm 76 or 74, respectively, which in turn move the left shift rod 180 or right shift rod 181 rearwardly to cause engagement of the shift clutches as herein described.

The push rods 180 and 181 are normally maintained in their forward, or inactive, positions by means of compression springs 182, while the rear ends of the rods, as shown in Fig. 6, carry shifting forks 185 and 186 which engage annular grooves cut in clutch members 187 and 188. The members 187, 188 are slidably journalled on the rear ends of the two rightmost actuator shafts 106 and are provided with clutch teeth 189 and 190 which engage corresponding notches provided in collars 191 and 192 rigidly secured to the rear ends of the actuator shafts 106. The members 187 and 188 are also provided on their rear ends with clutch teeth 193 and 194 which are adapted to cooperate with clutch teeth 195 and 196 formed on the forward ends of gear sleeves 197 and 198, when either the clutch member 187 or the clutch member 188 is moved rearwardly by its associated shift fork 185 or 186. Hence, it will be seen that the coupling members 187 and 188 provide a means whereby the actuator shafts 106 may be selectively coupled to the gear sleeve 197 or 198, and thereby provide a power drive for the carriage shift mechanism. Hence, depression of the left shift key 57 moves the push rod 180 and the shift fork 185 toward the rear of the machine and thereby causes the coupling member 187 to establish a driving connection from the second rightmost actuator shaft 106 to the gear sleeve 197. In a similar manner, depression of the right shift key 58 moves the shift rod 181 and shift fork 186 rearwardly to establish a driving connection between the rightmost actuator shaft 106 and the gear sleeve 198.

As seen in Fig. 6, the gear sleeve 197 carries a gear 199 which meshes directly with a larger gear 200 to which is secured a smaller gear (not shown) which meshes with a shift gear 201. The gear sleeve 198 carries a gear 202 which meshes with a wide idler gear (not shown) which meshes with the large gear 200 and causes reverse rotation of this gear. The gear sizes are so chosen as to provide a drive ratio of 1 to 4 between the gears 199 and 202, and the shift gear 201 so that for each rotation of the gear sleeve 197 or 198, the shift gear 201 will be rotated through an angle of 90 degrees.

The shift gear 201 is secured to a shaft which is journalled between the crossbar 86 and a plate 203 mounted on the rear of the machine. Secured to the same shaft as the gear 201 is a drive plate 204 which carries four equally spaced drive pins 205 which are adapted to engage with notches 206 (Fig. 7) provided in a shift rack 207 secured on the rear of the carriage 51. Hence, for each 90 degrees of rotation of the drive plate 204 the carriage will be shifted through a distance equal to the spacing between the notches 206, which is equal to the distance between the numeral wheel shafts 115 (Fig. 2). In other words, the carriage will be shifted one ordinal space on each cycle of operation of the power shaft 110.

The mechanism just described and claimed is modified, as shown in the patent of Machado et al., No. 2,653,765, to provide for automatic shifting of the carriage to the right upon depression of the division key 68. This shifting continues until the dividend in the carriage is properly aligned with the divisor set in the keyboard. Thereafter the division mechanism automatically controls shifting of the carriage to the left, order by order as the division operation progresses. This mechanism will be described under the heading of "Division aligner mechanism" hereafter.

Means are provided for disabling the control of the shift keys 57 and 58 whenever the carriage reaches either respective extreme end positions. For this purpose means are provided for lifting the pushers, or, interponents 77 and 75 between the manual shift control mechanism and the pusher rod 180 or 181, when the carriage reaches either its left end or its right end position. The disablement of the left shift interponent 77 is under the control of lever 235 (Fig. 6) shaft 236, link 237 and a bellcrank lever 238 (Fig. 7) which is journalled on the gate shaft 118. This bellcrank lever has a rearwardly extending arm 239 which lies beneath the right-hand end of a lever 240 which is pivotally mounted on a screw 241 fastened to the crossbar 86. This lever is operated by an override pawl, not shown, on the right end of the carriage shifting rack 207, as fully described in said Patent No. 2,403,273 and need not be described here. Similarly the right shift mechanism is disabled by a lifting of the pusher 75 (Fig. 11), which operates under control of a lever 242 (Fig. 6), loosely journalled on the shaft 236, a pin 243 (Fig. 7), and lever 244. Lever 244 is rocked by lever 245 mounted on the lower end of a lever 246 pivoted on a plate 247 which is secured to the rear face of the crossbar 86 by means of suitable spacer sleeves and screws. The lever 246 has an upwardly extending arm which is provided with a formed-over ear 248 lying beneath an override pawl 249 which is pivotally mounted on the shift rack 207. When the carriage reaches its right end position, the shift pins 205 will cause the pawl to be rocked (clockwise as viewed in Fig. 7) thereby rocking lever 246 to move lever 245 toward the right. The lever 245 is provided with a cam face 250 which lies beneath a roller 251 mounted on the plate 247. Hence, when the lever 245 is moved toward the right, it will be rocked clockwise, thereby elevating the rear end of the lever 244 and disabling the shifting mechanism as explained in said patent.

k. Add key mechanism

It is conventional in machines of this kind to provide what is commonly known as an "add" key mechanism, that is, a mechanism which selectively limits the machine to single cycles of operation and normally such operation causes clearing of the keyboard at the end of each cycle of operation. This mechanism per se is not directly connected to the extraction of square root, or the mechanism required therefor. However, as our preferred form of machine utilizes the conventional dividend entry and tabulating mechanism, it is believed necessary to briefly mention the "add" key mechanism, as it must be disabled during the tabulating and entering of the radicand factor into the keyboard. Further, we use the "add" key to control the automatic clearing, of or not clearing the root from the selection mechanism. It will be recalled that, at the termination of extraction, the root stands in the selection mechanism as well as in the counter. If the root is to be used in the following operation it is desirable to retain it in the selection mechanism, otherwise it is better to clear it automatically. This selection is readily controlled by this mechanism.

The "add" key mechanism is, conventionally, under the control of a button or key 64 (see Fig. 1), the forward movement of which causes the forward translation of a control link 440 (see Figs. 3 and 10). The control link 440 is pivotally connected to a bellcrank 441 pivotally secured to the frame plate 82. The other arm of the bellcrank 441 engages a slide 442 mounted for vertical movement on the frame plate, so that forward movement of the link 440 depresses the slide 442. A pin 443 mounted on the slide 442 is embraced by a slot 444 (see Fig. 10) in a long link 445. The rear end of the link 445 is pivotally secured to a two-armed lever 446 pivotally mounted on the frame plate 82. The two-armed lever 446 is adapted to be rocked, toward the end of each cycle of operation, by a pin 447 mounted on the counter actuating cam 448 on the power driven main drive shaft 110. The lever and link are urged to their forward positions by a spring 449, as shown. The forward end of the link 445 is provided with a cam face 450 which engages a roller 451. Depression of the link 445, by depression of the slide 442, permits the link to move forwardly, while raising it forces it rearwardly so that the lower end of the two-armed lever no longer is engaged by the pin 447. The forward end of the link 445 is provided with a notch 452, which is adapted to engage a pin 453 on a lever 454, which is pivoted on long stud 419. A forwardly extending arm, or floating lever, 455 (see Fig. 3) is pivotally secured to the lever 454 by any suitable means, such as stud 456. This lever is resiliently urged to a raised position by a suitable spring, such as 457, tensioned between a stud 504 on the arm and a stud on the frame plate, not shown. The forward end of the floating arm, or link, 455 is provided with an upturned ear 458 which is adapted to engage the ear 410 on the clearing bail 95, when the floating link is in its normal raised position. However, the floating link 455 can be rocked (counter-clockwise in Fig. 3) to depress the ear 458 below the plane of the ear 410, so that the reciprocation of the floating link 455 is inoperative to rock the clear bail 95. This is accomplished by conventional means in division operations, but as that mechanism is entirely conventional, it will not be described.

The rocking of the lever 454 by the means just described is also utilized to limit the machine to single cycles of operation. This is accomplished by means of an interponent arm 460 (Fig. 10), which is engaged by the pin 453 when the lever 454 is rocked. The interponent lever 460 in turn rocks a lever 461 pivotally mounted on the long stud 419 (see also Figs. 3 and 8). The lever 461 carries a pin 462 (see Figs. 3 and 10) extending through an aperture in the frame plate 82, which pin is embraced in a slot 463 in the forward end of the clutch control link 178. Thus, the rocking of the lever 454 rocks the lever 461 (clockwise in Fig. 10), raising the pin 462. The raising of the pin 462 lifts the forward end of the link 178 (Fig. 3), so that its slot 177 is lifted from engagement with the pin 176 on the plus-minus slide 175. Thus, when the "add" key is in its forward position the clutch and switch control are disengaged from digitation control slide 175 (Fig. 4) and unless other means are used to retain the clutch engaged and the switch closed, the machine is limited to a single cycle of operation. It can be noted here that the clutch control link 155 (Fig. 3) is provided with a rather long ear 161, which is held by various means in different multicycle operations to retain switch and clutch operative.

l. Automatic division mechanism

The machine shown in the accompanying drawings is provided with a mechanism for enabling a dividend set up on the accumulator wheels 52 to be automatically divided by a divisor set up on the amount keys 59. The mechanism provided in the present machine for accomplishing this purpose is similar to that shown in Patent No. 2,327,981 to Carl M. F. Friden, and accordingly, only so much of the automatic division mechanism will be described herein as is necessary for a clear understanding of the present invention.

The operation of the automatic division mechanism controls the functioning of the machine so as to cause the divisor to be repeatedly subtracted from the dividend until an overdraft occurs in the accumulator. Thereupon the overdraft will be corrected and the carriage shifted one ordinal space to the left, whereupon the process will be repeated. The number of subtraction cycles effected in each order of the accumulator is registered in the revolutions counter so as to provide a visual representation of the quotient at the end of the problem. During division the machine is controlled by a program control device which becomes effective each time an overdraft occurs in the accumulator. This program device controls the program of operations of the add-subtract gears and the carriage shift mechanism so as to cause a predetermined sequence of operations to occur during uninterrupted cyclic operation of the actuating mechanism of the machine. The division operation is normally initiated by the depression of the division key 68 which causes the program control device to be operatively connected with the add-subtract gate and also with the carriage shift mechanism and, in addition, renders the overdraft control mechanism effective to control the cycling of the programing device.

As shown in Fig. 4, the division key 68 is slidably mounted on the control plate 165 by means of slots in the key stem which cooperate with screws secured to the control plate, so as to guide the key for vertical reciprocatory movement. The key is provided at its lower end with an inclined cam face 260 which bears against a roller 261 mounted on a division slide 262. This slide is supported for endwise shifting movement on the control plate 165 by means of elongated slots in the slide which cooperate with studs 263 secured to the control plate. As shown in Fig. 5 the slide 262 is provided with a roller 264 which lies in front of a finger 265 formed on the upper end of a latch 266 pivotally mounted at 267 on the right side of the control plate 165. The latch 266 is urged to rotate in a counter-clockwise direction by means of a spring 268 tensioned between the lower end of the latch and a stud 269 mounted on the control plate so as to normally maintain a shoulder 270 formed on the latch beneath a roller 271 secured to the forward end of a division setting actuator 272. The actuator 272 is pivotally mounted on the control plate at 273 and is urged to rotate in a counter-clockwise direction by means of a strong spring 274 which is tensioned between the actuator and the stud 269. The roller 271 is thereby maintained in engagement with the shoulder 270 of the latch when the parts are in their normal positions. However, when the division key 68 (Fig. 4) is depressed, the cam face 260 will engage the roller 261, thereby moving the slide 262 rearwardly, which, in turn causes the roller 264 to engage the finger 265 and rock the latch 266 rearwardly (clockwise in Fig. 5) to remove the shoulder 270 from beneath the roller 271 of the actuator 272. The actuator will thereupon be rocked counter-clockwise by the strong spring 274 so as to cause setting of the division control mechanism hereinafter to be described. The actuator 272 will be restored during the first cycle of operation of the machine by means of a roller 275 mounted on the face of an idler gear 307. The roller 275 is adapted to engage an inclined cam face 276 formed on an upwardly extending arm of the actuator 272 so as to cause the actuator to be rocked clockwise against the tension of the spring 274 when the machine is cycled.

Lying beneath the forward end of the actuator 272 is a roller 277 (see also Fig. 4) which is mounted on the lower end of a link 278 which is pivotally connected to the forward end of a connecting lever 279. This lever is pivotally mounted on a stud 280 carried by a cam follower arm 281 which is pivotally mounted on the control plate 165 at 282, and urged in a clockwise direction, as viewed in Fig. 4, by means of a spring 283. The arm 281 is provided with an aperture 284 within which is located an eccentric cam 285 mounted on a program control shaft 286. As described in the aforementioned Patent No. 2,327,981, this shaft forms an essential part of the program controlling device and is rotated during division operations to control the setting of the add-subtract gate and the operation of the carriage shift mechanism. These operations are performed in a predetermined sequence so as to cause the machine to carry out a division operation during continuous cycling of the machine.

The lever 279 is provided on its rear end with a bifurcation 287 for engaging a stud 288 secured to the gate setting slide 170. Thus, when the division key 68 is depressed to release the actuator 272 (Fig. 5), the roller 277 will be depressed and the connecting lever 279 will be rocked (clockwise as viewed in Fig. 4), thereby causing an inclined face 289 formed on the rear side of the bifurcation 287 to engage the stud 288 and cam the slide 170 forwardly. Such movement causes the subtract gears 113 to engage the gears 114 on the shafts 115, and thereafter cause the stud 288 to become seated in the bifurcation 287. The connecting lever 279 thereby serves as a connection between the follower arm 281 and the gate setting slide 170, whereby movements of the arm 281 will be communicated to the slide for the purpose of controlling the add-subtract gears during division operations.

The connecting lever 279 is retained in its operated position, throughout the division operation, by means of a half-round stud 290 mounted in the rear end of the lever which is adapted to be engaged by a latch 291 (see Fig 3.) pivotally mounted on a stud 292 mounted on the right side frame 82. The latch 291 is urged into latching engagement with the stud 290 by means of a tension spring 293. Thus, when the lever 279 is rocked upwardly (clockwise in Fig. 4 and counter-clockwise in Fig. 3), the latch will engage beneath the stud 290 and hold the connecting lever in its operated position until the latch is released at the end of the division operation.

In order to initiate cycling of the machine during division operations, the link 278 (Fig. 4) is pivotally connected at its upper end to the rear end of bellcrank lever 294 which is pivotally mounted on a screw 295 secured to the control plate 165. This bellcrank is provided with an upstanding arm 296 which lies in front of a stud 297 mounted on the cycle initiating slide 175. Hence, when the link 278 is depressed upon the release of the actuator 272 (Fig. 5), the bellcrank 294 will be rocked (counter-clockwise in Fig. 4) against the urgency of a spring 298, thereby causing the slide 175 to be moved toward the rear of the machine so as to engage the clutch and close the motor contact through the means previously described in connection with the plus and minus keys. The bellcrank 294 is retained in its operative position throughout the division operation as it is connected to the latched connecting lever 279.

It will be observed (see Fig. 5) that the program control shaft 286 extends through the control plate 165 and is provided on its right-hand end with a mutilated gear 305 which is adapted to be moved axially into and out of meshing relationship with a larger mutilated gear 306 which is secured to a gear 307 journalled on a screw 308 mounted in the control plate. The gear 307 in turn meshes with the gear 309 secured on the right-hand end of the power shaft 110, so that when the clutch is engaged and the shaft 110 rotated, the gear 309 will drive the gear 307 and the large mutilated gear 306. The small mutilated gear 305 is normally located out of the plane of the gear 306 so that the program control shaft 286 is normally inoperative. As shown in Fig. 6, the shaft 286 is normally urged toward the left, as viewed from the front of the machine, by means of a spring 310 on the shaft 286 which is compressed between a collar on the shaft and the arm 216 on the bracket 217 secured to the crossbar 107. Hence, the gear 305 is urged to a position where it lies against the right-hand side of the control plate 165 with a notch formed in the periphery of the gear engaged over a pin 311 mounted in the control plate. By means hereinafter to be described, the shaft 286 and gear 305 are shifted to the right at certain times during a division operation so as to move the gear into the plane of the large mutilated gear 306 and thereby establish a driving connection to the shaft 286 from the transverse power shaft 110.

The gear 305, as seen in Fig. 5, has three equally spaced sets of three teeth each which are arranged to cooperate with a single set of two teeth provided on the gear 306. As the latter gear rotates in a counter-clockwise direction during cycling of the machine its two teeth are so positioned thereon as to engage with one of the sets of three teeth on the gear 305 just before the end of a machine cycle. Hence, when the small mutilated gear 305 is projected into the plane of the larger gear 306 during the course of a division operation, the small gear 305 will be rotated clockwise through one-third of a revolution at the end of the instant cycle and also through one-third of a revolution at the end of each of the two next succeeding cycles, the gear and shaft 286 being maintained in their right-hand positions by the engagement of the pin 311 with the left-hand face of the gear 305.

The connecting lever 279 (see Fig. 4) bears a stud 315 which lies beneath a forward end of an arm 316 secured to a laterally extending shaft 317 (see also Fig. 6) which is journalled between control plate 165 and the left side frame 83 of the machine. Also secured to the shaft 317 at the left-hand side of the machine is an arm 318 (see Fig. 6) which is provided at its forward end with a stud 319 projecting into an elongated slot provided in the lower end of an overdraft control link 320. This link is pivoted at its upper end on a stud 321 secured to a yoke 322 which is fastened on an extension 323 of the highest order tens-transfer detent pin 131. As mentioned earlier herein, when a transfer is effected from one order of the accumulator to the next, the pin 131 will be moved forwardly as an incident to the forward movement of the transfer gear 127 for the purpose of placing this gear in the path of the transfer actuating tooth 128. Hence, when a transfer occurs which effects a forward movement of the leftmost detent pin 131, the extension 323 thereof will cause the link 320 to be moved forward for a purpose to be hereinafter described.

The forward end of the link 320 is normally held in its depressed, or inactive position by a spring, not shown, but upon depression of the division key and rocking of the connecting lever 279, the shaft 317 will be rocked (counter-clockwise as viewed in Fig. 4) thereby causing the pin 319 to lift the forward end of the link 320 so that it will lie directly behind the lower edge of a division control flag 325 which is pivotally mounted on the control shaft 286. Hence, when the link 320 is moved forward as a result of the forward movement of the leftmost detent pin 131, the flag will be rocked (clockwise as viewed from the right) against the urgency of a spring 326 so as to move an upwardly extending finger 327 on the flag into the plane of a pin, not shown, carried by a cylinder, not shown, which is mounted on the leftmost actuator shaft 106. Hence, as the shaft 106 rotates, the pin will engage the finger 327 and displace the flag 325 (to the right as viewed in Fig. 6). Inasmuch as the flag is prevented from moving laterally on the shaft 286 by means of a collar 328 which is pinned to the shaft 286, this shaft and the small mutilated gear 305 will likewise be displaced to the right so as to bring the gear into the plane of the larger gear 306. Thus, the shaft 286 and the cam 285, thereon (Fig. 4) will be given a 120° movement during each of the next three cycles of the machine, after which, the gear 305 will drop back over the pin 311 to its inactive position. In the meantime, the overdraft control link 320 will be moved rearwardly in the first of these three cycles, so as to release the flag 325 due to the restoration of the detent pin 131 by its restoring cam 130.

When the cam 285 (Fig. 4) occupies the position marked A, which is the position of the cam when the notch in the small mutilated gear 305 engages with the pin 311, the connecting lever 279 will be so positioned as to hold the gate setting slide 170 in its forward position, thereby causing the subtract gears 113 to engage with the accumulator gears 114 on the numeral wheel shafts 115. The machine will therefore be set for subtraction, and the value of the divisor set up on the amount keys 59 will be subtracted from the accumulator wheels 52 each time the machine makes one cycle of operation. Toward the end of the cycle in which an overdraft occurs in the accumulator, the shaft 286 will be displaced toward the right under the control of the transfer mechanism as described above. Such displacement positions mutilated program gear 305 in the plane of its drive gear 306. The teeth of gear 305 engage the teeth of the mutilated gear as the large gear approaches its full-cycle position (shown in Fig. 5). Thus, as the cycle ends, the shaft 286 is rotated counter-clockwise 120° to the position marked B, whereupon the cam 285 will rock the follower arm 281 (counter-clockwise in Fig. 4) thereby moving the connecting lever 279 toward the rear of the machine and causing the add gears 112 to be moved into mesh with the accumulator gears 114. Therefore, during the following cycle of operation of the machine, the divisor will be added back into the accumulator so as to correct the overdraft, and at the end of this cycle the program control shaft 286 will be rotated through another 120° to the position marked C, thereby moving the arm 281 to an intermediate position where the add-subtract gears 112, 113 will be held out of engagement with the accumulator gears 114 preparatory to a carriage shifting operation. The arm 281 is arranged to be yieldably maintained in this intermediate position by means of a spring-urged centralizer arm 299 provided with a V-shaped nose which is adapted to engage in a corresponding notch provided in the upper edge of the arm 281.

In order to cause the carriage to be shifted one ordinal position to the left during the machine cycle following movement of the shaft 286 to position C, a cam 333 (Fig. 6) is secured to the program shaft 286, this cam being provided with a node 334. When the shaft 286 is moved toward the right by the action of the pin, not shown, on the flag 325, the node 334 on the cam 333 is moved toward a follower arm 335 which is secured to a hub 336 (Fig. 6) pinned to the transverse shaft 215, rocking of which initiates either a right or a left shift (depending on the position of the sleeve 221) as is explained under the heading "Division aligner mechanism." This shaft is arranged to receive axial shifting movements, as will be hereinafter mentioned. The hub 336 is provided with a flange 337 which, together with the follower arm 335, provides an annular groove for receiving a finger 338 provided on a bellcrank lever 339. The bellcrank lever is provided with a forwardly directed arm 340 which lies over the left-hand end of the stud 315 carried by the lever 279. Hence, when the lever 279 is rocked (clockwise as viewed in Fig. 4), the stud 315 will cause the arm 340 to be lifted and thereby rotate the bellcrank 339 (counter-clockwise as viewed from the front of the machine) so as to move the shaft 215 and the follower arm 335 to the left against the opposition of the compression spring 218 mounted on the shaft 215 at the left-hand end thereof (see Fig. 6). This left-hand movement of the follower arm 335 is sufficient to bring the arm into the plane of the node 334 when the shaft 286 occupies its active, or right-hand, position. The node 334 is so located on the cam 333 as to cause the follower arm 334 to be rocked, and held in the rocked position, when the cam 285 (Fig. 4) occupies the position marked C. Through means to be described, this rocking movement of the arm 335 and shaft 215 causes the right shift clutch to be engaged during the aligning phase of a division operation and the left shift clutch to be engaged during the division phase, and thereby causes the carriage to be moved one ordinal space. At the end of the shift cycle, the cam 285 will be moved from position C to position A, to again cause the subtract gears 113 to be engaged with the accumulator gears 114 to again cause the divisor to be subtracted from the dividend. When the cam 285 and shaft 286 reach the position marked A the notch in the small mutilated gear will again register with the pin 311 and permit the gear and the shaft to be moved toward the left under the influence of the compression spring 310 (Fig. 6). This terminates the operation of the program control shaft 286 until the repeated subtraction of the divisor once again causes an overdraft in the accumulator, whereupon the program control mechanism will once again be set into operation to cause the above-described sequence of operations of the machine.

The calculating machine is provided with a counter reversing key 69 (Figs. 1 and 5) which lies immediately adjacent to the division key 68 and is normally depressed along with this key when a division operation is initiated. Depression of the key 69 causes the revolutions counter to be operated in a reverse, or unlike, direction, thereby causing the subtraction cycles, occurring during a division operation, to be counted in a positive sense. The mechanism for accomplishing this result is indicated generally at 345 and for a complete disclosure of this particular part of the machine attention is invited to U. S. Patent No. 2,294,111 granted to Carl M. F. Friden on August 25, 1942. The counter reversing mechanism 345 is conditioned by a link 346, the forward end of which is pivotally mounted on a lever 347. The lever 347 has a cam face 348, which is engaged by a roller 349 mounted on the lower end of the key 69. Thus, depression of counter control key 69 rocks lever 347 (counter-clockwise in Fig. 5), and pulls link 346 forwardly to condition the counter control mechanism 345 for unlike, or negative, operation.

The counter control mechanism 345 is locked in either adjusted position, during a division operation, by means of a locking arm 350, the forward nose 351 of which rocks in front of, or behind, a pin 352 on an interponent lever 353 connecting link 346 to the reversing mechanism 345. The locking lever is positioned in locking relationship by rocking of connecting lever 279, to which it is connected by a suitable pin and slot connection 354.

The counter control mechanism 345 is also settable from a counter control button 355 (Fig. 1). The mechanism operated by this button is conventional, and since its operation is immaterial in the present invention it will not be described. It can be noted, however, that movement of the button 355 rocks a transverse shaft, not shown, which in turn operates a connecting link 356 (Fig. 5) which is connected to control link 346 by a pin and slot connection 357.

It is conventional in the machine mentioned in the foregoing patents, to provide means for terminating the division operation when the true quotient is secured and the carriage is in the extreme left-hand position. It will be recalled that the division control lever 279 is latched in its operative position by a latching member 291 engaging the stud 290 (see Fig. 3). The carriage, not shown in this figure, is provided with a live pawl (as shown and described in the patent of Machado et al., No. 2,653,765) which is adapted to move behind the upper end 300 of the latch member 291, when the carriage moves to the extreme left-hand position. The automatic division program mechanism has set the machine for a series of subtractions as the carriage moves into this extreme left-hand position. When the overdraft occurs, the programming mechanism previously described, becomes effective to rock the control lever 279 rearwardly to move the digitation control slide 170 rearwardly to initiate an additive corrective cycle (to the right in Fig. 3). The movement of the control lever 279 to the right rocks the latching member 291 counter-clockwise, whereupon the live pawl mounted on the carriage (and not shown herein) is enabled to rock behind the upper end 300 of the latching member 291. Hence when the connecting, or control, lever 279 is moved forwardly at the end of the add-back cycle, preparatory to the shifting of the carriage in the next cycle, the stud 290 will be pulled off the latch 291. The lever 279 thus is permitted to drop, so as to cause the division operation to be terminated at the end of the shift cycle, which in this position of the carriage is an idle cycle of operation.

In machines of this class it is conventional to provide a "Division stop" mechanism which operates to selectively stop the operation of the machine in a division operation, either at the end of the additive corrective cycle in the order in which the machine is operating, or immediately. While this mechanism per se is not pertinent to the extraction of square root, the mechanism of the present invention is so designed that the division stop mechanism can be used to stop the extraction of square root at any desired time. This is preferably done by operation of the conventional division stop mechanism, which will therefore be briefly mentioned.

The division stop mechanism is controlled by a lever 360 (see Figs. 1 and 3). The lever is pivotally mounted on any suitable means, such as screw 362 affixed to the side plate 82 and has three operative positions: The intermediate position shown in Figs. 1 and 3 in which it is inoperative, a forward position in which it is operative to stop the division operation during the shift cycle after the additive corrective cycle in the order in which the machine is then operating, and a rearward position in which it is operative to stop the operation of the machine immediately. The lever 360 is held in either its intermediate or forward position by a spring biased detent 361, but has to be held in its rearward position when it is desired to stop operation immediately.

A live pawl 363 (see Fig. 3) is also pivotally mounted on screw 362, and is resiliently urged to follow the lever 360 when the lever is rocked forward (counter-clockwise in Fig. 3) by a suitable spring 364 tensioned between ears on the lever and the live pawl. The live pawl 363 is provided with a latching shoulder 367 which is adapted to engage an ear 366 on the latch member 291, when the latch member 291 is rocked counter-clockwise at the beginning of the additive corrective cycle. Thus, when the control shaft 236 rotates from position "B" to position "C" to initiate the ordinal shift, the latch 291 is locked in its counter-clockwise position to disengage it from the control lever 279. The lever 360 is also provided with a nose 365 on its rear end, which also engages the ear 366 when the lever 360 is rocked rearwardly or clockwise in Fig. 3, to immediately cam the lever 291 off the pin 290, thereby releasing the control lever 279 instantly.

The foregoing description of the division control mechanism is believed sufficient for a clear understanding of the present invention, but reference is made to the Patents Nos. 2,229,889 and 2,327,981 issued to Carl M. F. Friden for a more detailed disclosure of this part of the machine.

m. Division aligner mechanism

Mention has heretofore been made of the patent of Anthony B. Machado, No. 2,653,765, relating to a division aligning mechanism used in the Friden fully automatic calculating machine now marketed. This mechanism is operative in the first phase of operation of the division mechanism to shift the carriage to the right until the divisor has been properly and automatically aligned with the dividend. This division aligner mechanism is important to the initiation of a square root extraction in the proper order, and will therefore be briefly described.

In the previous square root machine, S. N. 244,518, operation was initiated with the carriage in the extreme right-hand position, with the radicand inserted at the left of the accumulator. In that machine means was provided for selectively initiating the extraction of square root in either the 10th or the 9th order, depending upon the number of digits in the left-hand group of the radicand. In the instant application it is deemed preferable to initiate the extraction of square root in the 9th order at all times, and to shift the carriage so as to properly align the left-hand group of the radicand with the 9th order of the selection mechanism. As will be described more fully hereafter, in the instant invention, the radicand is set upon the keyboard, preferably at the left-hand side thereof. A square root initiating key aligned with the decimal point of the radicand is then depressed. The carriage is then automatically shifted to the proper order for the insertion of the radicand factor into the register. Then, depending upon whether the decimal point is to the right of an odd or even order of the machine, the carriage will be shifted an additional step to properly align the radicand factor with the 9th order of the keyboard and its associated selection mechanism.

It is thus obvious that the division aligning mechanism, which is utilized to shift the carriage the additional step, is important to an understanding of the square root mechanism of the present invention. Also, as will be mentioned, when the carriage is in the extreme right-hand position (which it assumes when there are two digits in the left-hand group of two, that is, when there are an even number of digits in the radicand), the division aligner mechanism operates through three idle cycles prior to the actual initiation of the division operation. These three idle cycles of operation resulting from the use of the division aligning mechanism to align the 9th order of the selection mechanism with the proper order of the dividend factor, is used for setting some of the controls for the extraction operation.

It will be understood that as this mechanism is conventional in the Friden automatic calculating machine, and is fully described in the Machado application above-mentioned, it will be described only briefly herein. For a full and complete understanding of this mechanism one is referred to the said Machado Patent No. 2,653,765.

It will be recalled that it was mentioned in the description of the division programming mechanism that the rotation of the program shaft 286 to the "C" position operated through the cam 333 (Fig. 6) and cam follower arm 334 to rock the shift control shaft 215. Normally the rocking of shaft 215 is operative to move the left shift clutch 187 to the rear to engage the sleeve 197 for one cycle, or until the program shaft 286 returns to its "A" position. However, the rocking of the connecting lever 279 at the initiation of a division operation shifts the shaft 215 to the left. This is accomplished by means of the long pin 315 mounted on the connecting link which rocks the forward arm 340 of the bell-crank 339, the nose 338 of which lies within the flanges formed by the arm 335 and flange 337. The shifting of the shaft 215 is operative to disable the means for controlling operation of the left shift clutch 187 and enables mechanism for operating the right shift clutch 188, upon the rocking of the follower arm 335. The division aligning mechanism is shown particularly in Figs. 6 and 7, and the means for selectively engaging either the left shift or the right shift clutches, from the rotation of the program shaft 286 and rocking of the follower arm 335 will now be described.

The shaft 215 is journalled in the right side frame 82 and in the arm 216 of bracket 217. It is resiliently urged to the right by a suitable compression spring 218. Secured to the shaft 215 is a male driving element 219 which engages a slot in a driven element 220, loosely mounted on the shaft 215. The driven element 220 is mounted, however, to the left-hand end of a sleeve 221, also rotatably journalled on the shaft 215. The sleeve 221 is resiliently urged to the right by means of a light compression spring 222, but is restrained against such movement by a pair of latches 223 and 224 which are pivotally mounted on a screw 225. The screw 225 is mounted in a bracket 227 carried by the shaft 215, whereby the latches shift to the left with the initial movement of the shaft 215 at the initiation of a division operation. The latches 223 and 224 are provided with latching shoulders which are adapted to engage and hold an abutment face provided on a left shift arm 230, which is rigidly mounted on the left-hand end of sleeve 221. The latches 223 and 224 are urged into engagement with the abutment face of the left shift arm 230 by suitable springs 226 as shown. A right shift arm 231 is also secured to the sleeve 221, being mounted on the right-hand end thereof.

The rear ends of the arms 230 and 231 are provided with cam faces which are adapted to engage, upon rocking of sleeve 221, with the corresponding faces provided on ears 375 and 376, respectively, formed on the shifting forks 185 and 186, thus pushing the respective forks to the rear to clutch engaging position. When the machine is in its normal, or full-cycle position, the left shift arm 230 is in alignment with the ear 375, while the arm 231 lies to the right of its associated ear 376, and is therefore in an inoperative position with respect to the shifting fork 186 which controls the right shift clutch of the machine.

It has previously been mentioned that initiation of a division operation causes the shifting of the shaft 215 (Fig. 6) to the left, thereby moving the latches 223 and 224 which are indirectly carried by the shaft 215 toward the left. The latches in turn pull the sleeve 221 toward the left to align the right shift arm 231 with the ear 376 whereby the right shift clutch will be operated upon rocking of sleeve 221, and arm 230 is moved out of alignment with ear 375 (thereby disabling operation of the left shift clutch). By this means, the rocking of shaft 215, under the control of the programming shaft 286 as above-mentioned, is effective to cause a right shift to the carriage instead of a left, during the aligning phase.

Also the shifting of the shaft 215 toward the left is operative to move a slide 377, which is mounted for lateral sliding movement on brackets 378 and 216. The right-hand end of the slide 377 is notched as indicated at 379 (Fig. 7) to embrace the edge of the left shift arm 230. Thus shifting of the sleeve 221 likewise shifts the slide 377 to the left. The left-hand end of the slide 377 is provided with an inclined camming face 380 which over-lies a tail 381 on flag 325. Hence when the sleeve is shifted to the left, along with the shaft 215 at the beginning of a division operation, the slide 377 will likewise be shifted to the left and cam face 380 will cam the tail 381 downwardly, thereby rocking the finger 327 on the flag into alignment with the pin (not shown) carried on a cylinder mounted on the left-hand actuator shaft 106. The flag 325 is held in its rocked, or active, position by the slide 377 so that the program control shaft 286 will be cammed to the right during the first cycle of operation, thereby initiating operation of the division program mechanism above described, but with a shift of the carriage to the right instead of to the left. At the end of the third cycle the shaft 286 will be released for movement to the left, and immediately the flag 325 will be operated to cause it to be shifted to the right to initiate another series of program operations. Thus the program control shaft 286 will be repeatedly operated by a false, or artificial, overdraft caused by the rocking of the flag 325 by the slide 377. This shifting of the carriage to the right will be continued until both of the latches 223 and 224 have been tripped by mechanism now to be described, so as to release the sleeve 221 to the action of its spring 222, whereupon the left-hand shifter arm 230 will move into alignment with the ear 375 on the shift fork 185, so as to cause the left shift clutch to be engaged each time the shaft 215 is rocked. At the same time the slide 377 will be moved toward the right so as to release the tail 381 of the flag, and thereby permit the flag to be placed under the control of the overdraft control link 320. Hence once the latches 223 and 224 have been operated to release the sleeve 221, the program control mechanism will function in its normal manner to bring about an automatic division operation, i. e., cause the dividend to be divided by the divisor in the conventional manner.

The latch 224 is released by rocking of a bail 385 the arms 386 and 387 of which are freely pivoted on shaft 317 (see Fig. 6). This bail is provided on its right-hand arm 387 with a finger 388 the upper end of which lies behind the left-hand end of the latch 224. Hence the rocking of the bail 385 (counter-clockwise when viewed from the right) will release the latch 224. The bail is operated by means of arm 386 thereof, which is pivotally connected to a link 389 that is operated by a mechanism which senses the zero or non-zero condition of the left-hand register dials 52. This sensing mechanism is not here shown but it is believed sufficient to mention that the sensing mechanism is so constructed that when the carriage is in its extreme right-hand position it will rock the bail 385 and release latch 224.

It can also be mentioned that the latch 224 is somewhat shorter than the latch 223 so that when the latch 224 is released the spring 222 will cause the sleeve 221 and shift arms 230 and 231 secured thereto, to escape slightly to the right until it contacts the latching face of the longer latch 223. Consequently once the sensing mechanism for the numeral wheels has been artificially caused to sense a zero, the shifter arms and sleeve 221 will be permitted to escape slightly to the right so as to thereafter be under the sole control of the longer latch 223.

The latch 223 is adapted to be released under the control of the highest order transfer pin 131. For this purpose the over-draft control link 320 (Fig. 6) carries a stud 394 which lies above an arm 395 formed on the left-hand end of a bail 396 which, like the bail 385, is freely pivoted on the shaft 317. The arm 395 is provided with a suitable nose, not shown, which is adapted to be engaged by the pin 394 when the link 320 is moved forwardly in response to a tens-transfer affecting the highest order transfer pin 131. The arm 395 will thereby be rocked (counter-clockwise as viewed from the right). At its right-hand end the bail 396 is provided with a finger 397 which lies behind the left-hand end of the long latch 223.

When a transfer occurs which affects the highest order pin 131, the finger 397 will be moved forward so as to rock the long latch 223, thereby releasing the sleeve 221 and the shift arms 230 and 231 to the influence of the spring 222, which will thereupon shift the assembly to the right so as to bring the arm 230 into line with the ear 375 on the left shift fork 185. This will effectively reverse the direction of carriage shift under the control of the program control mechanism and, at the same time, will cause the slide 377 to release the tail 381 on the flag 325 so as to enable the flag to be controlled by the overdraft control link 320 as in normal division operation. The division control mechanism will thereafter operate in a normal manner until the carriage reaches its extreme left-hand position where the pawl on the carriage will cause the latch 291 (Fig. 3) to be disabled.

Means are also provided for tripping the long latch 223 during a carriage shifting operation with the carriage in its extreme right-hand position. As shown in Fig. 7, the bail 396 is provided with an upstanding finger 400 which lies in front of a lever 401 pivoted at 402 on an extension of the plate 247. The lever 401 is also provided with a rearwardly extending arm which carries a roller 403 that lies beneath the left-hand end of the lever 245 (right-hand end in Fig. 7). Consequently, when the lever 245 is shifted toward the left (to the right in this figure) as a result of an operation of the override pawl 249, the left-hand end of the lever 245 will be forced downwardly, due to the cooperation of the roller 251 with the inclined cam face 250 of lever 245, and thereby cause the lever 401 to be rocked. Rocking of lever 401 rocks the tail 400 to rock the finger 397 forwardly and cause the long latch 223 to be released. The release of the long latch 223 by the lever 401 occurs during the attempted shift, or third, cycle. Thus there will be three idle cycles of operation upon the initiation of a division operation with the carriage in the extreme right-hand position.

It has heretofore been mentioned that it would be feasible to insert the radicand factor in the extreme left-hand end of the register 52 and initiate operation in either the 8th or 9th order selection mechanism as required. However, the preferred form is to invariably initiate the extraction operation in the 9th order of the selection mechanism, which involves an automatic selection of the order in which the radicand factor is to be set. As indicated above, when the digits of the radicand are of even number (i. e., when the left-hand group of two contains two digits) the carriage is tabulated to the extreme position and the radicand there entered five times. However, when there are an odd number of digits in the radicand (i. e., one digit in the left-hand group of two) then the carriage, upon initiation of the extraction operation, is shifted to the next to the extreme position, and the radicand there entered five times. Thereafter the tripping of the division operation initiates a right shift of the carriage, by means of the division aligner mechanism just mentioned, to shift the carriage into the extreme position. In this event there is a shift of the carriage one step to the right before the extraction operation proper begins. In the former instance the machine goes through three idle cycles due to the aligner mechanism just described before the beginning of the extraction operation.

n. Dividend entry mechanism

We prefer to utilize the conventional dividend entry mechanism of the present commercial "Friden" calculating machine to secure the automatic entry of the radicand factor in the proper position. This mechanism is essentially that shown in the patent to Friden, No. 2,403,273 issued July 2, 1946, as modified by the co-pending application of Anthony B. Machado, S. N. 251,311, filed October 15, 1951. This mechanism, which is conventionally operated by depression of the dividend entry key 81 (Fig. 1), causes clearing of the registers as a preliminary to a division operation and thereafter effects entry of the dividend into the accumulator in any selected ordinal position, while suppressing the usual count made in the revolutions counter during the entry of a factor into the accumulator. When using this mechanism, the operator sets the dividend into the keyboard and depresses the dividend entry key 81. The depression of this key initiates operation of the mechanism, which thereafter controls the performance of the programmed steps in the desired sequence: to first shift the carriage to the extreme left-hand position; to clear both the accumulator and counter registers while in the extreme left-hand position; to then enable a power shift of the carriage to the right to a selected ordinal position; and, finally, when the carriage reaches that position, to automatically enter the dividend once into the accumulator. The counter mechanism is suppressed during all of these operations, thus keeping the counter cleared in order to register the correct quotient in the subsequent division. It will be understood that this mechanism could be omitted from the instant invention, but it is obvious that there is less chance of error, and that operation will be more automatic, if the radicand can be set into the keyboard, and the depression of a square root control key will be operative to clear the registers, to tabulate the carriage to the proper ordinal position depending upon the location of the decimal point in the radicand, and to cause the automatic entry of the radicand five times into the accumulator.

The dividend entry key 81 is mounted on a long slide 470 (see Fig. 3) supported for vertical movement in the machine as shown, and resiliently urged to its raised position by a conventional spring 472. This slide can be latched in its depressed position by the conventional latching slide 471. The lower end of the slide 470 is provided with a slot 473 which embraces a pin 474 carried by the rearwardly extending arm of bellcrank 475. The bellcrank is mounted on a pin 476 carried by the right frame plate 82. The lower end of the lower arm of the bellcrank is provided with a stud 480 which engages the camming face 481 of the rearwardly extending lever 482 which is rigidly secured to the shaft 483. Thus, depression of the dividend entry key 81 effects, through the linkage shown, rocking of the shaft 483 (clockwise in Fig. 3).

A clutch control arm 488 is also rigidly secured to the shaft 483 (see also Fig. 10). This control arm 488 is provided with a suitable stud 491 which engages the upper edge of the forward arm of a three-armed lever 489, pivotally mounted on a transverse shaft 493. The three-armed lever 489 is provided with a nose 490 on its rearwardly extending arm, which nose lies behind the pin 159 mounted on the clutch and switch control lever 156. Thus, when the shaft 483 is rocked (counterclockwise in Fig. 10 or clockwise in Fig. 3) the stud 491 rocks the forward end of the three-armed lever 489 downwardly (clockwise in Fig. 10). This rocking of the lever 489 causes the nose 490 thereof to pull the pin 159 forwardly, thus pulling the switch control link 160 forwardly to close the motor switch and to rock the lever 156 (clockwise in Fig. 3) to cause engagement of the clutch above-mentioned. Thus, the motor is held energized and the clutch held engaged so long as the dividend entry key 81 is latched in its depressed position, regardless of the setting of the link 178 under control of the "add" key 64 as above described.

The rocking of the three-armed lever 489 also causes disablement of the keyboard clearing mechanism normally controlled by the "add" key 64. This is accomplished by means of the third arm 495, extending upwardly (as shown in Fig. 10) and provided with a suitable stud or roller 496. This roller engages the rear edge of a bellcrank 497 pivotally secured to the right frame plate 82 by any suitable means such as screw 498. The other arm of the bellcrank 497 carries a stud 499 which extends through a suitable aperture in the frame plate to the right-hand side thereof, as is shown in Fig. 3. The stud 499 engages the rear end 500 of a two-armed lever 501, which is pivotally secured on the right side of the frame plate by any suitable means, such as the long stud 419 previously mentioned. The forward end of this lever is provided with a contact face 503 which engages the stud 504 carried on the floating link 455. Thus, the rocking of the control shaft 483, in rocking the lever 489 clockwise in Fig. 10, causes lifting of the pin 499; and the lifting of the pin 499 rocks the two-armed lever 501 (counterclockwise in Fig. 3) to depress the forward end of the floating link 455. The rocking of the floating link prevents its ear 458 from engaging the ear 410 on the clear bail 95. This prevents clearing of the value set into the keyboard so long as the dividend entry key is depressed.

The rocking of the shaft is also utilized to set the power operated mechanism for operating the left shift mechanism and the clearing mechanism to clear the registers and shift the carriage to the extreme left-hand position preparatory to tabulating the carriage to the proper position and the entry of the dividend in that ordinal position. The mechanism shown herein is essentially the same as that described in the last-mentioned Machado application and briefly comprises a bellcrank 510 (see Fig. 11) pinned, or otherwise rigidly secured, to the shaft 483. A link 511 is mounted on the upper arm of the bellcrank 510 by a suitable pin and slot connection, and is urged to follow the rocking of the bellcrank by a spring 512. The rear end of the link 511 is pivotally secured to a hook member 513 mounted on an eccentric, not shown, on the constantly rotating shaft 514. It will be seen in Fig. 11 that the shaft 514 is geared to the main drive shaft 110 and will therefore rotate synchronously with the drive shaft, that is, as long as the clutch is engaged and the motor switch closed. The hook member 513 has a forwardly extending hook 515 which engages a pin 519 on a bellcrank 516. The bellcrank 516 is rigidly secured to the control shaft 493 by any suitable means whereby the rocking of the bellcrank 516 rocks the shaft (clockwise if viewed from the right). The bellcrank 516 is locked in its operative position by a latch member 518, which is disengaged when the control shaft 483 is returned to its original position.

Rocking of the control shaft 493 is operative to cause engagement of the left shift clutch and also to cause engagement of the clear clutch to provide for power clearing of either or both registers 52 and 53. An upwardly extending arm 522 is rigidly secured to the crossshaft 493. A pusher link 523 is pivotally secured to the upper end of the arm 522, and is provided at its rear end with a shoulder, not shown, which engages pin 524 mounted on arm 525. The arm 525 is rigidly secured to a sleeve 526 on the other end of which is carried an arm 527. The latter arm is provided with a pin 528 which engages the left shift push rod 180. Thus, the depression of the dividend entry key, through the rocking of the shaft 483 causes the left shift clutch to be engaged and latched engaged until link 523 is lifted by arm 529 which is pinned to shaft 236 (Fig. 6). It will be recalled that shaft 236 is rocked by the override pawl, not shown, on the right end of the carriage rail 207. Thus, when the carriage reaches its extreme left-hand position, the attempted further shifting rocks the shaft 236 to lift pusher link 523 from engagement with pin 524. This releases the left shift clutch although the dividend entry key is still depressed.

The rocking of the shaft 493 also is operative to cause the engagement of the clear clutch. For this purpose an arm 533 is rigidly secured to the shaft 493. A pusher link 534 is pivotally secured to the upper end of the arm 533, the assembly being normally urged toward the front of the machine by a suitable spring 535, which is also operable to retract the pusher link 523 on the left shift mechanism previously described. The pusher link 534 has a pressure face engaging the clear clutch control rod 536 as is shown in Fig. 11. The rod 536 extends rearwardly (as shown in Fig. 6) and is provided with a yoke 537 similar to the yokes carried by the shift control rods 180 and 181 previously described. The yoke 537 engages a shift clutch similar in construction to the right and left shift clutches previously described, which, when placed in the rearward position by translation of the shift rod 536, engages a sleeve 539 journalled in the crossbar 86. The sleeve 539 carries a cam 540 (see also Fig. 7).

Associated with the cam 540 is a roller 541 mounted on a follower arm 542 pivotally secured to the crossbar 86. The follower arm 542 is urged into engagement with the cam by a suitable spring, such as 543. The upper end of the follower arm 542 is bifurcated, as at 544, to embrace a roller 545 carried by a slide 546. The slide 546 is provided with an upwardly and inwardly extending ear 547 which is adapted to engage the clearing control arm 548 when the carriage is in the extreme right-hand position, as is described in the patent of Carl M. F. Friden No. 2,294,083.

Depression of the dividend entry key 81 is operative, also, to block out the operation of the counter actuator 141 so as to prevent entry of values into the counter during the radicand factor entering cycles. This can be accomplished by means of a two-armed lever 555 (Figs. 3 and 12), the forward end of which underlies the lower end of the slide 470. This lever 555 extends rearwardly and is pivotally secured to frame plate 82 by any suitable means such as pin 556 (see Fig. 12). The rear end of the lever underlies the forward arm of a bail 557 rotatably mounted on a suitable cross-shaft 564. The bail 557 is provided with a pin 558 which is embraced within a bifurcation 559 on the lower end of a two-armed lever 560, rotatably mounted on a suitable cross-shaft. The upper end of the lever 560 carries a slide 561 which has a nose 562 normally out of the path of oscillation of the arm 563 of the counter actuator assembly. However, the rocking of the lever 555 (clockwise in Fig. 12) rocks the bail 557 rearwardly, which rocks the upper end of the lever 562 forwardly to interpose the nose 562 in the path of oscillation of the actuator arm 563, thereby preventing the entry of values into the counter register 53.

It is conventional in the Friden calculating machine to also provide means for blocking the operation of the counter in all cycles except when the digitation control bail 116 is either in its positive or negative operating position. This can be accomplished, as is shown in Fig. 12, by a slide 565 also provided with a nose 566 which lies in the path of oscillation of the counter actuator arm 563 when the gate 116 is in its neutral position. It will be obvious that the rocking of the digitation control gate arm 117 is operative to position the nose 566 either in front of or behind the nose on the counter actuator arm, thereby permitting registration by the counter actuator 141 when the machine is set for positive or negative entry of values into the accumulator register. By the means just shown the operation of the counter is blocked during the carriage shifting cycles, and during those cycles of operation in which the dividend entry mechanism is in its operative position.

The bail 557 is also utilized to condition the shifting mechanism for tabulation to the right, and for this purpose carries an arm 568 on the left-hand end thereof (see Fig. 14). The arm 568 pivotally supports the forward end of a rearwardly extending link 569, the rear end of which is supported by a roller 577 on the rear end of arm 576 of bail 575. The link 569 is provided with a nose 570 which normally lies in front of an overstroke L-lever 240 (also shown in Fig. 7). This lever 240 is rocked by an override pawl, not shown, but similar in construction to the override pawl 249 shown in Fig. 7. The override pawl which is effective to rock lever 240 is located at the extreme right-hand end of the carriage, and thus, when the carriage is in its extreme left-hand position and a continued shift to the left is attempted, the pins 205 of the carriage shifting wheel rocks the override pawl to depress the L-lever 240. When the bail 557 has been rocked rearwardly, as heretofore described, the nose 570 on link 569 underlies the lower end of the upright portion of the L-lever, whereby the rocking of the lever is operative to depress the arm 576 which supports the rear end of the link 569.

A second bail 575 is also mounted on the shaft 564 (see Fig. 14). One end of this bail is formed into the integral arm 576 which carries the roller 577 that supports the rear end of link 569. Pivotally mounted on the arm 576 is a second arm 578, biased to follow movement of the arm 576 by a suitable spring 579. The free end of the arm 578 bears against the right shift clutch yoke 186. Thus, the rocking of the arm 576, from operation of the override pawl, resiliently urges the arm 578 against the yoke 186 to cause engagement of the right shift clutch. This is conventionally prevented until the end of that cycle by means of an interlock, not shown herein, which prevents the engagement of the right shift clutch until the left shift clutch is disengaged. It will be recalled that the operation of the override pawl is also operative through L-lever 240, bellcrank 238, link 237 (Fig. 6), and shaft 236 to disengage the left shift clutch. At the end of that cycle, the interlock being released, the arm 578 urges the right shift clutch 186 into engagement, thereby throwing the machine into a right shift of the carriage.

The other end of the bail 575 (Fig. 14) has an integral arm 583 provided with an ear which engages with a shoulder of latching member 584 urged to the rear by means of a spring, not shown. Thus, when the bail 575 is rocked by the depression of slide 571, it is latched in its operative position to maintain the right shift clutch in engagement until released by depression of a tabulating slide 588. The right-hand end of the bail 575 has a second integral arm 585 which pivotally supports the rear end of a link 586. The forward end of this link 586 is supported by a depending arm 587, which is pivotally supported on the tabulating slide 588. When the bail 575 is rocked (clockwise in Fig. 14) the lower end of the arm 587 is pulled rearwardly to place its lower end above the cooperating ear of the trigger releasing latch 593. The latch 593 is normally urged to the rear by a suitable spring 599 to form a latching engagement with a setting trigger 594. The trigger is urged forwardly (counterclockwise in Figs. 13 and 15) by a strong spring 595, but is normally latched in its inoperative position by the latch member 593. When the tabulating slide 588 is depressed, the lower end thereof engages the forward end of latch member 584 to release bail 575, and thus terminate right shift of the carriage. Simultaneously the depending arm 587 engages the forward end of trigger releasing latch 593, thereby releasing the trigger 594 to the operation of its spring.

The rocking of the trigger 594 is operative to rock the shaft 118 to move the digitation control gate 116 to position the plus gears 112 in mesh with the accumulator gears 114. This is readily accomplished by means of a two-armed lever 596 (see Fig. 13) clutched to the shaft 118 by means not here pertinent and therefore not described. The upper end of the trigger 594 engages a roller 597 on the lower end of lever 596 thereby rocking the lever 596 and shaft 118 to cause additive entry of values in the keyboard into the accumulator register 52. The upper end of lever 596 bears against a stud 598 on the latch member 471, therefore simultaneously releasing the dividend entry key.

It can be mentioned that the trigger 594 is restored to its normal (latched) position by means of a link 592 (see also Fig. 5) connecting the lower end of the trigger to an arm 591 which is rocked late in a cycle by a roller 590 mounted on gear 309. The arm 591 is extended to lie in front of ear 161 on clutch control link 155, thereby holding the clutch and motor switch in operating positions until the end of the additive entry cycle, although the control shaft was released at the end of the override cycle.

It will be understood that for a more detailed description of the dividend entry mechanism here briefly described, one is referred to the patent to Friden No. 2,403,273 issued July 2, 1946.

The tabulating slide 588 is operated when the carriage reaches a preselected ordinal position, in the right shift of the carriage. The tabulating slide 588 is operated by a conventional tabulating control mechanism which, being conventional, will be described briefly. As shown in Fig. 1, a series of tabulator keys 80 are ordinally arranged across the front edge of the carriage 51. In the Friden machine these buttons are numbered "1" to "9" and "0," from right to left, as shown in this figure, the numbers "1" to "9" being those indicating the number of decimal places set in the quotient by depression of the associated key and "0" indicating a clearing key. These keys 80 are mounted for vertical movement in the front carriage frame bar 139, as shown in Fig. 2. They are resiliently urged to a raised position by suitable springs 604 (Fig. 16). A depressed key is latched in its depressed position by a latching slide 602 mounted for longitudinal movement in the flange 139, and resiliently urged to the left by suitable spring 603. The latching slide 602 is provided with notches not shown, through which the key stems are mounted. The key stems are provided with cams 608 to move the latching slide 602 to the right and with a shoulder 609 which is adapted to engage the lower edge of the latch, holding the key depressed. Associated with the tabulating buttons is an arm 605 pivotally mounted on a frame cross-member 610, which constitutes the front carriage rail. This arm is pivotally mounted on the rail by any suitable means, such as rivet 612 and is urged to its raised position by a suitable spring 611 (see Fig. 17), tensioned between the upper end of the slide 588 and the frame 82. A roller 606 is mounted on the arm 605 and is adapted to engage the lower end of a depressed key 80, thereby rocking the arm 605 downwardly. A forwardly extending ear 607 is formed on the right-hand, or free, end of the lever 605 and is adapted to engage the upper end of the tabulating slide 588, as is shown in Fig. 15. Thus, as the depressed tabular key reaches the roller 606, in the preselected ordinal position of the carriage, the arm 605 is rocked downwardly to move the slide 588 downwardly and release the various mechanisms above described. It will be obvious that shifting of the carriage in the reverse direction will not operate the tabulating mechanism, for although the slide 588 will be depressed, the pivotally mounted arm 587 will be in its forward, or inoperative, position and the latch 584 will be in an unlatched position. Consequently, the movement of the slide 588 will have no effect on the mechanism just described.

By the means just described, the depression of the dividend entry key 81 initiates operation of a program control mechanism which includes shifting the carriage to the extreme left-hand position, there clearing both registers, then initiating a shift of the carriage to the right to the preselected ordinal position. Upon reaching this position the value standing in the keyboard is entered in the accumulator register 52 and the mechanism automatically disabled. The cycles of machine operation are not entered in the counter as slide 565 (Fig. 12) is operative to block the counter actuator arm 563 in all shifting cycles, and the counter is blocked in the cycle in which the value standing in the keyboard is entered in the accumulator register by the blocking slide 561.

It is appropriate to note here that the rear end of the latch 471 is pivotally supported by a bellcrank 617 (see Fig. 13) pivotally mounted on the right frame plate 82 by any suitable means, such as stud 618. This bellcrank has a rearwardly extending arm 619 which underlies the right end of a lever 620 (see also Fig. 7), pivotally mounted on a stud 621 on the rear bracket 203. The left end of lever 620, as shown in Fig. 7, overlies the levers 244 and 245, whereby the rocking of lever 245 by the override pawl 249 is operative to depress the right end of the lever 620. Rocking of the lever 620 is also operative to rock the bellcrank 617 (clockwise in Fig. 13) to withdraw the latch 471 and release the dividend entry key 81. By this means a dividend entry operation is always terminated in the extreme position, even though no tabulating key 80 is latched down.

It can also be mentioned that the rear arm 619 of the bellcrank is connected by means of a link 622 to an arm 623 which is rigidly secured to the right end of a transverse shaft 770. This shaft 770 is rocked during the 5th cycle of additive operation involved in entering the radicand factor into the accumulator to release the dividend entry mechanism as will hereafter be described, and for other purposes not pertinent in this invention.

II. SQUARE ROOT MECHANISM

The mechanism heretofore described, for the most part, is conventional and is shown in the patents and applications previously referred to. This invention relates primarily to a mechanism which is adapted to be associated with such a conventional machine and which is operable in a single continuous operation to control the automatic extraction of the square root of a radicand set into the keyboard 59. It will be understood that the machine shown in the drawings and patents above mentioned is used to illustrate a preferred form of machine to which this invention can be applied, but the invention is not limited thereto for it could be applied to any conventional calculating machine with certain minor changes.

The extraction of a square root can be considered as the performance of a division operation with a progressively changing divisor, i. e., one in which the divisor is changed automatically between each cycle of operation. The extraction of square root can also be considered as the subtraction of a progressively changing subtrahend. It should be understood that the two ideas are basically the same, as normal division is the repeated subtraction of a constant value, i. e., the divisor. Regardless of what the operation is called, the progression takes place as heretofore described for the manual extraction of square root by the method used in the instant machine. In our preferred form of invention we utilize the conventional division mechanism to maintain the machine in a continuous subtractive operation, continuing the subtraction to an overdraft. The overdraft mechanism enables the division programming mechanism to cause the multicycle operation of adding back the value subtracted to correct the overdraft, shifting the carriage one order to the left, and finally initiating another continuous subtractive operation.

It will be understood that this division operation is modified, when the extraction of square root is initiated, in the single respect that the divisor being subtracted is progressively changed with each subtractive cycle. As pointed out in the explanation of manual operation for the extraction of square root by the method used herein, the first cycle of operation subtracts the value of "5" in the predetermined order. In each successive cycle the value is increased by "10," until the operation causes an overdraft. The overdraft is automatically corrected and the carriage shifted one order to the left. Substantially simultaneous with the shifting of the carriage, the "5" is erased and inserted in the next lower order, the value standing in the tens order of the previous series of divisors remaining unchanged. In the first cycle of operation after the shift of the carriage, the value standing in the tens order of the divisor at the time of the overdraft constitutes the value standing in the hundreds order, the first cycle subtracting that value plus "05." Each successive cycle progressively changes this value by increasing it by "10" so that the second cycle will have "15" standing in the lower two orders of the divisor, the hundreds values remaining unchanged throughout. This second series of operations is continued to an overdraft, when the overdraft is corrected and the carriage again shifted to the left and the operations repeated.

It will be noted that the method utilized herein, and the mechanism which we describe, avoids the objection of reducing the value in the selection mechanism by "1" after the correction of each overdraft and during the shifting of the carriage, which was inherently a part of the method used in the copending Ellerbeck application S. N. 244,518. These modifications are explained in the table of manual operations previously given.

The first steps of manual extraction of square root, and also one of the first steps of the extraction of square root by manual control of a calculating machine, is the grouping of the radicand, in groups of two, to the left of the decimal, and beginning operation under the right-hand figure of the leftmost group. Similarly one of the first operations that an automatic machine must perform in the extraction of square root is to select the order in which the operation will begin. That is, if the radicand is "625.0," the operation must begin in the order under the "6." On the other hand if the factor is "62.5," then the operation must begin under the "2." It has already been noted that this initiation of operation could be handled by placing the radicand factor in the register in a preselected higher order, and beginning the subtractive operations in orders determined by the number of whole digits in the radicand. However, it is mechanically simpler to vary the ordinal position in which the extraction is to start, not by changing the keyboard order in which the first value is entered, but varying the carriage position in which the radicand is entered. For example, if the radicand is "625.0," in our preferred form of machine, the number is inserted on the extreme left-hand side of the keyboard and entered in the accumulator with the carriage one order to the left of the extreme right-hand position. After the entry of the radicand into the register five times, the radicand is cleared from the keyboard, the carriage is then shifted to its extreme right-hand position, the first "5" is placed in the next to the highest order of the keyboard (in the 9th order in the usual 10 order keyboard), and the operation started. In this situation the radicand factor is "3125.0," with the "3" above the highest order of the keyboard, and the "5" of the keyboard is under the "1" of the radicand factor. On the other hand, if the radicand is "62.5" then the number is entered in the accumulator five times with the carriage in the extreme right-hand position, and the keyboard cleared. In this situation the "3" is one order to the left of the highest keyboard order. Extraction is then initiated by the first cycle subtraction of "5" (again in the 9th order of the keyboard). In this example, "5" is subtracted from "312," instead of from "31" of the first example. In both cases the series is progressively changed as indicated.

It will be obvious that in order to utilize the full capacity of the machine it is preferred to place the radicand at the extreme left-hand position of the keyboard, after which the value is entered five times to constitute the radicand factor in the register, and the root can be calculated accurately to the greatest number of values. Throughout this specification this is the preferred method of operation—it being assumed that the radicand is inserted on the extreme left side of the keyboard and the carriage positioned accordingly. It will also be obvious in the event the radicand is a decimal, that it will be convenient to use the decimal point marker to the left of the keyboard and entering the radicand on that basis. It can also be noted that for most practical purposes, the root will be sufficiently correct if the progressive changing of the divisor were stopped after five or six orders, and the operation thereafter continued as simple division. However, as the present mechanism is simpler than that heretofore known, it is practical to continue the progressive change of the divisor across the entire keyboard, and the preferred form of our invention uses this feature. This mechanism also has the further advantage that the correct root can be retained in the selection mechanism, if desired.

1. Initiating keys

It will be obvious that all square root operations could be initiated by the depression of a single key, or operation of a single lever. It would also be possible to use two such keys, one operative to control the entry of the radicand factor into the register with the carriage in the extreme right-hand position, and the other to control the entry of that factor into the register with the carriage in the next to the extreme position. Such construction, however, would require the operator to mentally determine the number of decimal places in the root, and also mentally determine whether there was a single digit in the leftmost group of two, or two digits in such group. We therefore prefer to place a plurality of initiating keys across the front of the keyboard, in line with the keyboard decimal markers 89, and depress the key aligned with the decimal point of the radicand. In our preferred form the radicand is set into the left-hand keys of the keyboard, with the proper decimal point marker 89 set in the proper place. Then the control key aligned with the decimal point of the radicand is depressed to initiate the extraction of square root. It will be understood that depression of any of these keys first controls, automatically, the entry of the radicand factor set on the keyboard into the proper order of the accumulator, and then initiating the extraction phase of operation.

As shown in Fig. 1, we provide a plurality of decimal point, or square root initiating, keys 650 ordinarily arranged across the keyboard, each key aligned with the decimal point markers between the orders of keys of the keyboard, and to the right of the rightmost and left of the leftmost orders. In our preferred construction the keys 650 to the right of the odd numbered orders of the keyboard (i. e., to the right of the 1st, 3rd, etc. orders) are effective to initiate the entry of the radicand factor with the carriage positioned in the extreme right-hand position, or, as it is commonly called in connection with the Friden machine, in the 9th tabular position. On the other hand, the square root initiating keys 650 to the right of the even orders of the keyboard, (i. e., the 2nd, 4th, * 10th) are operative to initiate the entry of the radicand factor with the carriage in the next to the extreme right-hand position (commonly referred to as the "8" tabular position). The mechanism for accomplishing the entry of the radicand factor in the proper carriage position will be explained shortly, but, for the moment it is desirable to point out that utilization of the square root initiating keys as shown and described, automatically points off the radicand into the proper groups of two and then causes initiation of the extraction phase in the proper order of the radicand factor.

It can also be noted that the use of the plurality of initiating keys 650, as above described, can be used to facilitate the placing of the decimal point in the answer, or root. For this purpose we prefer that the keys be numbered as shown in Fig. 1. That is, the keys to the right of the 1st and 2nd orders of the keys 59 carry the numeral "5," while those to the right of the 3rd and 4th orders carry the numeral "6," those to the right of the 5th and 6th orders the numeral "7," those to the right of the 7th and 8th orders the numeral "8," those to the right of the 9th and 10th orders the numeral "9," and the key to the left of the 10th order the numeral "0." In our preferred form of machine, the decimal point marker 136 of the counter register is placed opposite the tabulating button 80 bearing the same number as the square root initiating key 650 depressed. In other words, when the decimal point is to the right of either the 10th or the 9th order, the square root control keys depressed will be marked "9" and the decimal marker 136 can be slid along its rail 137 until it is in line with the tabulator key 80 marked "9." This automatically gives the proper decimal point in the root, for there is a single group of digits to the left of the decimal point in the radicand, and therefore will be a single digit to the left of the decimal point in the answer, or root. Similarly if the decimal point lies to the right of either the 7th or 8th orders, the appropriate square root initiating keys are marked "8" and the decimal point marker should be slid along its rail so as to be in alignment with the tabulator key 80 marked "8." The decimal point in the root will be again properly marked off as in that case there are two groups of digits in the radicand. In cases where the square root of a decimal is being taken, the decimal point is located to the left of the keyboard, in line with the initiating key marked "0" and the radicand is entered on the keyboard from that point. Thus, if the decimal is ".625," then the "6" will be entered in the 10th order, the "2" in the 9th and the "5" in the 8th. On the other hand if the decimal is ".0625," the "6" will be entered in the 9th order, the "2" in the 8th and the "5" in the 7th. In all such instances the "0" key 650 will be depressed to initiate the extraction of square root, and the decimal point marker 136 should be slid along its rail so as to be in alignment with the tabulator key 80 marked "0." It is interesting to note that when the square root of a decimal is being extracted, the use of the "0" key 650 will place the decimal point properly in the root so that the root will have the proper number of zeros therein.

The square root control keys 650 are mounted in the keyboard frame 651 (see Figs. 18 and 21). Preferably the keys are provided with a slot 652 embracing a pair of parallel crossrods 653 which conventionally are utilized to tie the side pieces of the frame solidly together. The keys are normally urged to their raised position by means of suitable springs 654 surrounding the key stem and seated at the one end on the top of the keyboard frame and at the other on the underside of the enlarged key top. Each of the key stems is provided with an integral camming nose 655 as shown.

2. Initiating linkage

Associated with the cam nose 655 is a bail 660 extending transversely across the keyboard, underneath the floor of the keyboard frame. This bail is supported at its left end on an arm 661 mounted on a transverse shaft 663. The right-hand end of bail 660 is mounted in the lower end of a Y-shaped lever member, likewise mounted on the cross-shaft 663. Preferably the two arms 661 and 662 are rigidly secured to the cross-shaft 663 in order that both will rock in unison in order to provide an untwistable bail assembly. The right-hand arm 662 is provided with a pivot pin 664 on its upper point and an adjustable camming pin 665 on the rearwardly extending angle of the Y, as shown in Fig. 18.

The pivot pin 664 pivotally supports a short arm 670 (Fig. 18), the diameter of the hole engaging the pin 664 being substantially the diameter of the pin, whereby the arm 670 is not only rockable on the pin 664 but is translated forwardly upon the rocking of the Y-lever 662 (counter-clockwise in Fig. 18). The rear end of the short arm 670 is provided with an elongated square stud 671.

The pivot pin 664 also supports the forward end of a long link 675, which extends rearwardly beyond the rear wall 656 of the keyboard frame (see Fig. 19). The forward end of long link 675 is slotted, as at 676, to embrace the pin 664. Thus, rocking of the Y-lever 662 will not in itself translate the long link 675. The long link 675 is, however, provided with a shoulder 677 normally engaged by the square stud 671. It will be obvious that when the square stud 671 is seated behind the shoulder 677, the translation of the short link 670 will pull the long link 675 forwardly. However, the cam stud 665 will cam the short link 670 upwardly during the translatory movement, so that after a short forward travel of the two links 670 and 675, the short link 670 is rocked (counter-clockwise in Fig. 18) to disengage the square stud 671 from the shoulder 677, thereby permitting the long link to return to its rearward position, even through a control key 650 is held depressed.

The rear end of the long link (shown in Fig. 19) is pivotally supported on an arm 681, pivotally mounted on the right side of the keyboard frame 651 by any suitable means, such as stud 682. A spring 683 normally retains the long slide 675 in its rearward position. A second spring 679 is seated over the square stud 671 and also over an ear 678 on the long link 675 to resiliently urge the short link 670 to the rear and to rock the bail assembly 660 (clockwise in Fig. 18) into engagement with the rear edge of the key stems 650.

The rear end of the long link 675 is provided with a latching shoulder 680 adapted to engage the arm 701 rigidly secured to a transverse starting shaft 700 by any suitable means such as pin 704 shown in Fig. 19. This shaft is under considerable spring pressure from spring 750 (Fig. 25) tensioned between arm 751 secured to shaft 700 and the auxiliary control plate 752, to rock the shaft (counter-clockwise in Fig. 19). Such movement is normally prevented by the engagement of the arm 701 with the latching shoulder 680. As the long link 675 is moved forwardly by depression of the square root control key 650, the shoulder 680 is moved from under the arm 701, thereby permitting it to drop to initiate machine operation. However, regardless of whether the key is held depressed or not, the long link is returned to its rearward position by the force of its spring 683, which is greater than the strength of spring 679, as soon as the short link 670 has been cammed upwardly as previously described. In view of the fact that the spring pressure on starting shaft 700 is considerable, it is preferred that the rear end of the long link be provided with a nose 684 which rides upon a supporting bracket 685.

It will be recalled that heretofore the keyboard locking mechanism has been described (see Fig. 8 and the specification under the heading of "Keyboard lock mechanism"). When this mechanism is set to locking position, it will be recalled that the three-armed lever 418 is rocked clockwise in Fig. 8. In this position the upper end of the rearward arm of the three-armed lever rises to lift the pin 671 from engagement with the latching shoulder 677, the pin 671 being extended as shown in this figure to reach across the path of travel of this arm. Thus, when the keyboard lock is in operative position, the depression of a square root key rocks the short link 670 idly but cannot initiate an extraction operation. This interlock is desirable in order to prevent the initiation of a square root operation when a factor is latched in the keyboard, as either a wrong answer will be secured or the machine would be damaged by jamming through the attempted progressive selection in the selection mechanism, as hereafter described, with a value already locked in the keyboard.

3. Initiating shaft mechanisms

It has been mentioned that the starting shaft 700 is rocked (counter-clockwise in Figs. 19 and 20) by a relatively strong spring 750 tensioned between the left-hand control plate and an arm 751 rigidly secured to the left end of the shaft 700. The rocking of this shaft is operable to:

A. Initiate a dividend entry operation by depression of the dividend entering key 81, and holding it depressed through four additive cycles (the normal single cycle and three additional cycles) after the predetermined ordinal position of the carriage has been reached, the dividend entering key being held depressed for one further cycle by its conventional latch.

B. It conditions the entry control link by depressing its forward end in order that it may be moved rearwardly when the digitation control gate 116 is thrown into additive position when the tabulated position is reached.

C. It sets a clearing mechanism to operate the tabulating locking slide 602 (Fig. 16), in order to release any depressed tabulator key 80.

While all three of these operations take place simultaneously, as the control arms for each of them are rigidly secured to the shaft, they will be discussed in the order mentioned.

A. *Initiate radicand entry.*—From the standpoint of programming the operation resulting from the rocking of the initiating shaft 700, the first operation is the depression of the dividend entry key 81. The mechanism for this is shown particularly in Fig. 22. As there shown, a second arm 702 (Fig. 22), preferably integral with the arm 701, is fixedly secured to the starting shaft 700. This arm overlies a projection 703 on the dividend entry slide 470 (see Fig. 3). The rocking of the starting shaft 700 and arm 702 (counter-clockwise in Fig. 20) depresses the dividend entry key 81 and initiates a dividend entry series of operations. The mechanism which is effective, from the depression of key 81, to cause shifting of the carriage to the desired ordinal position and clearing of both registers, has already been described. It is automatically operated by the depression of any of the square root control keys, which, through the linkage just described, removes the latch 680 from under the arm 701, permitting the starting shaft 700 to rock to depress the dividend entry key 81.

B. *Conditions entry control link.*—A second thing accomplished by the rocking of the power shaft 700 is the conditioning of the dividend entry mechanism for the entry of the radicand five times into the register, in substitution for the usual single entry. In other words it is necessary to hold the dividend entering mechanism in operative position for four additional cycles of operation, and this is controlled, preferably, from the rocking of the shaft 700. The rocking of the shaft 700, however, can only condition the radicand factor control mechanism for operation, as obviously the entry of the radicand factor into the register can take place only after the carriage has been tabulated to the proper ordinal position. However, the mechanism which controls such radicand factor entering mechanism is conditioned upon the first rocking of shaft 700, and is retained in such potentially active position until the first cycle of additive operation controlled by the conventional dividend entering mechanism. When the plus-minus gate is shifted to additive position by the dividend entering mechanism heretofore described, the so conditioned mechanism is placed in operation.

The conditioning mechanism is shown particularly in Fig. 25. It has been mentioned that an arm 751 is rigidly secured to shaft 700, on the outside of the auxiliary frame plate 752, which is attached to the conventional left-hand control plate 757. This arm 751 is urged to the rear (clockwise in Fig. 25) by a relatively strong spring 750, the spring furnishing the power for rocking of shaft 700. The lower end of the arm 751 is provided with a pin 753 which is embraced within a slot 754 in a rocker arm 755 pivotally mounted on the control plate 757. The rocker arm 755 is provided with an ear 756 on its lower end, which ear is adapted to engage the upper edge of an entry control link 760. The construction of the mechanism associated with the link 760 will be described hereafter, in the description of the entry programming mechanism, but for the moment it can be noted that it normally is latched in the forward position shown by an integral shoulder 772 latching over a pin 773. The forward end of the link 760 is normally held against lateral displacement by a pair of flanges 774 formed on the pin 773. When the link is latched in its forward position, the entry mechanism is inoperative in order to prevent the square root entry mechanism from operating during an ordinary dividend entering operation. However, the rocking of shaft 700, through arm 751 and rocker 755 depresses the forward end of control link 760 to unlatch it from the pin 773, thereby permitting it to be drawn towards the rear of the machine when the shaft 118 is first rocked to provide for the normal single additive cycle of operation at the end of the tabulating operation.

C. *Sets clearing mechanism.*—The rocking of the starting shaft 700 is also operable to clear the tabulator keys, in the event any of them are depressed. It will be recalled that the entry of the radicand into the register must take place in our preferred form of machine in the extreme or next to the extreme right-hand carriage position. It is therefore essential that any depressed tabulator keys 80 be first released. This is most conveniently done by the rocking of the starting shaft 700.

Mechanism for the clearing of the tabulator buttons is shown in Fig. 24. An arm 708 is rigidly secured to the starting shaft 700. Immediately adjacent this arm is a second arm 709 which is rotatably mounted on the shaft. A suitable stop such as 715 on the second arm 709 prevents rocking of the latter (counter-clockwise in Fig. 24) beyond the position of the fixed arm 708. A suitable compression spring 710 seated between the two arms urges them apart, so that normally the arm 709 will follow arm 708 when the latter is rocked (counter-clockwise in Fig. 24) with the rocking of starting shaft 700. A push pin 711 is associated with the loosely mounted arm 709, being mounted for longitudinal movement through the frame plate 610, as shown. A compression spring 712 normally urges the pin forward against the arm 709. However, when the arm 709 is rocked counter-clockwise by the rocking of starting shaft 700, the push pin 711 is projected rearwardly, whereby the rear end thereof lies in the path of an ear 714 (see also Fig. 16) on the tabulator key latching slide 602 as the carriage moves into its extreme left-hand position during the first phase of the tabulating and clearing operation. By this means any tabulating key 80 locked in a depressed position is released by the shifting of the carriage into its extreme left-hand position, immediately prior to the clearing of the two registers. In the event the carriage is in such extreme position, when the control key 650 is depressed, the conical nose 713 of the pin 711 cams the locking slide 602 to the right as the force of spring 710 is sufficient to overcome that of spring 603 of the latching slide.

4. *Automatic carriage positioning*

It has been indicated above that the depression of a control key 650 in line with the decimal point of the radicand, is also operative to determine the ordinal position of the carriage in which the radicand factor is to be inserted. The mechanism for such selection is shown particularly in Fig. 20, and its construction and operation will now be described.

Various ways of effecting the control can be provided. We prefer, however, to set the mechanism so that the carriage will normally be tabulated to the extreme right-hand position. This is the proper position when there are an even number of whole digits in the radicand. We then provide mechanism for modifying this control to tabulate to the next to the extreme position when there are an odd number of whole digits in the radicand.

Associated with the control keys lying to the right of the even orders of the keyboard (i. e., the 2nd, 4th, etc.) are slides 690 supported underneath the keyboard frame. As shown in Fig. 21, it is preferred that the forward end of these slides 690 be supported in a slot 691 in the forward wall of the keyboard frame. The rearward ends may be supported by any suitable means such as a slot, or yoke, in the rear end of the slide 690 riding on a suitable round stud 692. The forward ends of slides 690 are slotted, as at 694, to engage the cam 655 on the key stem of the square root keys to the right of such even orders, whereby depression of such keys will move the associated slide 690 rearwardly as well as rock bail 660. Each of these slides 690 has a turned-over ear 693 which lies immediately in front of a transverse bail 695. The bail 695 is mounted in suitable arms 696, which preferably are rigidly secured to a transverse shaft 697 extending across the keyboard. Here, also, it is preferred that the arms 696 be rigidly secured to the shaft so that the two arms 696 and bail 695 form a solid assembly which will prevent twisting that would fail to operate the right-hand arm 696.

Associated with the lever 696 on the right-hand side of the keyboard frame is a resilient linkage comprising the forward link 720 pivotally secured to the arm 696, by any suitable means such as stud 698, and a rearward link 721. The two links 720 and 721 are resiliently connected together by a pin and slot arrangement which may comprise the pins 722 mounted on the link 720 that are embraced by slots 723 in the rearward link 721. The two links are resiliently urged into their retracted position by a suitable tension spring 724 (as shown in Fig. 20). It is obvious, however, that the bail 695 can be rocked, and the forward link 720 also, although movement of the rearward link 721 may be temporarily blocked. The rear end of the rearward link 721 is provided with a long pin 725 (see also Fig. 22) extending to the left to operate the mechanism by means of which the tabulating mechanism is operated to terminate shifting of the carriage in the next to extreme right-hand position, which, as previously described, is the proper position for the entry of the radicand factor when there are an odd number of whole digits in the radicand.

The linkage just described is latched in its forward position by a suitable latch 727 which is rotatably mounted on the shaft 700. This latch arm 727 is provided with a turned-over ear 728 extending to the right to overlie the arm 701 secured to the starting shaft 700, whereby the restoration of the starting shaft to its full-cycle, or inoperative, position lifts the latch arm 727 out of latching engagement with the rearward slide 721. The latching arm 727 is resiliently urged into latching engagement with the shoulder 726 of the link 721 by a small spring 729 tensioned between the turned-over ear 728 and the corresponding ear 730 on the arm 701. Thus, the latch 727 is resiliently urged to follow the arm 701, is inoperative unless arm 701 is released, and is restored when arm 701 is relatched in its inoperative position.

The forward translation of the slide 721 and its pin 725 is utilized to set the tabulating mechanism for controlling the entry of the radicand factor in the next to the highest ordinal carriage position (in the 8th position in the Friden machine), when the decimal of the radicand lies to the right of an even order on the keyboard. The mechanism therefor is shown particularly in Figs. 2, 16, 17, and 22.

A rocker lever 734 (Fig. 2) has an arcuate forwardly extending arm 735 which abuts the pin 725 when in its normal inactive position. The lever 734 is pivoted on any suitable means, such as stud 736 carried by a bracket 737 supported on the carriage rail 610. The forward translation of slide 721 and pin 725 rocks the arm 735 forwardly and downwardly (counter-clockwise in Fig. 2). The lower arm 738 of the rocker 734 engages the enlarged head 739 of a pin 740, which is slidably mounted in the tabulating control arm 605. The pin projects through the arm 605 and also through an aperture 741 in the carriage rail 610. A suitable spring 742 urges the pin 741 forwardly to engage the lower arm 739 of the bellcrank, as is shown in Fig. 2. The rearward end of the pin 741 is provided with an arcuate cam face 743, best shown in Fig. 17. The pin and cam face can be held against rotation by any suitable means, such as spring clip 744 shown in Fig. 2.

It is thus obvious that the forward translation of slide 721 and its pin 725 causes rocking of the bellcrank 734 (counter-clockwise in Fig. 2) to project the pin 741 rearwardly. The pin 741 is spaced one ordinal space to the left (when viewed from the front as in Figs. 16 and 17) of the regular roller 606 carried by the tabulating arm 605, and when in its projected or rearward position, is in the plane of the tabulating keys 80. Thus, when the pin is projected rearwardly it will engage a depressed tabulator key 80 one ordinal space before it would be engaged by the roller 606. It will be recalled, however, that all of the tabulator keys have been cleared during the clearing of the carriage, while it is in the extreme left-hand position. However, in order to control tabulation in square root extraction to either the 8th or the 9th position, we prefer to lock the number "9" tabulator key against depression by any suitable means such as pin 745 and to lengthen it as shown at 746 in Fig. 16. The "9" tabulator key is thus always effective to terminate carriage shifting in the extreme right-hand position of the carriage and initiate a dividend entry. However, when there is an uneven number of digits in the radicand, (i. e., when the decimal point lies to the right of an even order of the keyboard) the radicand factor should be entered into the accumulator register in the 8th tubular position, the position next to the extreme right-hand position of the carriage. Thus, when a square root initiating key 650 lying to the right of an even order of the keyboard is depressed, the bellcrank 734 is rocked to project the pin 741 and its integral cam 743 into the path of travel of the elongated number "9" tabulator key, thereby stopping carriage shifting and controlling the entry of the radicand factor into the accumulator carriage in the next to extreme position of the carriage.

From what has been described heretofore, it is obvious that the depression of any square root control key 650 is operative to pull the slide 675 forwardly to unlatch the arm 701 on shaft 700, permitting the shaft to rock (counter-clockwise in Figs. 19 and 20). The rocking of the starting shaft 700 causes its fixed arm 702 to depress the dividend entry key 81, thereby initiating a series of operations which includes the shifting of the carriage to the extreme left-hand position, clearing both registers in that position and then shifting the carriage to the right to the selected ordinal position. The rocking of the starting shaft 700, by means of the linkage shown particularly in Fig. 24, also conditions the camming pin 711 to translate the tabulating latch slide 602 to the right to release any depressed tabulator key 80, by engaging the ear 714 thereon, as the carriage shifts into the extreme left-hand position; or in the event that it is in that position, then the cam nose operates immediately to move the latching slide. In those cases in which there is an odd number of whole digits in the radicand, the tabulating mechanism is conditioned to enter the radicand factor into the accumulator register 52 in the next to the extreme right-hand position of the carriage, while in all other operations the carriage is tabulated to the extreme position.

5. Radicand entry control mechanism

When the carriage reaches the proper ordinal position, the rocking of the tabulating control arm 605 (Figs. 15 and 17) by the elongated "9" tabulating key engaging either the roller 606 or the projected pin 739, results in depression of the link 588 (Fig. 15) to terminate carriage shifting and release the trigger 594 to enter the keyboard value into the register once. It will be recalled that the releasing of the trigger 594, by rocking of the latch 593, causes rocking of two-armed lever 596 which is fastened to the shaft 118. The shaft 118 is therefore rocked, and with it the gate 116 mounted thereon, to position the add gears 112 in mesh with the accumulator gears 114. This rocking of shaft 118 is effective to trip the radicand factor control mechanism to cause the entry of the radicand into the accumulator five times, or four more than is conventional in the dividend entry mechanism previously described. The radicand entry control mechanism is effective to latch the dividend entry mechanism previously described in its operative position for four additional cycles, and is then effective to clear the keyboard and the square root extracting programming mechanism, and to initiate a division operation. This control mechanism is shown in Figs. 25 to 35, inclusive, and particularly Figs. 25 and 32.

It will be recalled that the rocking of the shaft 700 (clockwise in Fig. 25) is operative to rock the rocker 755 counter-clockwise. The rocking of the rocker depresses the forward end of the entry control link 760, thereby unlatching it from its associated pin 773. The lever 760 extends rearwardly, its rear end being supported on a pin 761, and is resiliently urged to its raised position shown in Fig. 25 by a suitable spring 763. The pin or stud 761 which supports the rear end of the arm 760 is riveted on an arm 762 of a bail 764. The bail 764 is rotatably mounted on a transverse shaft 770, which extends between the right side frame and an auxiliary plate 777 mounted on the left-hand control plate 757. Integral with the bail 764 is a latch arm 765 (best shown in Fig. 32), extending forwardly to a point adjacent the lower end of a lever rigidly mounted on plus-minus gate shaft 118. The arm 765 is formed to constitute a shoulder 766 adapted to engage, and latch against, a pin 768 in the lower end of a two-armed lever 769 rigidly secured on the control shaft 118 when the gate shaft is in its additive position. This latching arm is resiliently urged downwardly by a suitable spring 771. The arm adjacent the shoulder 766 is provided with a nose 767 adapted to ride upon the pin 768 when the plus-minus gate 116 is in its neutral, or disengaged, position, and the control link 760 has been unlatched. Thus, when the long lever 760 is unlatched to permit rocking of the bail 764 and the dividend entry mechanism positions the digitation control gate 116 and shaft 118 in their additive positions, the spring 771 rocks the bail 764 (clockwise in Figs. 25 and 32), to enable the shoulder 766 to latch behind the pin 768, and thereby hold the digitation control gate in its additive position until the bail is restored to its latched position, as hereinafter explained. It will be obvious that as long as the starting shaft 700 is in its rocked position, which angular position it retains until the end of the fourth additive cycle of entering the radicand factor, the rocker 755 holds the link 760 out of engagement with its pin 773, thereby permitting the link to be withdrawn rearwardly by the force of spring 771 as soon as the bail is free to rock.

The rearward movement of the link 760, under the pressure of spring 771, at the start of the first factor entering cycle (when the shaft 118 first rocks to cause engagement of add gears 112 with accumulator gears 114) is operative to condition the restore mechanism to terminate the additive cycle at the end of five cycles of operation, and to thereafter clear the value from the keyboard and initiate operation of the division mechanism and the square root programming mechanism. For this purpose the link 760 is provided with a cam nose 775 (see particularly Figs. 28 and 32) which is adapted to engage a pin 798 on rockable gear plate 797 whereby the continued rotation of the drive shaft 110 will be operative to effect the controls previously mentioned.

The link is also provided with a pin 776 (Figs. 25 and 32) which engages a rocker latch 780, rotatably mounted on the control plate 757 by any suitable means such as stud 781. The latch is biased (clockwise in Fig. 32) by a suitable spring 782. This rocker is also provided with a latching shoulder 783 adapted to engage a pin 784 on the lower end of holding pawl 785. The holding pawl 785 is also pivotally mounted on the frame plate 757 by any suitable means, such as screw 786, and is provided with a nose 787 adapted to engage the teeth of gear 794 and to hold it against counter-lockwise rotation. The holding pawl 785 is urged against the gear 794 (clockwise in Fig. 32) by the spring 782, which also urges the latching arm 780 into latching engagement. Thus, the rearward movement of the link 760 is operative to simultaneously cam the pin 798 and its integral plate 797 downwardly from the position shown in Fig. 28 to that shown in Fig. 32, and also to rock the latch arm 780 to its releasing position (from the clockwise position shown in Fig. 25 to the counter-clockwise position shown in Fig. 32).

It has been mentioned that the rocking of the bail 764 pulls the link 760 rearwardly, whereby the cam nose 775 on the link engages the pin 798 on the gear plate 797 to enable the feed which is operative, at the end of five additive cycles, to restore the various mechanisms heretofore described, to clear the keyboard, and to enable the division control mechanism. The mechanism for this purpose is best shown in Figs. 28 and 32. As there shown, the drive shaft 110 carries a wide single toothed drive gear 793 at its extreme left end. Associated with the single tooth driving gear 793, is a mutilated driven, or control gear 794. This latter gear is rotatably mounted on a stub shaft 803 carried by the control plate 757. The control gear 794 has a number of teeth removed, and in the full-cycle position of the square root control mechanism, the blank portion 795 of the gear lies opposite the single tooth gear 793. This construction enables the single tooth gear 793 to rotate constantly without engaging any teeth on the gear 794 until the machine is conditioned for the first entry of the keyboard value into the accumulator. Associated with the driven gear 794 is a floating engaging plate 797, also rotatably mounted on the stub shaft 803. This engaging plate 797 carries a pin 798 which is engaged by the cam nose 775 of the link 760, thereby rocking the plate downwardly as link 760 is pulled rearwardly. Movement of floating plate 797 is limited by a stop pin 792 which extends into an aperture 796 in the gear 794. Normally the plate is urged to the inoperative, or counter-clockwise, position shown in Fig. 28, by a spring 800 tensioned between the rear end of the plate 797 and a spring seat on bracket 801 riveted to the gear. Associated with the bracket 801 is a riveted pin 802, preferably located 12 teeth from the one normally engaged by the nose 787 of the holding pawl 785. This pin 802 is operative to rock the holding pawl 785 (counter-lockwise in Fig. 32) at the end of the 6th cycle of operation, at which time the holding pawl latch 780 is in its operative position to latch pawl 785 and thereby to release the gear 794.

The floating engaging plate 797 is also provided with a single tooth 799 which in the normal position of the plate 797 lies outside of the path of travel of the tooth on drive gear 793, and which in the rocked position of the plate 797 lies in the path of travel of such tooth. Thus, when the plate 797 is cammed downwardly by the nose 775 on the link 760 the single tooth 799 thereon is rocked downwardly into the path of travel of the wide gear 793, whereupon the single tooth gear 793 will engage this tooth 799 and rotate the gear 794 through an angular distance equivalent to two teeth on the latter. The relative position of the single tooth 799 and the teeth on gear 794 is shown in Figs. 30 and 31, which are front views of the gear and plate 797 in the positions shown in Figs. 28 and 32, respectively. It is obvious that the single tooth 799 on the engaging, or floating, plate is operative only in the first cycle of operation after the link 760 is moved rearwardly, for as soon as the gear 794 is rotated (clockwise in Fig. 32), the single tooth on the drive gear 793 will release the tooth 797, and as the gear has been rotated away from the nose 775, the spring 800 returns the plate to its normal position. However, the rotation of the gear 794 will have caused the teeth thereon to rotate into the path of travel of the single tooth gear 793, with the result that thereafter, on each machine cycle, the wide gear 793 drives the program gear 794 through a space equivalent to two teeth. It will be recalled that the movement of the link 760 released the holding pawl 785 to the force of its spring, whereby it is enabled to latch the gear 794 in each rotated position. It should be mentioned that in these figures the drive gear 793 is shown in its full-cycle position, and that the rotation of the driven gear 794 occurs, toward the end of the third quarter of main drive shaft rotation, or after the digitation phase of each cycle of machine operation.

In Fig. 32, the unlatching pin 802 is shown in phantom lines 804, in the position in which this pin will be at the end of the fifth cycle of operation. It can be mentioned here that at this point the digitation control bail 116 and its shaft 118 will have been released from latch 765 by the rocking of bail 764 from the restoring mechanism hereafter to be described. The link 760 will be therefore moved to its forward position, and the latching rocker arm 780 will be released by pin 776. On the next cycle of operation the pin 802 will move from position 804 to engage the nose 787 of the holding pawl 785, rocking it counter-clockwise from the position shown. Thereupon the holding pawl 785 is latched by the latching arm 780 and the gear 794 is released from the operation of holding pawl 785.

The gear 794 also carries a pin 805 rigidly secured thereto, which at the end of the third cycle of operation, engages a shoulder 806 behind the camming nose 775 on the link 760, thereby positively pulling the link forward near the end of the fourth additive cycle of operation, thereby rocking the bail 764 (counter-clockwise in Fig. 32) towards its disengaging position. Thus, in the fourth cycle the link 760 is pulled partially forward and the arm 765 partially lifted off the pin 768, and this operation is completed at the end of the fifth cycle to restore the link 760 and bail 764 to their original full-cycle position. At this time the rocker 755 will have been returned to its original position shown in Fig. 25, thereby permitting the link 760 to rise under the force of its spring to cause its shoulder 772 to again relatch over the pin 773.

A second, or cam, gear 810 is pivotally mounted on the control plate 757 by any suitable means, such as screw 811, and is constantly enmeshed with the driven, or control, gear 794. This cam gear 810 is normally urged to the clockwise position shown in Figs. 28 and 32, by a tension spring 812 seated on a suitable stud on the auxiliary frame plate 777 and another stud on the gear. This cam gear 810 is obviously rotated in a counter-clockwise direction upon rotation of the control gear 794, against the tension of its spring 812. A pair of cams are riveted or otherwise secured to the cam gear 810, both of which are utilized to terminate the radicand factor entering operation and restore the starting shaft 700 and the entry mechanism to normal position. One cam 813 is shown in the present embodiment, as located on the left, or outside, of the gear 810. This cam is provided with a somewhat concave pocket 814 adapted to engage the roller 823 of the cam follower arm 822, when the cam is in its starting position.

This construction is preferred as the cam follower roller 823 will lie within the concave notch 814, blocking the gear 810 against overthrow. This cam is provided with a gradual rise of a length equivalent to four cycles of machine operations, as shown, followed by a sharp rise 815. Thus, during the course of the first four cycles of additive operation, the gear 810 and cam 813 will be rotated (counter-clockwise in Fig. 32) until the roller 823 will lie against the sharp rise 815 of the cam, in the position indicated by the phantom circle IV. During the next cycle of operation the follower roller 823 will be lifted by the sharp rise 815 to the high edge 816 of the cam, thereby camming it outwardly to the outer position indicated by the phantom circle V, where it is retained during the sixth cycle, as it rides upon the high edge of the cam 813. During the sixth cycle the holding pawl 785 is released, permitting the spring 812 to return the gear 810 and cam 813 to their original positions, which returns the follower rocker 822 sharply to its initial position.

A cam follower rocker arm 822 is rotatably mounted on the stub shaft 803 (as shown in Figs. 25 and 33). This arm carries the roller 823 which engages the edge of the cam 813 just described. The rocker 822 supports two links 824 and 830, and positions a programming rocker 835. These mechanisms serve the following purposes:

A. Link 824 actuates the mechanism for releasing the dividend entry controls during the 5th cycle of additive operation.

B. The forward link 830 controls the clearing of the keyboard and the initiation of the division operation, together with setting the counter control for a true quotient.

C. The rocker 835 acts as a program control to properly condition the square root programming mechanism which follows the initiation of division, and before the actual extraction of square root begins.

A. *Release dividend entry mechanism.*—A rearwardly extending link 824 is pivotally secured to the lower arm of rocker 822, and is supported at the rear end by an arm 825 to which it is pivotally secured. The arm 825 is rigidly secured to a transverse shaft 826, the rocking of which is utilized to release the dividend entry mechanism as will be described hereafter. A relatively strong spring 827 urges the arm 825 forwardly (clockwise in Fig. 25), and is sufficiently strong to urge the follower lever 822 counter-clockwise into engagement with the cam 813.

It is obvious that the cam follower arm 822 is rocked slightly (clockwise in Fig. 25) during each of the first four additive cycles of operation, and rather sharply during the 5th cycle of operation. This sharp rocking at the end of the 5th cycle is operative to sharply rock the transverse shaft 826. The right end of the shaft 826 (see Fig. 7) carries an arm 1103 rigidly secured thereto. A link 1104 connects the arm 1103 to a similar arm 1105, rigidly mounted on the transverse shaft 770. It is thus obvious that the rocking of the follower arm 822 during the 5th additive cycle of operation, rocks the shaft 826, lifting link 1104, and rocking shaft 770. The rocking of shaft 770, by means of arm 623 and link 622 previously described, rocks the bellcrank 617 (see Fig. 13) to withdraw the latch 471 and release the dividend entry key. It can be mentioned that prior to the 5th cycle of operation the second cam 817 has operated to restore the shaft 700 to its original inoperative position whereby the dividend entry key is free to rise at this point.

B. *Clear keyboard and initiate division.*—The forwardly extending link 830 is also pivotally secured to the lower end of the follower rocker 822. This link is supported at the front of the machine by an arm 831 to which it is pivotally connected. The arm 831, in turn, is rigidly secured to a transverse shaft 832, the rocking of which is utilized to release the value set in the keyboard at the end of the fifth cycle of additive operation, and its return to normal position thereafter is effective to set the counter mechanism for unlike registration and initiate operation of the division mechanism as will now be described.

As just indicated, the rocking of shaft 832 during the fifth additive cycle (upon movement of the roller 823 particularly from the IV to the V positions shown in Fig. 32) clears the values from the keyboard. This clearing occurs after the end of the digitation phase of the fifth cycle, and before the end of that cycle. The mechanism for so clearing the keyboard is shown particularly in Fig. 8. It will be seen in this figure that the shaft 832 (which is rocked clockwise in this figure) carries a depending arm 860 provided with a perpendicular ear 861 which engages the clear bail 95 and rocks the latter rearwardly. This arm and clear bail are so adjusted that the sharp rocking movement which occurs during the fifth cycle of operation, as the follower goes from the IV to V position of Fig. 32, is effective to rock the bail 95 to its full clearing position, thereby releasing the value set into the keyboard.

The rocking of the arm 860 (clockwise in Fig. 8) also causes rocking of the latching arm 862 downwardly (clockwise in Fig. 8). This rocking of the latching arm 862 is caused by the ear 861 engaging the cam nose 863 on the end of the latching arm. This latch 862 is associated with the clearing mechanism for clearing the square root selection mechanism which will be described in detail hereafter. It can be mentioned here that all clearing operations, whether initiated by the keyboard clear key 61 or by any of the automatic mechanisms which rock the clear bail 95, are effective to cause rocking of the two-armed lever 1095 (Fig. 8) if it is in its counter-clockwise, unlatched position. The rocking of this lever clears any value standing in the square root extraction mechanism, as will hereafter be described. Normally this arm is latched in its clockwise, or operative, position by the latch arm 862, but this latch is released by the rocking of arm 860 which has caused clearing of the keyboard. Consequently, any value that might have been standing in the square root selection mechanism is erased, and the square root control mechanism is ready for operation.

The rocking of the shaft 832 to the extreme position caused by roller 823 moving to the V position of Fig. 32 also has conditioned the means for tripping the division initiating lever 272 (Fig. 5). The mechanism for initiating division is shown particularly in Figs. 5 and 35. As shown in Fig. 35, the shaft 832 extends through the right-hand frame plate, and on its outer end is provided with an arm 867 rigidly secured thereto. A link 868 pivotally connected to the arm 867 extends rearwardly, and is supported by an extended pin 870 carried by the upper end of the rocker 869. The rocker is pivotally mounted on the control plate 165 by any suitable means, such as stub shaft 871. A clutch control lever 873 is associated with the link 868 and arm 869, being mounted on the control plate 165 by any suitable means, such as stud 874. The clutch control arm 873 is operated from the link 868, by means of a bifurcation 872 in the lower end of the clutch control lever, which bifurcation engages the elongated pin 870. This clutch control arm has a contact edge 875 normally lying below the ear 161 on the clutch control link 155 but operable to lock the ear in its rearward, operative position when the arm is rocked. By this means the conditioning of the initiating mechanism, which occurs as the cam follower roller 823 goes from its full-cycle to its V position, rocks the arm 873 (counter-clockwise in Fig. 5), so that the contact edge 875 lies in front of the ear 161, thereby holding the clutch control slide in its operative position to hold the clutch engaged and the motor switch closed.

A division initiating link 880 is pivotally secured to the lower end of the rocker 869 by any suitable means, such as stud 881. The rear end of this link is resiliently urged to a raised position by means of a tension spring 882 tensioned between the rear end of the arm 880 and the forward finger 265 of the division trigger latch 266. The forward end of this link 880 is provided with a hooked shoulder 883 adapted to engage a pin 884 on the counter-control lever 347. The rear end of the division initiating link is notched, as at 885, to engage a pin 886 on the latch 266.

It will be recalled that as the cam follower roller 823 is rocked from its full-cycle to its V position, the long link 830 on the left side of the machine (see Fig. 33) is pulled rearwardly, rocking shaft 832 (clockwise in Fig. 33 and counter-clockwise in Figs. 5 and 35). This rocking of the shaft pushes the link 868 rearwardly, thereby rocking the clutch engaging arm (counter-clockwise in Fig. 5) to lie before the ear 161 of the clutch control slide. It also rocks the division initiating link 880 forwardly so that the upper edge of the rear end of the link, which normally is held in the disengaged position by the pin 886, moves from under the pin, and the notched end is then moved upwardly by the spring 882 to engage the pin 886. Simultaneously the hook 883 at the forward end of the link has dropped over pin 884. The movement of these parts is shown by comparison of Figs. 5 and 35, Fig. 5 showing this mechanism in its full-cycle, or disengaged, position and Fig. 35 showing it in the position which it assumes at the end of the fifth additive cycle of operation, when the follower roller 823 is in the V position. During the sixth cycle, the pin 802 (see Fig. 32) rocks the holding pawl 785 out of engagement with gear 794, thereby releasing gear 810 and its integral cam 813 to the control of the spring 812. Upon return of the cam to its full-cycle, or inoperative position, the strong spring 827 snaps the link 824 and link 830 forwardly, rocking shaft 832 (counter-clockwise in Figs. 25 and 33 and clockwise in Fig. 35). The clockwise movement of shaft 832 pulls the link 868 forwardly, thereby pulling the lower end of the counter control lever 347 to the rearward, or unlike, counting position (counter-clockwise in Figs. 5 and 35) and pushes the latch arm 266 rearwardly to disengage the division control trigger 272 and initiate a division operation.

It will be recalled that the division aligner mechanism previously described always operates, upon the initiation of division, to cause shifting of the carriage to the right to align the divisor and dividend. If the radicand has been properly placed on the keyboard, that is, at the left-hand side thereof, this mechanism will operate the shifting mechanism to cause shifting of the carriage to the extreme right-hand position, if not already there. If the carriage is in the extreme right-hand position, then there will be an attempted ordinal shifting of the carriage (which still requires three cycles of machine operation), such attempted shift being necessary to release the left shift clutch to the control of the division programming mechanism. Thus, in any event there will be three cycles of operation following the initiation of division, which cycles can be used to condition the square root programming mechanism for its proper operation.

C. *Delay latch.*—Means is also provided for blocking operation of square root programming mechanism until the carriage is in its extreme right position in those cases where a shift occurs after the entry of the radicand factor. This means is under the control of a delay latch or control lever, and is shown particularly in Figs. 25 and 33. A control rocker 835 is also pivotally mounted on the stud shaft 803, lying immediately adjacent the follower rocker 822. This control rocker is provided at its lower end with a slot 836 which embraces a pin 837 in the follower rocker 822. The upper arm of the control rocker 835 carries a pin 838 which lies within a slot 839 in a control arm 840, which in turn is rigidly secured to a short shaft 841 extending between auxiliary frame plate 752 and left-hand supporting plate 83 (Figs. 33 and 37). The short shaft 841 carries a depending arm 892 rigidly secured thereto which is urged toward the rear of the machine by strong spring 891 (see Fig. 39). The pin and slot connection 837, 836 causes the control rocker 835 to follow the rocking movement of 822, rocking the shaft 841 (counter-clockwise in Figs. 25 and 33) against the tension of its spring 891.

The control rocker 835 carries a square latching stud 842, adapted to be engaged by a latch member 843, the latch being pivotally secured to the frame plate 757 by a stud 844. The latch member 843 is biased into engagement with the stud 842 by a suitable spring 845. Normally the nose of the latch 843 will ride on the square stud 842 as is shown in Fig. 25. However, as the arm 835 is rocked to its operative position (shown in Fig. 33) during the sixth cycle of operation (counting from the first additive cycle) the latch 843 is resiliently urged into latching engagement with the square stud. The latch arm 843 carries a turned-over ear 846 which, in the latching position, is engaged by the single tooth of drive gear 793, whereby the latch will be released and the control arm 835 permitted to return to its normal position, by the force of spring 891 at approximately the end of the first quarter of the seventh cycle.

It has been mentioned that the delay latch mechanism is rocked to its extreme position during the 6th cycle of operation, the arm 835 being held by the latch 843. The division operation is initiated at the end of this cycle, when the stud 802 rocks the holding pawl 785 (Fig. 32) into its latched position and releases the driven gear 794. The latch 843 is released in the next cycle of operation, which occurs during the first one of the three cycles of the shift or attempted shift above-mentioned. The mechanisms controlled by the shaft 841 and the reason for delaying its release until after division has been initiated, and the possible carriage shift initiated, will be explained hereinafter under the heading of "Square root programming mechanism."

6. *Restoring starting shaft to original position*

The force of spring 750 (Figs. 25 or 33) will hold the starting shaft 700 in its operative position until the power operated restoration of the shaft 700 to its original position, which occurs in the fourth cycle of additive operation. The restoration is under the control of a cam 817 which is affixed to cam gear 810, preferably on the inside, or right side, of the gear 810. This cam is provided with a constant rise from its low to its high point, it taking four cycles of operation for its follower roller 851 to move from the low point shown in Fig. 28 to the high point shown in Fig. 33. The mechanism for accomplishing this restoration is shown particularly in Fig. 34. It will be recalled that the cam 817 is rigidly secured to the gear 810, and will therefore rotate with it. Associated with the cam 817 is a bellcrank follower 850 which is pivotally secured to the frame plate by any suitable means, such as stud 852. The rearward end of the bellcrank 850 carries a roller 851 which engages the edge of the cam 817. The upper arm of the bellcrank carries a roller 853 which engages an arm 854 rigidly secured to the shaft 700. Thus, the rotation of gear 810 on the stud shaft 811 causes the cam 817 to rock the bellcrank (clockwise in Fig. 34), to rock the shaft 700 to its original, or full-cycle, position. It will be recalled that the shaft 700 is latched in this position even though a square root initiating key is held depressed, through the breakable connection between the short link 670 and long link 675 (Figs. 18 and 19) previously discussed. It might be mentioned that Fig. 34 shows the cam 817 in its extreme position, which occurs at the end of the fourth cycle of additive operation, the cam and its follower being shown in their normal position in Fig. 28. Thus, the shaft 700 is not restored to its latched position until the end of the fourth cycle of additive operation.

The operation of the radicand factor programming mechanism can probably be more readily understood by a resume of operations in each of the six cycles of operation just discussed. The dividend entry mechanism, which has been set to operative position by the rocking of the starting shaft 700, will have been effective to clear the registers and to shift the carriage to the right to either the extreme or immediately adjacent the extreme right-hand position. As the carriage shifts into the proper position, which depends upon which of the square root initiating keys 650 has been depressed, the operation of the tabulating lever 605 terminates the carriage shifting phase and rocks the latch 593 to release trigger 594. The machine has therefore been conditioned for an additive cycle of operation, by the trigger rocking the plus-minus gate into additive position. The rocking of the gate has permitted the bail 764 to rock, latching the gate in additive position and pulling the link 760 rearwardly. The operations which occur during the following cycles are as follows.

First cycle:
    I. The radicand standing on the keyboard is entered into the accumulator.
    II. The floating tooth 799 is engaged by the single toothed drive gear 793, and the idler gear 794 and cam gear 810 are thereby fed two teeth and held in the adjusted position by the holding pawl 785 (the rotation of the idler and cam gears occurs toward the end of the 3rd quarter of operation of the main drive shaft in each of these cycles of operation). Rotation of the two gears causes:
        A. Slight rocking of the cam follower arm 822.
        B. Initiates tensioning of the gear return spring 812.

Second cycle:
    I. The radicand is entered into the accumulator a second time.
    II. The idler gear 794 and cam gear 810 are fed two more teeth, which:
        A. Rocks cam follower 822 slightly further.
        B. Tensions the return spring slightly more.
        C. Initiates rocking of the starting shaft restore arm 854.

Third cycle:
    I. The radicand is entered into the accumulator a third time.
    II. The idler gear 794 and cam gear 810 are fed two more teeth, which:
        A. Rocks the cam follower arm 822 slightly further.
        B. Further tensions the return spring 812.
        C. Further rocks the starting shaft restore arm 854.

Fourth cycle:
    I. The radicand is entered in the accumulator a fourth time.
    I. The idler gear 794 and cam gear 810 are fed two more teeth, which:
        A. Rocks the cam follower arm 822 slightly further (bringing the roller 823 to the IV position of Fig. 32).
        B. Further tensions the return spring 812.
        C. Rocks the arm 854 of starting shaft 700 to its extreme position, allowing:
            1. The shaft 700 to be relatched, although the dividend entry key 81 remains latched down by its conventional latch 471.
            2. Rocks the rocker 755 out of engagement with the control link 760.
    III. The stud 805 on idler gear 794 has engaged the shoulder 806 of the control link 760, and partially returned it to its latched, inoperative position.

Fifth cycle:
    I. The radicand is entered in the accumulator a fifth time.
    II. The idler gear 794 and cam gear 810 are fed two more teeth, which:
        A. Rocks the came follower arm 822 sharply (from the IV to the V position), and this, in turn does the following:
            1. Through link 824 (Fig. 25) rocks shaft 826 to unlatch the dividend entry key 81 and the mechanism controlled thereby.
            2. Through link 830 rocks shaft 832 to its extreme position, thereby:
                *a.* Clearing the keyboard, through rocking of arm 860 (Fig. 8); also releasing clear latch 862.
                *b.* Rocking clutch arm 873 (Fig. 5) into locking position.
                *c.* Positions division initiating link 880 (Fig. 5) in operative position.
            3. Rocks delay arm 835 to its extreme position, in which it is latched.
    B. Further tensions return spring 812.
    III. Stud 805 on idler 794 completes forward translation of control slide 760, which is then latched in its forward inoperative position, thereby allowing the plus-minus gate to return to neutral at the end of that cycle by conventional means.

Sixth cycle: (The plus-minus gate having been released at the end of 5th cycle, it was immediately returned to neutral by its centralizer springs, thereby preventing the entry of a count into the counter register 53 during the sixth cycle).

I. The idler gear 794 and cam gear 810 are fed two more teeth, which brings the pin 802 into engagement with the holding pawl 785, rocking the latter counter-clockwise where it is relatched by the latching arm 780, the return of the two gears being prevented until the single tooth on gear 793 has passed out of mesh with the idler gear 794.

II. As soon as the drive gear 793 has passed out of mesh with idler 794, the return spring 812 rapidly rocks the two gears back to their original position, overthrow being prevented by the cam follower roller 823 entering the pocket 814 on the cam.

III. The release of the cam gear 810 enables the cam follower arm 822, under the force of spring 827 to rock to its initial position, thereby rocking the shaft 832 in a reversed direction, which, through link 863, arm 869 and division initiating link 880, initiates a division operation, and also sets the counter control.

Seventh cycle:

I. Latch 843 is released by drive gear 793, thereby permitting delay arm to be returned to its original, or full cycle, position.

II. Division aligner mechanism operated to provide for shift of the carriage to the extreme position if not already there; if in the extreme position, the aligner mechanism starts the first of three idle aligning cycles to release the right shift clutch and enable the left shift clutch.

7. Square root programming mechanism

It will be recalled that the control gear 794 is released by the single tooth drive gear 793 shortly before the end of the 6th cycle of operation (actually at approximately the 300° position) and thereupon the cam follower rocker 822 and the links connected thereto are rocked sharply back to their full-cycle position. During the five cycles of operation the delay arm 835 will have been rocked to its extreme forward position (clockwise in Figs. 25 and 33) and there latched by the delay latch 843. This latch is released at approximately the 90° point in the next, or seventh, cycle which, in turn, releases shaft 841 and the mechanism controlled thereby. The shaft will be rocked sharply (clockwise in Figs. 25 and 33) by means of a spring 891 tensioned between a stud on the frame plate and a depending arm 892 (see Fig. 39) pinned or otherwise secured to the shaft 841, preferably to the immediate right of the auxiliary control plate 752. The rocking of the shaft 841 (clockwise in Figs. 25 and 33, and counter-clockwise in Fig. 39) conditions the controls for the square root selection mechanism as will now be described. The delay in operation, by latching of arm 835, for a partial cycle of operation, is provided in order to delay conditioning of the power operated selection mechanism (which provides the necessary progression of the subtrahend) by the mechanism just described until other controls have been set by operation of the division mechanism.

The rocking of the shaft 841, as it is restored to its normal, or home, position, operates two arms which control the square root programming mechanism: (A) The first arm causes a shift of the cam shaft (of the selection programming mechanism) into operative position if the carriage is in its extreme right-hand position, and conditions a mechanism for such shifting as soon as the carriage is in its extreme position, if the entry of the radicand factor occurred in the next to the last carriage position; and (B) the second arm operates a mechanism which inserts a value of "5" in the 9th order of the keyboard, thereby providing for the first subtraction of "5" in the first digitation cycle as is required to carry out the program described in the early part of the specification. These mechanisms are shown particularly in Figs. 36 to 40, inclusive.

A. *Cam shaft shifting.*—The first mentioned of these mechanisms comprises an arm 895 (see particularly Fig. 40) depending from, and rigidly secured to, the control shaft 841. On the lower end of the arm 895 is pivotally mounted a pusher arm 896, urged in an upward direction by a suitable spring 897 tensioned between the two arms. The pusher arm extends rearwardly, and at its rearward end is provided with a suitable latching shoulder 898 adapted to engaged and operate a lever 904. The arm is also provided with a stud 899 which is utilized to render the arm 896 inoperative in all operations except division.

The desired control, i. e., rendering arm 896 inoperative in all operations of the machine except division, is preferably secured by means of a link 915. The link 915 is provided with a turned-over ear 916 at its upper end, which ear overlies and engages the stud 899 on the arm 896. The link is provided with a slot 917 which engages a bracing bar 918, to hold the link 915 in its proper position. The lower end of the link 915 is pivotally secured to an arm 919 which is rigidly secured to the shaft 317. The shaft 317 (see also Fig. 4) is rocked by the rocking of the connecting lever 279 at the very outset of a division operation, the shaft being rocked clockwise in Fig. 40. Thus, during all division operations the link 915 is raised, thereby permitting the arm 916 to rise to engage the arm 904 if the mechanism is set for the extraction of square root. In normal division operation the arm 896 will remain inoperative to adjust the square root programming mechanism (even though link 915 be raised), as the arm 896 will lie below the arm 904, rather than engage it. It is obvious that the shoulder 898 cannot rise to engage the edge of the arm 904 until the shaft 841 is rocked during the preliminary conditioning of the machine for the extraction of square root, which occurs in the five additive cycles by the rocking of delay arm 835 and shaft 841, as previously described. When this shaft is rocked (clockwise in Fig. 40), during the five additive cycles, the arm 896 is pulled forward and the spring 897 lifts the arm, enabling the shoulder 898 to engage the arm 904 as soon as the division mechanism has been tripped. It will be recalled that the shaft 841 is not released until the next cycle of operation after division is initiated, whereby the link 915 will be raised prior to the release of shaft 841.

From what has been said, it is apparent that the pusher arm cannot be operated to rock cam shifting lever 904 until two conditions exist: the preliminary programming mechanism has been operated through the five additive cycles to enter the radicand factor into the register and the division operation has been initiated by the tripping of the division trigger 272 (see Fig. 5) previously mentioned. However, the arm 896 is effective to rock the cam shaft shifting lever 904 (best shown in Fig. 36) when the two preceding conditions are present. This cam shifting lever is pivotally mounted on a bracket 906 extending laterally from the frame plate 83 by any suitable means, such as rivet 905. Associated with the arm 904 is a second, or operative, arm 907, likewise pivotally mounted on the rivet 905. The second arm 907 is resiliently biased to follow rocking of the arm 904 by a suitable spring 908 tensioned between an ear 909 on arm 904 and an ear 910 on the arm 907. The second arm carries a pin 911 which bears against the base of a conical collar 951 rigidly secured to the cam shaft 950. If the cam shaft is in the proper position for the extraction of square root, dependent upon the carriage being in the extreme right-hand position as will hereinafter be explained, the rocking of arm 904 (clockwise in Fig. 36) will rock arm 907 to properly set the cam shaft 950 for the extraction of square root. However, if the carriage is not in the proper position, i. e., in the next to the extreme position, the arm 904 will rock and will be held in the rocked position until the carriage has been shifted to its extreme right-hand position. Thereupon the second arm 907, under the urging of spring 908 will be effective to translate the cam shaft 950 to the right to control the extraction of square root. Stop 912 is effective to prevent arm 904 from rocking too far (counter-clockwise) to engage shoulder 898.

It can be noted at this point that after a radicand factor has been entered and the shaft 841 rocked to push the arm 904, the pusher arm 896 will remain in its raised and effective position until the end of the square root operation, which occurs following the overdraft in the extreme left-hand carriage position, or when the division stop lever 360 is operated. In either event, the operation of the division control mechanism is terminated and the division control mechanism, including shaft 317, is returned to its normal condition. The return rocking of the shaft 317 retracts the link 915, pulling arm 896 below the plane of arm 904, whereupon arm 904 will return to its normal position under the force of spring 908 and a spring which normally urges the cam shaft 950 to the left. Thereafter, in subsequent division operations the link 915 may be raised to release stud 899, but as the upper edge of the arm 896 is engaging the lower side of arm 904, the arm 896 is ineffective to position the cam shaft, thereby preventing operation of the square root extraction control mechanism.

B. *"5's" entry, 9th order keyboard.*—The rocking of shaft 841, under the force of its relatively strong spring 891, in the first cycle after the initiation of division, is also effective to set a value of "5" in the 9th order of the selection mechanism. The mechanism for so entering the value of "5" in the 9th order of the selection mechanism is shown particularly in Figs. 37 and 38.

An arm 925 is pinned on, or otherwise rigidly secured to, the shaft 841. A pusher link 926 is pivotally secured to the lower end of the arm 925, as shown in Fig. 38, extending rearwardly to adjacent the cam shaft 950 and the gear engaging arm shaft 932 as shown in this figure. A suitable spring 927 is tensioned between the two arms 925 and 926, thereby biasing the link upwardly (counter-clockwise in Fig. 38). The rearward end of the link 926 is provided with two fingers, the upper of which is provided with a cam edge 928 adapted to be engaged by the conical face of the conical collar 951 on the cam shaft. The other arm of the link 926 is notched, as at 929, to engage a pin 930 carried by an arm 931 rigidly mounted on the gear engaging arm shaft 932. Normally the lower arm of the link 926 will ride below the pin 930 as is shown in Fig. 38. However, when the shaft 841 is rocked clockwise during the five additive cycles previously mentioned, the link 926 will be pulled to the left, and the spring 927 will lift it until the notch 929 engages pin 930. It will be recalled that at the end of the fifth additive cycle the keyboard will be cleared of the radicand, as has previously been mentioned. In the next, or sixth, cycle the division mechanism will be tripped to initiate operation of the division controlling mechanism, and in the second successive, or seventh, cycle the shaft 841 will be released for counterclockwise movement, whereupon the link 926 rocks arm 929 and shaft 932 (clockwise in Fig. 38). If the carriage is in the extreme right-hand position the cam shaft 950 will be shifted to the right, immediately following the translation of the link 926 and rocking of arm 929. Translation of the cam shaft 950 to the right causes the conical face of the collar 951 to engage the arm 928 of link 926 and cam it downwardly (clockwise in Fig. 38) to disengage the notch 929 from the pin 930, thereby releasing the control of shaft 932 from this link. If on the other hand, the carriage is in the next to the extreme position, then the cam shaft 950 and the conical collar 951 will not be translated to the right until the carriage has reached the extreme position, whereupon the link 926 will be cammed downwardly as before.

It can be mentioned at this point that the cam shaft cannot be shifted until the carriage is in the extreme right-hand position and the gear engaging arm of the highest order positioning mechanism is rocked to operative position by link 926, arm 931 and shaft 932. In every carriage position, one such cam will engage the side of the associated gear engaging arm (thereby preventing shifting of the shaft) until the arm is rocked out of the way. In the tenth order, and in that order only, is means provided (link 926, etc.) for rocking the gear engaging arm out of the way. Also it can be noted that the rocking of shaft 932 is operative to rock the tenth order gear engaging arm to insert a value of "5" in the 9th order of the selection mechanism. The highest order gear engaging arm is held in its operative position by the corresponding cam on cam shaft 950, as will hereafter be described, and is so held until the carriage shifts from the extreme position at the termination of the first ordinal series of operation in the extraction of square root.

8. *Square root selection mechanism*

When the cam shaft 950 has been shifted to the right (which, as described above, can occur only when the carriage is in the extreme right-hand position) and the highest order gear engaging arm is rocked to its operative position, the machine is conditioned for the extraction of square root, which will be initiated at the termination of the three cycles used in the shifting of the carriage to the extreme position.

It will be recalled that the extraction of square root is secured by subtracting a subtrahend of "5," "15," "25," "35," etc., in continuous cycles of operation. When an overdraft is reached, the subtrahend causing the overdraft is added back into the accumulator and the carriage shifted one order to the left, without changing the value in the higher order of the selection mechanism. The "5" is then erased from the lower order and inserted to the first order to the right thereof, and the process repeated. At each shifting operation the value of "5" in the lowest order is erased and this value reinserted in the first order to the right, and in next order above the new "5" the mechanism is conditioned for a continuous progression of consecutive numbers, beginning with "0," the selection slides in all of the higher orders remaining unchanged. It is therefore necessary to progressively, from left to right, shift the order in which the "5" is inserted and to enable a drive, or feed, mechanism which is operable to insert a "1" in the next higher order for the second cycle of operation, and thereafter to increase the value in the next higher order, in each cycle of operation, by "1."

Thus, it is necessary for the mechanism of our invention to automatically place a "5" in the selection mechanism of one order, and to drive the selection mechanism of the next higher order, beginning with "1" in the second cycle of operation. This requires two different operations: (a) selection of the orders to be controlled, and (b) power drive of the selection mechanism to provide the necessary progression in the higher order. In our preferred form, the mechanisms which provide these operations comprise, briefly:

A. A cam shaft which is operative to select the order in which the selection mechanism is adjustable.

B. Gear engaging arms operated by the ordinally respective cams to connect the feed drive to the ordinal selection mechanisms.

C. Feed mechanism comprising a feed shaft, an axially displaceable gear and an idler feed gear in each order, to progressively position the selection mechanism.

D. A progressively driven slide positioned from the drive shaft to progressively change the value standing in the selection mechanism.

E. Latching members for holding the selection gears in adjusted position.

A. *Cam shaft and drive.*—In order to properly select the order in which the "5" is inserted and the order in which the selection mechanism is operative to increase the value by consecutive numbers beginning with "0," it is desirable to have a single control capable of enabling a single order at a time, and operative progressively from left to right. This is done in the preferred form of our invention by a cam shaft 950. The cam shaft, as are the other shafts of the square root selection mechanism, is journalled in a frame, indicated generally at 940 (Fig. 41) which lies behind the rear plate 656 (Fig. 2) of keyboard frame 651 and in front of the carriage rail 610. This frame comprises a top plate 941, rear plate 942, end plates 943 and 944 (Fig. 41), and a plurality of ordinally arranged separating plates 945.

The cam shaft 950 is driven by a stub shaft 952 (see Figs. 37 and 40) journalled in bracket 963 suitably supported on the frame of the machine. The stub shaft 952 is connected to the cam shaft 950 by a suitable separable coupling 954, preferably a separable slip clutch which will permit the shaft 950 to be shifted to the right (in Fig. 37), and in the event of jamming of the mechanism, to permit relative rotation between the two plates of the coupling 954.

The stub shaft 952 is driven directly from the shifting of the carriage, whereby the stub and cam shafts always have an angular position determined by the lateral position of the carriage. The mechanism for securing this rotation of the stub and cam shafts is shown particularly in Figs. 37 and 40. The front carriage frame 139 is provided with a plurality of rack teeth 960 on the left end thereof. The teeth of this rack 960 are constantly in mesh with a pinion 961 which is rigidly secured to a longitudinal stub shaft 962. The stub shaft is supported in the two arms of a bracket member 963. A worm 964 is also rigidly secured to the stub shaft 962, and this worm drives a gear 965 mounted on the stub shaft 952. Thus, the stub shaft 952, and through it the cam shaft 950, are rotated with the shifting of the carriage. The gear trains are so designed and constructed, in the preferred form of our invention, as to rotate the cam shaft 950 through an angle of 36° for each ordinal shift of the carriage. It will be recalled that in the Friden machine with which this invention is associated, the carriage is free to shift through nine ordinal spaces. Thus, when an angle of 36° is used for the rotation of the cam shaft 950 from an ordinal movement of the carriage, the cam shaft and the cams mounted thereon, will have a different angular position for each ordinal position of the carriage.

Figure 41:
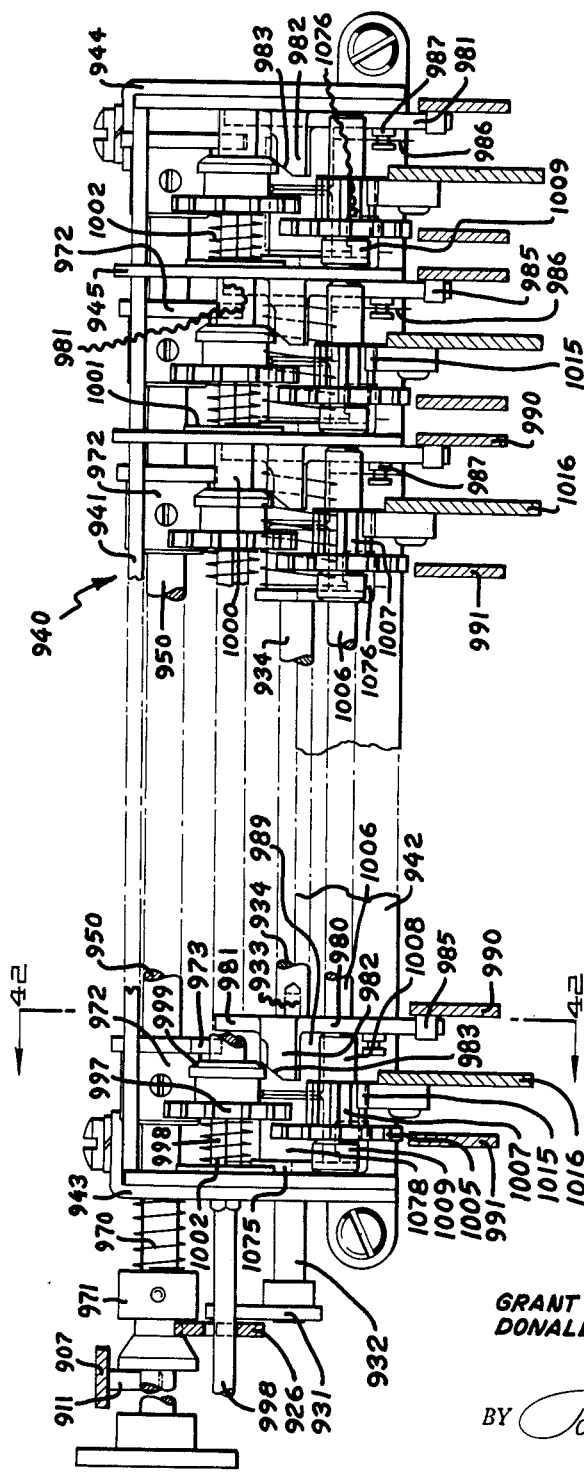
Fig. 41 is a front view of the square root programming mechanism, such as taken along the substantially vertical plane indicated by the line 41—41 of Fig. 1.

The cam shaft 950 is normally biased to the left (as shown in Fig. 41) by suitable spring means, such as the compression spring 970 encircling the shaft and seated between the end plate 943 and a collar 971. However, when the arm 907 is rocked (clockwise in Fig. 36 or to the right in Fig. 41) the pin 911 will urge the shaft 950 to the right to place the teeth 973 of the cams 972 in operative position, which is in the plane of the cam tooth 981 of gear engaging arms 980 (see Fig. 42), as hereinafter described.

The cam shaft 950, as shown in Fig. 41, carries a cam member 972 in each order of the square root selection mechanism. Each cam is provided with a single tooth 973. These teeth, and their integral cams, are so arranged on the shaft 950 that each lies at an angle of 36° from its adjacent cam. Thus, the cam teeth 973 are arranged spirally around the shaft separated from each other by angles of 36°, and, only one cam 972 can be engaging a cam tooth 981 of a gear engaging arm 980 at a time. As the carriage is shifted to the left, the rotation of the cam shaft 950 rocks one tooth out of engagement with its associated gear engaging arm and places another in operative position. By this means we are able to select the order in which the selection mechanism is operative. It can be mentioned here that means must be provided for rocking the gear engaging arm in the 10th (i. e., the highest) order selection mechanism into operative position at the beginning of the extraction, as ordinarily the highest order cam 972 lies to the left of the tooth 981 associated therewith, when the carriage is in the extreme position (as is indicated by the tooth shown in phantom lines in Fig. 42). It should also be noted that in each carriage position a cam tooth will abut against the side of its associated gear engaging arm, thereby blocking the shaft from movement toward the right. In the 10th order only is means provided to rock the gear engaging arm—thereby blocking accidental operation of the square root mechanism.

B. *Gear engaging arms.*—It will be recalled that the rocking of the initiating shaft 841 was, among other things, operative through pusher link 926, to rock the stub shaft 932. This stub shaft is journalled in the left-hand frame plate 943 and the first separator plate 945 to the right thereof. As shown in Fig. 41, the right-hand end of this stub shaft is provided with a cylindrical spline 933 which engages and supports an axially aligned shaft 934. As will be obvious hereafter, the shafts 932, 934 could be integral but the present arrangement is preferred because it reduces the amount of friction on the shaft 932.

In each of the orders of the square root programing mechanism, and, in our preferred form, against the separator plate 945 separating the 10th from the 9th orders, is a gear engaging arm 980 (see particularly Figs. 41 and 42). In the 10th order this gear engaging arm is pinned, or otherwise rigidly secured, to the shaft 932 so that it will be rocked with the rocking of stub shaft 932. In all of the other orders the gear engaging arms 980 are identical in shape and size, but are pivotally mounted on the long shaft 934, for in all orders except the 10th, these gear engaging arms are rocked only by the single tooth 973 on the cams 972. However, the tooth 973 of the 10th order cam will lie against the side of the gear engaging arm 980, preventing the cam shaft from being translated to the right into operative position, when the carriage is in the extreme right-hand position required for the initiation of extractive operation. It is therefore necessary to rock the gear engaging arm of the 10th order to operative position in order to condition the mechanism for square root extraction. Such rocking permits the tooth 973 of the 10th order cam 972, and the cam shaft 950, to move to the right under the force of spring 908 (Fig. 36) operating on arm 907, the cam tooth then locking the gear engaging arm in its rocked, or operative, position. It can be mentioned at this point that Fig. 42 shows the arrangement of the parts in the 10th order, at the full-cycle position, which is not reached until the extraction operation is completed. Therefore, the tooth 973 is shown in the position in which it lies when the carriage is in the extreme left-hand position. When the carriage is at its extreme right-hand position, at the start of an extraction operation, the tooth is located as shown in phantom lines in this figure. It is therefore obvious that the cam shaft 950 and its fixed cams 972 cannot be shifted to the right until the gear engaging arm 980 of that order has been rocked (clockwise in this figure).

It can also be mentioned here that as the carriage shifts from the right to the left during operation, the shaft 950 and cams 972 rotate in a counter-clockwise direction in Fig. 42. It can also be mentioned that in the 9th order, due to the staggered relationship of the teeth above-mentioned, the tooth 972 will lie in the same position at the start of the extraction operation with the carriage in the extreme right-hand position as that shown in full lines in this figure. It is therefore obvious that in the 9th and lower orders, the rocking of the cam shaft 950 will be effective to rock the gear engaging arm to operative position, as the tooth 973 of each cam will lie in front of the gear engaging arm.

Each gear engaging arm 980 is provided at its upper edge with a tooth-shaped pressure face 981, adapted to be engaged by the teeth 973 of the associated cam. Each arm is also provided with a turned-over ear 982 extending to the left, as shown in Fig. 41. The outer, or left, end of each ear is formed as a camming edge 983. The gear engaging arm is also provided with a depending tail 984, which engages a stud 985 on the "1" to "5" selection slide 990 in the next lower order. The amount of rocking of the arm is computed to be such as to urge the selection slide 990 forward to the "5" position. Thus, the rocking of the arm 980, by the cam 972, rocks the "1" to "5" slide 990 of the next lower order into the "5" position. Simultaneously the ear 982 engages the conical cam 999 on the hub of the feed gear 997, thereby pushing the feed gear to the left into mesh with its driven gear as will be hereafter explained.

Normally the gear engaging arm 980 is urged to an inoperative position (the counter-clockwise position shown in Fig. 42) by a torsion spring 986 seated between a stud 987 on the arm and the latching ear 1076 on latch 1075.

The gear engaging arms 980 are held in proper axial position by means of elongated hubs 989 which abut against the oppositely elongated hub 1078 of the latch arm 1075 of the same order. It is thus obvious that as the carriage shifts from right to left the cam shaft 950 is rotated counter-clockwise, successively bringing teeth 973 into rocking engagement with the gear engaging arms 980 of the next lower order, with each ordinal step of the carriage. The rocking of the gear engaging arm, as has been mentioned, is operative to insert a value of "5" in the "1" to "5" slide 990 of the next lower order and to move the feed gear 997 of the order in which the gear engaging arm is located into mesh with its associated gear 1005.

C. *Feed gear and drive.*—It is necessary to drive the selection mechanism in the desired progression of single units, beginning in the 10th order, and progressing order by order toward the right. It would, of course, be possible to have a single driving mechanism shiftable across the keyboard from the shifting of the carriage. However, we prefer to utilize a driving, or feed, gear for each order of the selection mechanism and therefore provide a plurality of feed gears 997, one for each order of the selection mechanism (see Figs. 41 and 42). These feed gears are mounted on a transversely extending square shaft 998 suitably journalled in the end plates 943 and 944 of the frame 940 for the square root programing mechanism. The gears 997 are provided with elongated hubs having a conical camming face 999, as shown in Fig. 41. The cam edge 983 of ear 982 on the rockable gear engaging arm 980 is adapted to engage this conical face 999 of the gear hub, and upon rocking of the arm 980 to force the gear and its integral hub to the left. Also mounted on the square shafts 998, in each order of the machine and to the right of the hub of the gears 997, are suitable spacing sleeves 1000 which extend through the separating plates 945 to the right, and are provided with shoulders 1001 which abut against the right-hand side of the separator plate. A compression spring 1002 is seated around the square shaft 998, between the right-hand side of the respective shoulder 1002 and the left-hand face of the respective gear 997, thereby normally urging the gear to the right into its inoperative position. Thus, the rocking of the arm 980, under the control of the cam shaft 950 translates the gear to the left against the bias of its spring 1002, and in so doing brings the gear 997 into mesh with its positioning gear 1005. Thereafter the rotation of the shaft 998, which rotates the gear 997 drives the gear 1005.

The positioning gear 1005 just mentioned is used to drive the selection mechanism a single step, beginning with "1" for the second cycle of operation, in order to provide the 10's progression required in our method of extraction. Thus the feed gears 997 and their shaft 998 must be given a single step of movement for each cycle of operation, beginning with the second cycle, in each ordinal position of the carriage. The mechanism for giving the feed shaft 998 these single increments of motion is shown particularly in Fig. 39. Various methods of securing the necessary feed or drive could be proposed, but we prefer to use one driven from the main drive shaft 110. Our preferred form comprises a cam follower arm 1025 pivotally mounted (as by stud 1026) on an auxiliary bracket, or frame plate, 1024. The follower arm has a forwardly extending arm 1027, the forward end of which is provided with a cam follower roller 1028. In the plane of the roller is a cam 1029, rigidly secured to the transverse drive shaft 110. The follower arm is biased toward engagement with the cam by means of a spring 1030 tensioned between a stud on the follower arm and a fixed stud 1045, as shown. A live pawl 1031 is pivotally secured to the upper end of the follower arm 1025 by any suitable means such as stud 1034. The forward end of the live pawl 1031 is provided with a feed nose 1932, the pawl being urged downwardly (counter-clockwise in this figure) by a suitable spring 1033. The nose of the live pawl 1031 engages ratchet teeth in a ratchet gear 1035 rigidly secured to the feed shaft 998. Thus, the rocking of the follower arm 1025 with each cycle of machine operation is effective to feed the ratchet gear 1035 a single step (counter-clockwise in this figure).

It is desirable to provide means for preventing overthrow of the feed ratchet 1035 by pawl 1031. For this purpose we provide an overthrow block integral with the arm 1025 to stop rotation of the ratchet 1035. In our preferred form this block constitutes a concave depression 1055, as shown in Fig. 39. As the arm rocks counter-clockwise to effect an entry of "1" into the ratchet gear 1035 and shaft 998, the concave depresssion 1055 engages the peripheral edges of the teeth thereon, blocking overthrow of the gear.

The gear is held in any adjusted position by means of a suitable holding pawl 1056 which is provided with an ear 1057 engaging the depresssions between the ratchet teeth of ratchet gear 1035. The pawl is urged into engagement with the ratchet gear by a suitable spring 1058.

The follower arm 1025 is normally latched in an inoperative position, shown in Fig. 39, by a suitable latch 1040 pivotally mounted on the stud or bolt 1045 on the auxiliary frame bracket 1024. The nose 1041 of the latch arm 1040 engages a square stud 1042 on the lower arm of the follower, as shown. The latch arm 1040 carries a short stud 1043 that is embraced by a slot 1044 in link 915 (Fig. 40), previously described. It will be recalled that the shaft 317 is rocked (clockwise in Fig. 40) upon the initiation of a division operation, thereby lifting link 915. The lifting of the link 915 lifts the latch arm 1040 out of latching engagement with the square stud 1042, thereby releasing the follower arm 1025 to the force of spring 1030. The spring rocks the arm (counter-clockwise in these figures) until the roller 1028 engages the edge of cam 1029. Thus, the follower arm 1025 is released for operation, and thus drives the feed shaft 998, in all division operations, but rotation of the feed shaft during ordinary division operations is of no effect as the cam shaft, while rotating during the shifting phases of division, is blocked against rightward movement necessary to enable the cams to rock the gear engaging arms. Therefore, the rotation of the feed shaft 998 will not change the setting in the selection mechanism and no harm is done by the rotation of the feed shaft 998.

Rocking of the follower arm 1025 must be prevented in the additive corrective cycles, in the carriage shifting cycles and during the first cycle of operation in any order. This is best secured by means of a blocking plate 1050 mounted on the division program shaft 286 immediately to the left of follower arm 1025 in the normal position of the shaft. It will be recalled that the shaft 286 is translated toward the right upon the occurrence of an overdraft in any order, and latched in that position for the following three cycles during which the value causing the overdraft is added back into the accumulator to correct it, the carriage shifts one step to the left, and a continuous subtraction phase again initiated. Actually the shaft 286 is in its projected position until the first subtractive cycle in any order is initiated. This can be seen by referring to Fig. 5 which shows the mutilated programming gear 305 and the mutilated driving gear 306 in their full-cycle position, in which case the two gears are in separate planes. The shaft is projected toward the right shortly before the end of the cycle in which the overdraft occurs, by the operation of the overdraft mechanism, and the mutilated programming gear 305 is projected into the plane of the driving gear 306 at this time. As the drive shaft 110 comes to its full-cycle position the mutilated drive gear 306 will have picked up the first teeth on the mutilated gear 305 and will have rotated the latter through a portion only of its step. That is, each one of the rotations of gear 305 occurs at the end of one cycle and at the beginning of the other. Thus, at the third cycle the shaft 286 has been rocked sufficiently far to cause the digitation control gate 116 to be shifted into its subtracting position, so that when the digitation wave (next cycle) takes place the value standing in the selection mechanism will be subtracted from the value standing in the register, but the shaft 286 and plate 1050 remain in their shifted, or blocking, position. In square root extraction operations the value standing in the selection mechanism at this point will be the "5" which has just been inserted in the lowest order (by the rocking of the gear engaging arm 980 operating on the "1" to "5" slide in the order) and whatever value is standing in the second higher order (there being no value standing in the next higher order). Then, during the first few degrees of rotation in this subtractive cycle, the gear 305 is rotated slightly to permit it to drop over the pin 311. The follower arm 1025 is unlatched throughout the division operation, resulting in the arm 1025 being subject to the pressure of its spring—which forces it against plate 1050. We prefer that this spring pressure be sufficient to hold plate 1050 and shaft 286—by means of friction—from returning to their normal left-hand positions, until the lever is rocked slightly by the high point of cam 1029 momentarily touching roller 1028. This slight, though definite delay, prevents release of the cam follower arm 1025 until after the start of the subtraction cycle and blocks operation of the feed mechanism until after the first subtraction has been made. The first cycle of operation in any order is the subtraction of the value of "X05," during which cycle the feed shaft is inoperative. After the first subtraction the shaft will be operated to place a "1" in the next to the lowest order operating in the selection mechanism and thereafter increase, with each cycle of operation, that value by "1." By this means we are enabled to successively subtract values of "05," "15," etc., in successive cycles of operation. It can be mentioned that in the preferred form of our machine the feed takes place after digitation is complete (at about 320° of a machine cycle) and is finished in time for the next digitation cycle. It can also be mentioned that the plate 1050 is, incidentally, operative to prevent operation of the feed shaft during the aligning phase of division or extraction.

D. *Selection slide drive.*—The drive gear 997 does not directly position the ordinal selection mechanism, but does drive a positioning gear 1005 (see Fig. 42) that does operate on the selection slides. The positioning gear 1005 is rotatably mounted on a transverse shaft 1006 suitably journalled in the end plates 943 and 944 of the square root programming frame. Integral with the positioning gear 1005 is a smaller drive pinion 1007. The gear 1005 and pinion 1007 are held in proper longitudinal relationship on their shaft 1006 by any suitable means such as an elongated hub or sleeve 1008 (see Fig. 41) on one side and a short collar 1009 on the other. The drive gear 1007 is constantly enmeshed with a rack 1015 riveted, or otherwise secured to a longitudinal slide 1016. The slide 1016 is supported for longitudinal movement in the transverse crossbar 84 of the machine and a transverse front plate 1017 (shown in Fig. 44). The slide 1016 is resiliently urged towards the rear by a suitable spring 1018 tensioned between the front end of the slide and the cross plate 1017. The slide will be moved forwardly with the rotation of the positioning gear 1005, which occurs whenever the drive shaft 998 is rotated with the drive gear 997 of the particular order moved into meshing engagement with the positioning gear, as heretofore explained. It can be noted at this point that in our preferred construction the gears are 10-tooth gears and are given a single step of movement during each cycle of operation, resulting in the slide 1016 being given an additional increment of movement with each cycle of operation. The slide 1016 is provided with suitable stop means (not shown) to prevent rearward movement beyond the position shown in Fig. 42.

The translation of the slide 1016 by the feed mechanism herein described, is operative to position the conventional selection slides 990 and 991 of the Friden machine. It will be recalled that there are two such slides, one for the values of "1" to "5," inclusive, and the other for the values of "6" to "9," inclusive. The mechanism by which the translation of the slide 1016 through a plurality of steps is effective to position these two slides is shown particularly in Figs. 43, 44 and 45. The slide 1016 is provided, in our preferred embodiment, with a long, laterally extending, ear 1019, extending under the "6" to "9" slide 991 and the "1" to "5" slide 990, as is shown particularly in Fig. 46. The front frame plate 1064 of the keyboard frame constitutes a block preventing the forward movement of the "1" to "5" slide beyond its "5" value position, and this is utilized in controlling the translation of the two slides 990 and 991. As shown particularly in Fig. 43, the "1" to "5" selection slide 990 is provided with a resilient link 1065 mounted thereon for sliding movement by means of slots 1066 which embrace pins 1067 carried on the selection slide 990. The link is urged to the rear by a suitable tension spring 1068 tensioned between one of the pins 1067 and a stud 1069 on the resilient link. In the normal position of the parts the nose 1070 of the link 1065 lies against the ear 1019 of slide 1016. Thus, the forward translation of the slide 1016 (to the right in Fig. 43) through engagement of the ear 1019 with the nose 1070, causes the link 1065 to move forwardly from "1" to "9" steps. The force of spring 1068 is sufficient to cause the selection slide 990 to follow the movement of link 1065 until further movement is blocked by the plate 1064. Thereupon the movement of the selection slide 990 is stopped, and the spring 1068 yields to permit the resilient slide 1065 to move forwardly with the driving slide 1016.

Associated with this mechanism is a notch 1071 in the lower edge of "6" to "9" selection slide 991. This notch, or relieved portion, is of such length that the rear edge is not engaged by the ear 1019 until the end of the fifth step of forward movement of driving slide 1016. Thereafter the forward movement of the driving slide 1016 will cause the "6" to "9" selection slide to move forwardly, step by step, with each cycle of operation. By this means any value of from "1" to "9" may be placed in the selection mechanism in any order, where it is latched by the latching of the latching arm 1075, next to be described.

E. *Latching mechanism.*—In the process utilized in our machine it is necessary to latch the values secured in the next to the lowest order (and all higher orders) when the carriage shifts to the left to initiate operation in a new order. This preferably is secured by latching the positioning gear against reverse movement at all times (until positively released). The positioning gear 1005 is latched in any adjusted position by a live detent or latching arm 1075. One of these arms is located in each order of the machine, preferably against the plate on the left side of each order of the extraction mechanism. The arm is preferably provided with a long hub 1078 (Fig. 41) which abuts against the hub 989 of the associated gear engaging arm. Each such detent is provided with an ear 1076 so constructed as to block return movement of the idler gear 1005 while permitting the driving movement thereof. This ear and latch are urged into latching position with respect to the gear 1005 by means of the torsion spring 986 previously mentioned. As the positioning gear 1005 is driven (clockwise in Fig. 42) by the drive mechanism including the drive gear 997, a tooth contacting the upper edge of the ear 1076 cams the latching arm 1075 counter-clockwise until the tooth has passed, whereupon the spring 986 rocks it back so that the forward edge of the ear engages the rear of the tooth to prevent reversed rotation of the gear 1005. This blocking of reverse rotation is effective regardless of whether the positioning gear is engaged with its associated drive gear 997 or not. The detent arm 1075 is provided with a rearwardly extending tail 1077 which is used for clearing the selection mechanism as will hereafter be described.

9. Clearing mechanism

A suitable mechanism is provided for releasing the latching detents 1075 to permit the selection mechanism, under the force of springs 1018 on the setting slides 1016, to return the various gears and mechanisms to the normal inoperative position. The actuating mechanism for this purpose is shown particularly in Fig. 23, and comprises a cam slide 1085 mounted for transverse sliding movement on the square root programming mechanism control plate 942 by any suitable means, such as pin and slot connections 1086, 1087. This slide is normally urged to the right of the machine by a suitable spring 1088 tensioned between one of the pins 1086 and a stud on the clearing slide itself. This clearing slide 1085 is provided with a series of ordinal notches 1089 in which lie the tails 1077 of the latching detents 1075. The right-hand edges of the notches are sloped to provide a suitable camming surface 1090, whereby leftward movement of the slide 1085 cams the tails 1077 upwardly. The rocking of the detents 1075 by the cams 1090 (counter-clockwise in Fig. 42) rocks the ears 1076 out of engagement with the positioning gears 1005, which permits the slides 1016 to return to their rearward inoperative position.

The mechanism for controlling movement of the slide 1085 is shown particularly in Figs. 8 and 23. In our preferred form the square root extraction mechanism is cleared with the clearing of the keyboard. There are several reasons why it is preferred to clear the square root programming mechanism by operation of the keyboard, or the clearing bail 95: Such operation will guarantee that the programming mechanism will be cleared upon the clearing of the keyboard after the entry of the radicand factor into the accumulator; and it also enables the operator to selectively determine whether or not the root, which stands in the selection mechanism at the end of the extraction, as well as in the counter, can be erased or retained in the selection mechanism for use in the next problem to be solved by the machine. In the preferred form of our invention, an operator is enabled, by operation of the "add" key 64 to either retain the root in the selection mechanism, or to automatically erase it therefrom, at the conclusion of the extraction. For this reason we prefer to operate our square root control clearing slide 1085 from a lever 1095 (Fig. 8) pivotally mounted on a transverse shaft 1096. A rearwardly extending link 1097 is pivotally connected at its forward end to the upper end of the lever 1095, its rearward end being supported upon cam shaft 950. The rear end of the slide 1097 is provided with a suitable bracket 1098 which carries a roller 1099, which engages the camming ear 1091 on the right end of actuator slide 1085.

The lower end of the lever 1095 is provided with an ear 1100 which is engaged by the rearwardly extending flange of clearing bail 95. By the mechanism shown the lever 1095 is rocked with the rocking of clearing bail 95, thereby pulling the roller 1099 forwardly. Such movement of the roller 1099 engages the cam ear 1091 of the slide 1085, pushing the slide to the left to rock the latching detents 1075 to unlatching position.

In order to prevent unnecessary operation of the clearing mechanism, the lever 1095 is normally latched in its clearing position by means of latch member 862 engaging the ear 1100 on the lower end of the lever 1095, whenever the lever is rocked to clearing position. The normal rocking of clearing bail 1095 does not release the latch 862, but it is released by the ear 861 on the lower end of clearing arm 860, rocked as heretofore described at the end of the five additive cycles of entering the dividend factor into the accumulator. The release of the latch 862 thereupon releases the clearing link 1097 and the associated slide 1085. Thereafter the selected values set into the various positioning gears 1005 are retained in the adjusted position until the square root mechanism is cleared.

When the extraction operation is terminated, either by operation of the division stop key 360 (Fig. 1) or by the attempted shifting of the carriage when the carriage is in the extreme left-hand position, the square root mechanism is returned to its normal, or inoperative, position. The termination of division rocks the shaft 317 (counter-clockwise in Fig. 40) to depress the slide 915. The depression of slide 915 rocks the pusher arm 896 downwardly, releasing the first cam shaft arm 904. The cam shaft, under the force of its spring 970 is thereupon moved to the left to render the cams 972 ineffective. The depression of the link 915 also rocks the feed arm latch 1040 downwardly to engage the feed arm 1025, and latch it against further operation. Therefore, regardless of whether the extraction operation is terminated by operation of the stop key 360, or by completion of operation in the extreme right-hand order of the machine, the square root extraction mechanism is disabled and returned to its normal position.

10. Operation

It is believed that the operation of the machine of our invention in the extraction of square root will be readily understood from the above description. It can be mentioned briefly that the radicand is set into the keyboard, preferably at the left side thereof, or in the case of a decimal, using the decimal marker 89 at the left of the keyboard as the decimal point for the decimal value. Thereafter the square root control initiating key 650 in line with the decimal point of the radicand is depressed. The depression of a square root initiating key 650 operates through the common bail 660 (Fig. 18) to pull links 670 and 675 forwardly, thereby unlatching arm 701 of the spring-powered starting shaft 700. The rocking of this shift, under the force of its spring, depresses the dividend entering key 81 and thereby initiates a dividend entering operation. The rocking of the shaft 700 also operates through the resilient connection shown in Fig. 24 to release any depressed tabulating key, upon the carriage shifting to the left-hand position.

It will be recalled that the dividend entering key initiates a program of operation which includes the shifting of the carriage to the extreme left-hand position, the clearing of both registers in that position, and then shifting the carriage to the right until the tabulated position is reached. In the mechanism of our invention the "9" tabulating key 80 is elongated to form a stop at all times. Whenever a a square root initiating key has been depressed, the carriage will shift after clearing of the registers and the tabulator keys 80, to the extreme right-hand, or "9," position, unless the decimal point of the radicand lies to the right of an even order of the keyboard. In that event the depression of the square root initiating key also rocks the bail 695 (Fig. 19) to pull the resilient, or live links 720, 721 forwardly to rock the arcuate arm 735, thereby projecting the pin 740 rearwardly to operate the tabulating rocker arm 605 (Fig. 17) when the carriage reaches the next to the extreme position. In any event the tabulating of the carriage to the right is terminated at either the extreme or next to the extreme position automatically, depending upon the decimal point of the radicand.

The releasing of the dividend entering trigger 594 (Fig. 13) initiates the first of the additive radicand entering cycles. The rocking of the digitation control shaft 118 resulting from the operation of the trigger just mentioned, rocks the arm 769 at the extreme left of the machine (see Fig. 25) to permit the bail 764 to drop into latching engagement with the pin 768 on the lower end of the arm. The rocking of the bail 764 pulls the control link 760 rearwardly, which releases latch 780 for retaining the holding pawl 785 disabled, and also cams the floating gear plate 797 downwardly so that rotation of the drive shaft 110 rotates the control gear 794. The control gear 794 is fed two teeth at the end of the first cycle of such additive operation, while the dividend entering mechanism is held in operative position to continue motor and clutch operation, and to drive the machine for further cycles. In this manner the radicand is entered into the accumulator in each of the five successive cycles, whereby the radicand factor is five times the original radicand. By the end of the 4th cycle the shaft 700 is restored to its original position, by means of the cam 817 and arm 854 shown in Fig. 34.

During the five additive cycles of operation the cam follower arm 822 has been rocked (clockwise when viewed from the left as in Fig. 25), and at the end of the 5th cycle the dividend entering mechanism is released through operation of link 824, shaft 826 and the mechanism connected thereto. However, the rocking of the follower arm 822 has also pulled the link 830 towards the rear, rocking the transverse shaft 832 to position the lever 873 (Fig. 5) behind the ear 161 of the clutch engaging slide 175, thereby holding the clutch engaged and the motor operating for an additional cycle. At the end of the 5th additive cycle of operation the shaft 832 will also have been rocked far enough to cause the arm 860 mounted thereon to engage the clearing bail 95 and erase the radicand value from the keyboard, simultaneously clearing the square root control mechanism and releasing it from its latch 862 so that it is conditioned for operation. Likewise at this point the division initiating link 880 (Fig. 5) is positioned to initiate division, with its notch 885 engaging pin 886 and its hook 883 engaging pin 884. At the end of the 6th cycle the control gear 794 is released from control of holding pawl 785, thereby releasing the driven gear 810 and its associated cams 813 and 817. The release of the follower arm 822 permits the link 830 to be released as heretofore described, whereupon the spring 827 causes the entire follower assembly to be rocked counter-clockwise when viewed from the left, as in Fig. 25, thereby initiating a division operation. It should be noted that link 880 rocks latch 266, whereupon the roller 271 on division initiating arm 272 knocks the rear end of link 880 out of engagement with pin 886.

The initiation of division causes the machine to attempt to shift to the right, through the operation of the division aligner mechanism heretofore described. If the carriage is already in the extreme right-hand position, this causes three idle cycles of operation before the dividend aligning mechanism is released and division initiated. If the machine is in the next to the last position, these three cycles are utilized to shift the carriage to the extreme position and to condition the square root programming mechanism for operation.

The shifting of the carriage to the extreme left-hand position will have driven the cam shaft 950 to the angular position in which the tooth 973 of the 10th order cam is in the operative position indicated by the phantom line in Fig. 42, in which position it abuts against the side of the 10th order gear engaging arm 980. It will be obvious that if the carriage is in any other than the 10th position, one of the staggered teeth 973 will abut against its associated gear engaging arm 980 preventing translation of the cam shaft 950 to the right to condition the control mechanism for operation. In the 10th order the gear engaging arm is rocked to its operative position by the link 926 and arm 931 shown in Fig. 38, thereby permitting the cam shaft 950 to be forced to the right by pin 911 (Fig. 36).

The rocking of the gear engaging arm 980 (see particularly Fig. 42), translates the associated drive gear 997 to the left, to couple the drive shaft 998 to the positioning gear 1005. Simultaneously the rocking of the gear engaging arm 980 has caused the tail thereof to engage the pin 985 on the "1" to "5" slide 990 in the next lower order, thereby setting a "5" in the 9th order of the machine. Thus, the value of "5" is subtracted in the 9th order. In the first portion of this subtractive cycle the feed arm 1025 (see Fig. 39), which has already been released by the initiation of the division mechanism, is blocked from operation by the blocking collar 1050 (being held in blocking position by friction with arm 1025), thereby preventing a feed of shaft 998. However, as soon as the roller 1028 of the follower arm has been engaged by the high point of the cam 1029, thereby rocking the follower arm 1025 slightly clockwise, the spring pressure on shaft 286 snaps it to the left, whereby the collar is out of the plane of the arm 1025. Thereafter the cam follower arm 1025 is under the control of the cam 1029, giving a single step feed of the ratchet wheel 1035 and the feed shaft 998 as heretofore described. The step by step rotation of the shaft 998 causes the feed gears 997 in the 10th order, now meshed with the positioning gear 1005 of that order to drive the slide 1016 forwardly a single increment for each cycle of operation. This feed takes place after the digitation phase of each cycle.

This successive subtractive operation continues until an overdraft shifts shaft 286 to the right, thereby blocking operation of the feed arm 1025. The division control mechanism thereupon operates in the conventional manner to cause the single corrective additive cycle and shift of the carriage one step to the left. The stepping of the carriage to the left rocks the cam shaft 950, which causes the cam of the 10th order to rock out of engagement with its gear engaging arm 985 and causes the tooth 973 of the 9th order cam (which lies in the full line position of Fig. 42) to rock its associated gear engaging arm to operative position. The release of the gear engaging arm in the 10th order and the operating of it in the 9th, releases the value of "5" from the 9th order and inserts it in the 8th order of the selection mechanism. In the next cycle the value then standing in the selection mechanism (which in the case of the problem given for purposes of exemplification earlier in the specification stands at "605") is subtracted. Thereafter the feed mechanism is operative to rock feed arm 1025 at each cycle of operation to increase the value standing in the 9th order by "1," changing the values from "605" to "615" and "625" to cause an overdraft in the 3rd cycle of operation. Thereupon the overdraft mechanism shifts the division programming shaft to cause the additive corrective cycle, reducing the value standing in the counter to "62," and a shifting of the carriage, and a like sequence of operations in the 7th and 8th orders of the machine. It is believed that the successive steps of operation will be apparent from the problem given earlier in the specification.

It is obvious from the description which has been given above, that the value standing in the selection mechanism after completion of operation in any order, is the same as that standing in the counter. Therefore, at the termination of the extraction operation the value standing in the keyboard will be identical with that standing in the counter, and this value will be released or retained, at the end of such extraction depending upon whether the "add" key is in its operative or inoperative position. The "5" in the lowest order is always erased as the carriage shifts or the cam shaft is released, so that even when operation is terminated prematurely by operation of the stop key 360 the "5" is released and keyboard and counter values agree. If retained on the keyboard, it is obvious that it may be used as a keyboard factor in the next operation of the machine.

It will be understood that 4th root can be extracted by first taking the square root of the radicand and then the square root of the root. In such an operation, the original value is set in the keyboard and square root initiated, with the "add" key in its operative position to retain the root in the keyboard at the end of the operation when the square root extraction is completed. The initiating key in line with the decimal point of the root is again depressed, which extracts the square root of that root, thereby giving the 4th root. In a similar manner, 8th root, 16th root, and other roots in that progression, can be extracted automatically.

It will be also obvious that in those instances in which accuracy to ten significant figures is not necessary, the machine of our invention can be built and successfully operated with only five or six orders of extraction control mechanism on the left side of the keyboard. If square root is extracted through about five orders and a straight division operation initiated, the answer will be correct to nine significant figures. It is therefore entirely feasible to eliminate the extraction control mechanism for positioning the selection slides over a portion of the keyboard. However, with the method of operation used herein, it is feasible to carry the extraction entirely across the keyboard and the mechanism therefor has been shown as it is the preferred embodiment of our invention.

If greater accuracy than ten significant figures is desired, it is possible to secure it in the machine of the present invention. If the radicand is set in the keyboard and extracted, the answer will be correct throughout the width of the keyboard. The remainder then standing in the accumulator 52 is manually transferred to the left side of the accumulator and the root so far extracted is copied and the counter cleared, the root being retained in the selection mechanism. A division operation is then initiated. The quotient so secured is then copied to the right of the first answer. While this second operation is not correct to twenty places, it is accurate to more than fifteen. It will be understood that absolute accuracy to twenty places would require a twenty order selection mechanism, but when the divisor is correct to nine significant figures, and then division initiated, it will be found that the root will be correct except in the last two or three orders.

It will be understood by those skilled in the art that the square root could be extracted by our method by the use of complements. In such a method the radicand would be entered into the accumulator by subtraction for five cycles, in order to insert in the accumulator the complement of the radicand factor. Thereafter consecutive values of "5," "15," "25" and the like would be added into the accumulator in the same manner that such progressive numbers are subtracted from the radicand factor in the method described in detail. It will be obvious to those skilled in the art that a machine for extracting square root by such a complemental method would be essentially the same as the machine herein described, that is, it would have equivalent mechanisms to those described for carrying out the equivalent steps. It is intended that any such method be included within the scope of this invention and in the claims which follow.

It will be understood that the machine shown and described herein is a preferred embodiment of our invention and that the mechanisms shown are capable of considerable modification by persons skilled in the art without departing from the spirit and scope of this invention.

We claim:

1. In a calculating machine having an ordinal value selecting mechanism adjustable to represent digital values in which one factor is set, an accumulator in which a second factor is set, actuating means for differentially operating said accumulator in accordance with a factor set in said selection mechanism, and drive means for said actuating means, the combination which comprises adjusting means operative to progressively adjust the value selecting mechanism to represent a value of "5" in a predetermined order and thereafter to increase the previous value by "10" in a continuous series of operations of said actuating means, and means for operatively connecting said adjusting means to said drive means.

2. In a calculating machine having a frame, a shiftable carriage, an ordinally arranged dividend factor receiving means in said carriage, an ordinally arranged divisor factor receiving means in said frame, actuating means, means for shifting said carriage, and an automatic division mechanism including an over-draft sensing means operable to control operation of said actuating means and said shifting means during a division operation, the improvement which comprises means for progressively adjusting the divisor factor receiving means in a selected order to consecutive numbers beginning with "0" during a division operation, means cooperating with said last-mentioned means for adjusting the first adjacent lower order of said divisor factor receiving means to represent a value of "5," means controlled by the shifting of said carriage in a division operation for adjusting the first adjacent lower order of said divisor factor receiving means to represent a value of "0," and for rendering inoperable said means for progressively adjusting the divisor factor receiving means in the selected order and for rendering it operable in the first adjacent lower order.

3. In a calculating machine having an ordinally arranged register, an ordinally arranged adjustable selection mechanism operative to control the entry of a value into the register, clearing means for the selection mechanism, a computing mechanism operative to enter the value determined by said selection mechanism into said register additively or subtractively, and a drive means, a square root control key, means operated by said square root control key and operative to control said computing mechanism to insert a value standing in the selection mechanism additively into the register five times, to thereafter operate the clearing means to clear the selection mechanism and finally to initiate a continuous series of subtractive operations, and means connectable to said drive means and operative to adjust the selection mechanism to insert a value of "5" in a preselected order thereof and thereafter in said series of subtractive operations to progressively adjust the next higher order of the selection mechanism to consecutive numbers.

4. A calculating machine comprising a register; an adjustable selection mechanism; means for differentially operating said register additively or subtractively in accordance with a value set in said selection mechanism; an automatic division mechanism operable to control said differential operating means to continuously subtract a value set into the selection mechanism to an overdraft, then correctively add back the overdrafting value into the register, and then initiate a second continuous subtraction in the next ordinal position of the register with respect to said selection mechanism; and means for adjusting the selection mechanism during a division operation in a predetermined progression of "5" in a first step and in successive intervals of "10" in succeeding steps.

5. In a cyclically operable calculating machine having a positionable value selecting mechanism in which the divisor is set, an accumulator in which a dividend is set, and means controlled by said selecting mechanism for differentially operating said accumulator, the combination which comprises an automatic division mechanism operable to divide a dividend in said accumulator by a divisor in said selecting mechanism by a continuous subtraction method and means operative in a division operation to progressively position the value selecting mechanism to represent a value of "5" in the first cycle of operation and to increase the previous value by "10" in each successive cycle of operation.

6. In a cyclically operable calculating machine having a register, a selection mechanism, a reversible value entering mechanism operable to enter a value set in the selection mechanism into the register additively or subtractively, drive means for such value entering mechanism, means for shifting the relative decimal position of the register and the value entering mechanism, an overdraft sensing means, and means operated by the sensing means to reverse the direction of operation of the value entering mechanism and to operate the shifting means for a single step of movement, the improvement which comprises means driven from said drive means for adjusting the selection mechanism to represent a value of "5" in the first cycle of operation and thereafter adjusting the selection mechanism in an arithmetical progression having intervals of "10" during continuous cycles of a multicycle operation.

7. In a calculating machine having a selection mechanism, an accumulator and an automatic division mechanism operable to continuously subtract a value set into the selection mechanism to an overdraft, then correctively add back the overdrafting value into the accumulator and shift the accumulator to the next lower ordinal position, means for adjusting a selected order of the selection mechanism to represent a value of "5" and progressively adjusting the selection mechanism in the next higher order in each cycle of subtractive operation by "1," beginning with "0," and means controlled by the adjusting means and the shifting of the accumulator to erase the value of "5" in the selected order and to adjust the selection mechanism in the next lower order to a value of "5" and to adjust the selection mechanism in the first-mentioned order by "1," beginning with "0," in successive subtractive cycles of operation.

8. The apparatus of claim 6 including also a cycle counting means and means for blocking operation of said counting means during the shifting of the accumulator to the next lower ordinal position.

9. In a cyclically operable calculating machine having an ordinally arranged register, an ordinally arranged selection mechanism, an actuating means for differentially operating said register additively or subtractively in accordance with a value set in the selection mechanism, the improvement which comprises a plurality of ordinally arranged value adjusting means for selected orders of the selection mechanism, drive means for incrementally operating said value adjusting means to correspond to consecutive numbers in continuous cycles of operation, means for operatively connecting the various adjusting means to said drive means, means for initiating operation of said drive means and for operating the connecting means to connect a predetermined one of said adjusting means to said drive means, and means operated by said connecting means for adjusting the adjacent lower order of the selection mechanism to correspond to a value of "5."

10. The apparatus of claim 9 comprising also an overdraft sensing means and means operated from said sensing means to operate the connecting means to disconnect the drive means and the predetermined value adjusting means and for operating the connecting means to connect said drive means to a second ordinal value adjusting means.

11. In a calculating machine having an ordinally arranged register, an ordinally arranged value entering mechanism operable to enter a value set therein into the register additively or subtractively, means for shifting the relative decimal position of the register and the value entering mechanism, and a programming mechanism including an overdraft sensing means and means operated by the sensing means to reverse the direction of operation of the value entering mechanism and to operate the shifting means, the improvement which comprises a plurality of ordinally arranged value adjusting means associated with selected orders of the value entering mechanism, each such value adjusting means being operative to progressively adjust the value entering mechanism to consecutive values beginning with zero, drive means for said value adjusting means, means operatively connected to said programming mechanism for sequentially connecting an ordinal value adjusting means to said drive means, and means operated by said last-mentioned means for adjusting the next lower order of the value entering mechanism to a value of "5."

12. In a calculating machine having an ordinally arranged accumulator, an ordinally arranged selection mechanism, value entering means operable to enter a value set in the selection mechanism into the accumulator additively or subtractively, means for shifting the relative decimal position of the accumulator and the value entering means, and a division mechanism including an overdraft sensing means and means operated by the sensing means to reverse the direction of operation of the value entering means and to operate the shifting means, the improvement which comprises means operable to progressively adjust a selected order of the selection mechanism in such a division operation to consecutive numbers beginning with "0," means for adjusting the next lower order of the selection mechanism to a value of "5," means controlled by said sensing means and operable to erase the value of "5" in the order below the selected order, for disabling said adjusting means in said selected order, and for enabling operation thereof in the next lower order.

13. A calculating machine for the extraction of square root comprising an ordinally arranged accumulator, an ordinally arranged selection means, means for differentially actuating the said accumulator, a cyclically operative drive means, a plurality of ordinally arranged value adjusting means driven by said drive means for adjusting the respective orders of the selection means to consecutive numbers beginning with "0" in successive cycles of machine operation, ordinal interponents positionable to connect said drive means to the ordinally associated value adjusting means and to adjust the selection means of the next lower order to a value of "5," control means for positioning one only of said interponents into operative position at a time, and means for operating said control means.

14. The apparatus of claim 13 comprising also means for first inserting a value set in the selection means additively into the accumulator five times, then erasing the value in the selection means, and finally initiating the operation of the drive means.

15. A calculating machine for the extraction of square root comprising a carriage, a carriage shifting means, an accumulator mounted in said carriage, an ordinally arranged selection means, digitating means for differentially operating said accumulator additively or subtractively in accordance with values set in said selection means, a control mechanism operative to operate said digitating means to continuously subtract a value in the selection means from a value in the accumulator to an overdraft and then operate the shifting means, a drive shaft operable to normally rotate through a predetermined angular movement corresponding to a value of "1," a cyclically operable drive means for operating said drive shaft, ordinally arranged adjusting means for adjusting the respective orders of the selection means in increments corresponding to a value of "1," ordinally arranged interponents positionable to operatively connect said drive shaft to an ordinally associated adjusting means, and means for sequentially positioning said interponents in connecting position, said last-mentioned means including a cam shaft, ordinally arranged cams mounted spirally on said shaft, follower means positioned by each cam for positioning an interponent in connecting position with its ordinally associated adjusting means and for adjusting the next lower order of the selection means to a value of "5," and means operated by the control mechanism for rotating said cam shaft.

16. In a calculating machine for the extraction of square root, the combination which comprises a register, an overdraft sensing means, an ordinally arranged reversible value entering mechanism, means for shifting the relative decimal position of said register and said value entering mechanism, an ordinally arranged value adjusting means for adjusting the value entering mechanism to consecutive numbers beginning with "0," connecting means for operatively connecting a predetermined ordinal value entering mechanism to said value adjusting means and for adjusting the next lower order of the value entering mechanism to a value of "5," and means operated from said overdraft sensing means for disabling operation of the value adjusting means, for causing a reversed cycle of operation of said value entering mechanism, for operating the shifting means to shift the relative decimal position of the register and the value entering mechanism, and for operating the connecting means to connect another ordinal value entering mechanism to said value adjusting means.

17. In a calculating machine having a register, an overdraft sensing means, an ordinally arranged reversible value entering mechanism, means for shifting the said register with respect to said value entering mechanism, and a drive means; means for automatically extracting square root comprising the combination of an ordinally arranged value adjusting means for adjusting the value entering mechanism to consecutive numbers beginning with "0," connecting means for operatively connecting a predetermined ordinal value entering mechanism to said value adjusting means and adjusting the value entering mechanism of the next lower order to a value of "5," and means driven by said drive means and operated by said overdraft sensing means for operating the connecting means to disconnect the value adjusting means from the predetermined ordinal value entering mechanism, for causing a reversed cycle of operation of said value entering mechanism, for operating the shifting means to shift the register a single ordinal step, and for operating the connecting means to connect another ordinal value entering mechanism to said value adjusting means.

18. The apparatus of claim 17 comprising also a control means operable to insert a radicand factor set in the value entering mechanism into a predetermined ordinal position of the register, and a second control means operable to enter said radicand factor into said register in an order adjacent the said predetermined order.

19. The apparatus of claim 17 comprising also an ordinally arranged keyboard, a plurality of decimal markers between adjacent orders of the keys of said keyboard, and square root control keys aligned with said decimal markers, the keys lying to the right of the even numbered orders of keys being operative to control the entry of the radicand from the keyboard into the register in a predetermined ordinal position of the register, and the keys lying to the right of the odd numbered orders of keys being operative to control the entry of the radicand from the keyboard into the register in a predetermined second ordinal position of said register.

20. In a calculating machine having an ordinally arranged keyboard, a shiftable register, means for shifting said register, and means including differentially operated drive means for automatically entering a radicand factor set in the keyboard into said register a predetermined number of times, the combination which comprises square root control keys ordinally arranged with respect to the orders of said keyboard, means operated by the square root control keys associated with the odd numbered orders of keys of the keyboard and operative to initiate operation of shifting means to shift the register to a predetermined ordinal position and then initiate operation of the means for automatically entering the radicand factor from the keyboard into the register, and means operated by the square root control keys associated with the even numbered orders of keys of the keyboard and operative to initiate operation of the shifting means to shift the register to an ordinal position adjacent the predetermined ordinal position and then initiate operation of the means for automatically entering the radicand factor into the register.

21. In a calculating machine having a value selection means, a carriage, an ordinally arranged register mounted in said carriage, means for relatively shifting the decimal position of said carriage with respect to said selection means, means for transmitting a value from the selection means into said register, a control key, means operated by said control key for initiating operation of the shifting means to shift the carriage to a predetermined ordinal position with respect to said selection means and thereafter controlling the transmitting means to enter the value standing in the selection means into the register five times, a second control key, and means operated by said second control key for initiating operation of the shifting means to shift the carriage to another ordinal position with respect to said selection means, thereafter controlling the transmitting means to enter the value standing in the selection means into the register five times, and finally initiating operation of the shifting means to shift the carriage to the predetermined ordinal position.

22. In a calculating machine having a value selection mechanism, a carriage, an ordinally arranged register mounted in said carriage, means for relatively shifting the decimal position of said carriage with respect to said selection mechanism, shift terminating means for terminating operation of the shifting means in a predetermined ordinal position, and actuating means for differentially operating said register in accordance with a value set in the selection mechanism; a control key, means operated by said control key for operating the shifting means, means operated by said control key for conditioning said shift terminating means for operation in a predetermined ordinal position, means operated by said shift terminating means for operating the actuating means to enter the value standing in the selection mechanism into the register five times and thereafter operating the shifting means to shift the carriage to a second predetermined ordinal position.

23. In a calculating machine having a value selection mechanism; a carriage; an ordinally arranged register mounted in said carriage; means for relatively shifting the decimal positions of said carriage and said selection mechanism; means for transmitting a value from the selection mechanism into said register additively or subtractively; a control key; means operated by said control key for operating the shifting means to shift the carriage to a predetermined ordinal position with respect to said selection mechanism, and thereafter controlling the transmitting means to enter the value standing in the selection mechanism into the register five times additively; a second control key; means operated by said second control key to operate the shifting means to shift said carriage to the ordinal position next below the predetermined position, to operate the value transmitting means to insert the value standing in the selection mechanism into the register five times additively, and thereafter shift the carriage to the predetermined position; and means operated by each of said keys for finally clearing said selection mechanism and initiating a series of continuous subtractive operations of said transmitting means with a progressively changing subtrahend.

24. In a cyclically operable calculating machine having an accumulator, an ordinally arranged value entering means for controlling the entry of values set in said means into the accumulator, an overdraft sensing means, a reversible means for controlling the sign character of operation of said accumulator from said value entering means, means for shifting the relative decimal positions of the accumulator and the value entering means, and means operated by said overdraft sensing means for reversing the sign character control means for a single cycle of operation and for operating said shifting means for a single ordinal shifting movement, means for automatically adjusting the value entering means comprising a drive shaft, drive means for cyclically rotating said drive shaft a predetermined angular increment in each cycle of machine operation, ordinally arranged connecting means for differentially setting the respective ordinal value entering means from the angular position of said drive shaft, blocking means operative to prevent operation of said drive means, means operated from said overdraft sensing means for operating said block means during the operation of said reversible means and said shifting means by said overdraft sensing means and the first cycle of machine operation thereafter.

25. The apparatus of claim 24 comprising also a cam shaft driven by said drive means, ordinally arranged cams mounted spirally on the said shaft, cam followers associated with said cams, and means positioned by said cam followers for positioning a predetermined ordinal connecting means in a connecting position, and for adjusting the value entering means of the next lower order to a value of "5."

26. A square root computer for a mechanical digital calculator comprising a manually operated starting means; an accumulator; a selection mechanism in which a radicand can be set; a cyclically operable differential actuating means; means for shifting the relative decimal positions of the accumulator and the selection mechanism; an overdraft sensing means; control means responsive to the starting means for operating the shifting means to shift the relative decimal position of the accumulator and the selection mechanism to a preselected ordinal position, thereafter operating the differential actuating means to enter the radicand into the accumulator five times, and finally operating the differential actuating means to perform a first series of subtractions, means for changing the subtrahend setting in the selection mechanism progressively during such series of subtractions starting with "5" in the first cycle of operation and increasing by an interval of "10" in each successive cycle thereafter; means operated by said overdraft sensing means to terminate such operation of the differential actuating means, to then reverse the operation of the differential actuating means to correct the overdraft, thereafter operate the shifting means to shift the relative decimal position of the accumulator, and finally initiate another series of subtractions of a similar progressively changing subtrahend; and counting means for counting the number of subtractions in each series.

27. A square root computer for a mechanical digital calculator comprising a manually operated starting means; an accumulator; a selection mechanism in which a radicand can be set; means for clearing the selection mechanism, a differential actuating means cyclically operable additively or subtractively, means for shifting the relative decimal positions of the accumulator and the selection mechanism; an overdraft sensing means; control means responsive to the starting means for operating the shifting means to shift the relative decimal position of the accumulator and the selection mechanism to a preselected ordinal position, thereafter operating the differential actuating means additively to enter a radicand set in the selection mechanism into the accumulator five times, then operating the clearing means to clear the radicand value from the selection mechanism, and finally operating the differential actuating means subtractively to perform a first series of subtractions; a number changing means jointly controlled by said overdraft sensing means and said control means and operatively connected to said selection mechanism for progressively adjusting the value standing in the predetermined order of the selection mechanism to consecutive numbers beginning with "0" on the first cycle of each series of subtractions and to adjust the selection mechanism in the adjacent lower order to a value of "5"; means operated by said overdraft sensing means to terminate such subtractive operation of said differential actuating means, to then operate said differential actuating means additively to correct the overdraft, to then operate the shifting means to shift the relative decimal position of the accumulator, and finally operate the differential actuating means subtractively in another series of subtractions; and counting means for counting the number of subtractions in each series.

28. In a calculating machine having an ordinally arranged selection mechanism, an ordinally shiftable accumulator, an ordinally arranged digitating means controlled by said selection mechanism for differentially operating said accumulator, a shifting means for shifting said accumulator, a drive means, and an automatic division mechanism operable to control operation of said digitating means and said shifting means to continuously subtract a value set into the selection mechanism from the accumulator to an overdraft, then correctively add back the overdrafting value into the accumulator, and shift the carriage to the next lower ordinal position, the improvement which comprises ordinally arranged means for adjusting the selection mechanism in the respective order to consecutive numbers beginning with "0" in successive subtraction cycles during a division operation, means for initiating operation of such adjusting means in a selected order of the selection mechanism, means associated with said last-mentioned means for adjusting the first adjacent lower order of said selection mechanism to represent a value of "5," means controlled by the shifting of said carriage during such a division operation for adjusting the selection mechanism to erase the value of "5" in the first adjacent lower order and to represent a value of "5" in the second adjacent lower order and for disabling operation of the adjusting means in the selected order and enabling operation of such adjusting means in the first adjacent lower order.

29. The apparatus of claim 28 comprising also means for holding the selection mechanism positioned by the means for adjusting the same to consecutive numbers in its adjusted position.

30. A cyclically operable calculating machine for the extraction of square root comprising a carriage; a carriage shifting means; an accumulator mounted in said carriage; an ordinally arranged selection means; ordinally arranged actuating means for entering values set in the selection means into said accumulator additively or subtractively; an overdraft sensing means; means operated by said overdraft sensing means for reversing the sign character of the operation of said actuating means for one cycle of operation; for operating the shifting means to shift the relative decimal positions of the accumulator and the actuating means, and for reinitiating continuous cycles of operation; a program drive shaft; drive means for rotating said drive shaft through a predetermined angular movement with each cycle of machine operation, blocking means operative to prevent operation of said drive means; means operated from said overdraft sensing means for operating said blocking means during the reversed sign character operation of the actuating means, the shifting of the relative decimal positions of the accumulator and the actuating means, and the first cycle of operation thereafter; ordinally arranged connecting means positionable to operatively connect said drive shaft to an ordinally associated selection means; means for sequentially positioning said connecting means in connecting position, said last-mentioned means including a cam shaftt, means operated by the carriage shifting means for rotating said cam shaft, ordinally arranged cams mounted spirally on said shaft, and cam followers associated with said cams and operative to position the ordinally associated connecting means in connecting position; means operated by said cam followers for inserting a value of "5" in the next lower order selection means; a control key; means operated by said control key for operating the shifting means to shift the carriage to a predetermined ordinal position with respect to said actuating means and thereafter controlling the actuating means to enter the value standing in the selection means into the accumulator five times additively; a second control key; and means operated by said second control key for operating said shifting means to shift said carriage to another ordinal position thereof, thereafter controlling the actuating means to insert the value standing in the selection means into the accumulator five times, and finally shift the carriage to the predetermined position.

31. In a calculating machine having a register, a selection mechanism, and actuating means controlled by said selection mechanism for differentially operating said register additively or subtractively, means for clearing said selection mechanism, and a drive means for said actuating means, a square root control key, means operated by said square root control key and effective to operate said actuating means to insert a value standing in the selection mechanism five times into the register, to thereafter operate the clearing means, and finally to initiate a continuous series of subtractive operations of said actuating means, and means conditioned by said key and operated by said drive means during such continuous operation to progressively adjust the selection mechanism in a predetermined progression beginning with "5" as the first term and with a difference of "10" in succeeding terms.

32. In a calculating machine having a register, a value selection mechanism, a reversible value entering mechanism operable to enter a value set in the selection mechanism additively or subtractively into the register, drive means for such value entering mechanism, means for shifting the relative decimal position of the register and the value entering mechanism, a program control means for causing continuous cyclic operation of the drive means and subtractive operation of the value entering mechanism, an overdraft sensing means, and means conditioned by said program control means and operated by the sensing means to reverse the direction of the operation of the value entering mechanism for a single add cycle and to operate the shifting means for a single ordinal step of movement, the improvement which comprises a rotatable member driven from said drive means, adjusting means connectable to said rotatable member for progressively adjusting the value in the various orders of the selection mechanism by a value of "1" in succeeding subtraction cycles of operation, ordinally arranged interponent members operable to insert a value of "5" in the respective orders of the selection mechanism and to connect the adjusting means of the adjacent higher order to said rotatable member; and means for successively operating the interponent members.

33. In a calculating machine having ordinally arranged keyboard keys, a shiftable register, means for shifting said register, and means for automatically entering a radicand set in the keyboard keys into said register a predetermined number of times; square root control keys ordinally arranged with respect to the orders of said keyboard keys, means operated by the control keys associated with the odd numbered orders of keyboard keys for operating the shifting means to shift the register to a predetermined ordinal position thereof and to then initiate operation of the radicand entering means, and means operated by the control keys associated with the even numbered orders of the keyboard keys for operating said shifting means to shift the register into the ordinal position adjacent said predetermined ordinal position and thereafter initiate operation of the radicand entering means.

References Cited in the file of this patent

UNITED STATES PATENTS

| | | |
|---|---|---|
| 2,318,591 | Couffignal | May 11, 1943 |
| 2,327,981 | Friden | Aug. 31, 1943 |
| 2,388,211 | Machado | Oct. 30, 1945 |
| 2,394,924 | Luhn | Feb. 12, 1946 |
| 2,399,917 | Friden | May 7, 1946 |
| 2,493,862 | Durfee | Jan. 10, 1950 |
| 2,502,360 | Williams | Mar. 28, 1950 |